United States Patent
Maladwalla et al.

(10) Patent No.: US 12,418,538 B2
(45) Date of Patent: Sep. 16, 2025

(54) DYNAMIC COMPUTING RESOURCE SET GENERATION AND ACCESS CONTROL

(71) Applicant: Assurant, Inc., New York, NY (US)

(72) Inventors: Adil Maladwalla, Miami, FL (US); Manuel Becerra, Miami, FL (US); Gilberto Jose Almonte, Jr., Miami, FL (US)

(73) Assignee: Assurant, Inc., New York, NY (US)

( * ) Notice: Subject to any disclaimer, the term of this patent is extended or adjusted under 35 U.S.C. 154(b) by 233 days.

(21) Appl. No.: 18/047,110

(22) Filed: Oct. 17, 2022

(65) Prior Publication Data

US 2023/0412606 A1 Dec. 21, 2023

Related U.S. Application Data

(63) Continuation of application No. 17/936,543, filed on Sep. 29, 2022.

(Continued)

(51) Int. Cl.
*H04L 9/40* (2022.01)
*G06F 9/54* (2006.01)
(Continued)

(52) U.S. Cl.
CPC ............ *H04L 63/102* (2013.01); *G06F 9/541* (2013.01); *G06F 21/604* (2013.01); *G06F 21/6218* (2013.01)

(58) Field of Classification Search
CPC ..... H04L 63/102; G06F 16/178; G06F 16/182
See application file for complete search history.

(56) References Cited

U.S. PATENT DOCUMENTS 9,891,810 B2 2/2018 Caporal et al.
10,146,925 B1 12/2018 Rosenberg
(Continued)

FOREIGN PATENT DOCUMENTS

CN 111131242 A 5/2020
JP 2014-238786 A 12/2014
(Continued)

OTHER PUBLICATIONS

ISA/220—Notification of Transmittal or Search Report and Written Opinion of the ISA, or the Declaration Mailed on Oct. 30, 2023 for WO Application No. PCT/US23/068291, 19 page(s).
(Continued)

*Primary Examiner* — Esther B. Henderson
(74) *Attorney, Agent, or Firm* — Alston & Bird LLP

(57) ABSTRACT

Various embodiments are directed to apparatuses, methods, computer program products, computer readable media, and systems related to dynamic computing resource set generation and access control. In some embodiments, a system may be configured for automated resource access management associated with a selected computing resource set of a plurality of computing resource sets. The system may be configured to receive a resource access request associated with the selected computing resource set; store, at a database associated with a dynamic resource assembly system, access privilege data associated with the plurality of constituent computing resources of the selected resource set and the first account; and transmit the access privilege data to one or more of the plurality of constituent computing resources of the selected resource set, the access privilege data configured to cause association of the first account with the one or more of the plurality of constituent computing resources.

23 Claims, 24 Drawing Sheets

Related U.S. Application Data

(60) Provisional application No. 63/353,131, filed on Jun. 17, 2022, provisional application No. 63/353,350, filed on Jun. 17, 2022.

(51) Int. Cl.
    *G06F 21/60*     (2013.01)
    *G06F 21/62*     (2013.01)

(56) References Cited

U.S. PATENT DOCUMENTS

| | | |
|---|---|---|
| 11,016,946 B1 | 5/2021 | Graham et al. |
| 11,436,057 B2 | 9/2022 | Shen et al. |
| 11,785,584 B2 | 10/2023 | Kozura et al. |
| 2011/0213971 A1 | 9/2011 | Gurel et al. |
| 2015/0012977 A1* | 1/2015 | Huh .................. H04L 63/08 726/4 |
| 2018/0013732 A1 | 1/2018 | Rubenstein |
| 2018/0196955 A1 | 7/2018 | Dageville et al. |
| 2020/0104519 A1 | 4/2020 | Farber et al. |
| 2020/0142930 A1 | 5/2020 | Wang et al. |
| 2021/0029108 A1* | 1/2021 | Obando Chacon ... G06F 21/604 |
| 2021/0081366 A1 | 3/2021 | Madisetti et al. |
| 2021/0185046 A1 | 6/2021 | Gupta |
| 2022/0043680 A1 | 2/2022 | Ferreira et al. |
| 2022/0103566 A1 | 3/2022 | Faulkner |

FOREIGN PATENT DOCUMENTS

| | | |
|---|---|---|
| JP | 2017-503231 A | 1/2017 |
| JP | 2022-037395 A1 | 3/2022 |

OTHER PUBLICATIONS

Final Rejection Mailed on Mar. 6, 2025 for U.S. Appl. No. 17/936,543, 12 page(s).
English Translation of JP Office Action dated Mar. 4, 2025 for JP Application No. 2023009172, 3 page(s).
JP Office Action Mailed on Mar. 4, 2025 for JP Application No. 2023009172, 3 page(s).
English Translation of JP Office Action dated Apr. 22, 2025 for JP Application No. 2022191021, 3 page(s).
JP Office Action Mailed on Apr. 22, 2025 for JP Application No. 2022191021, 3 page(s).
English Translation of JP Office Action dated Jul. 1, 2025 for JP Application No. 2022191563, 4 page(s).
JP Office Action Mailed on Jul. 1, 2025 for JP Application No. 2022191563, 4 page(s).

* cited by examiner

1052

| HOME  MY ACCOUNTS  TRANSFERS  PROTECTIONS  PAYMENT OPTIONS | PROFILE     ☐ MY PURCHASES    USER ○

< BACK

GADGET INSURANCE
A DEVICE PROTECTION PLAN THAT REDUCES COSTS ASSOCIATED WITH UNEXPECTED REPAIRS.

✓ ACCIDENT DAMAGE
IF YOU DROP IT OR THE SCREEN GETS CRACKED - YOU'RE COVERED

✓ MECHANAL & ELECTRICAL BREAKDOWN
WE COVER MECHANICAL BREAKDOWNS AFTER THE MANUFACTURER'S WARRANTY HAS RUN OUT

✓ FUNCTIONAL PARTS & LABOR
BLANK SCREEN, BROKEN BUTTON, CHARGING ISSUES, OR ANYTHING IN-BETWEEN. IF YOUR GADGET BREAKS DOWN, YOU'RE COVERED.

PLANS STARTING AT: 7,99 € / MO.

1056

POCKET GEEK HOME

DASHBOARD  ACCOUNT  HOME DEVICES  TECH SERVICES

FAMILY ACCOUNT

   + MORE    POCKET GEEK HOME PLAN  >

1058   HOME DEVICES

MANAGE YOUR INVENTORY OF SMART HOME DEVICES AND VIEW COVERAGE.

32 DEVICES   $10050 TOTAL ESTIMATED VALUE

MANAGE DEVICES

1060   TECH SERVICES

GET SPECIAL OFFERS ON SELECT SERVICES THROUGH OUR PARTNERS.

INCLUDES UP TO 4 SELECT IN-STORE SERVICES PER YEAR AT NO ADDITIONAL COST   SPECIAL SAVINGS ON IN-HOME INSTALLATION SERVICES

SEE ALL SERVICES

WE'RE HERE TO SUPPORT YOU!
GOT A QUESTION ABOUT YOUR CONNECTED DEVICES OR NEED TECHNICAL SUPPORT? WE'RE HERE TO HELP.

LET'S CHAT

LUCAS ASSURANCE PERSONAL TECHPRO

OTHER PERKS INCLUDED WITH YOUR PLAN

 POCKET GEEK ID

THE SIMPLE, SAFE, AND SMART WAY TO TAKE CONTROL OF YOUR DIGITAL LIFE.

CLICK HERE TO TRY NOW!

 WI-FI SPEED CHECK

ENSURE YOUR HOME NETWORK SPEED MEETS YOUR USAGE REQUIREMENTS.

CLICK HERE TO TRY NOW!

NEED A LITTLE HELP FINDING YOUR WAY AROUND? VIEW THE TUTORIAL  >

FIG. 10G

1062

POCKET GEEK HOME

DASHBOARD   ACCOUNT   HOME DEVICES   TECH SERVICES

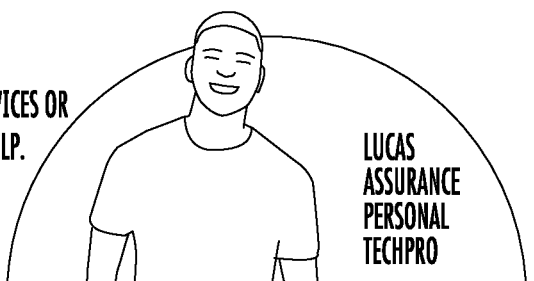

WE'RE HERE TO SUPPORT YOU!
GOT A QUESTION ABOUT YOUR CONNECTED DEVICES OR NEED TECHNICAL SUPPORT? WE'RE HERE TO HELP.

( LET'S CHAT )

LUCAS
ASSURANCE
PERSONAL
TECHPRO

GET SPECIAL OFFERS ON SELECT SERVICES THROUGH OUR PARTNERS

|  HOME INSTALLATION |  VIRUS REMOVAL |  PC TUNEUP |  DATA TRANSFER |  ANTIVIRUS INSTALLATION |
|---|---|---|---|---|
| INCLUDED | INCLUDED | INCLUDED | INCLUDED | INCLUDED |
| MORE INFO | MORE INFO | MORE INFO | MORE INFO | MORE INFO |

FIG. 10H

DYNAMIC COMPUTING RESOURCE SET GENERATION AND ACCESS CONTROL

CROSS-REFERENCE TO RELATED APPLICATIONS

This application is a continuation of U.S. application Ser. No. 17/936,543, filed Sep. 29, 2022, which application claims the benefit of U.S. Provisional Application No. 63/353,131, filed on Jun. 17, 2022 and U.S. Provisional Application No. 63/353,350, filed on Jun. 17, 2022, each of which is hereby incorporated by reference herein in its entirety.

TECHNICAL FIELD

Embodiments of the present disclosure relate generally to computer technology and, more particularly, relate to systems, methods, apparatuses, computer readable media, and computer program products for dynamic computing resource set generation and access control.

BACKGROUND

Various products and services facilitated by hardware and/or software systems may require a variety of backend and frontend infrastructure to maintain and support. Each of these products and services may require separate access and enrollment processes each facilitated by the front- and backend systems associated with each respective product and service. Such systems produce unneeded duplication of computer hardware and software, computational inefficiency, increased development time and cost, data desynchronization and errors, and an inconsistent user experience.

Applicant has identified a number of deficiencies and problems associated with present systems and methods in the art. Through applied effort, ingenuity, and innovation, many of these identified problems have been solved by developing solutions that are included in embodiments of the present disclosure, many examples of which are described in detail herein.

BRIEF SUMMARY

In general, embodiments of the present disclosure provided herein may relate to dynamic computing resource set generation and access control and various associated systems, apparatus, methods, and computer program products. Other implementations for dynamic computing resource set generation and access control will be, or will become, apparent to one with skill in the art upon examination of the following figures and detailed description. It is intended that all such additional implementations be included within this description be within the scope of the disclosure and be protected by the following claims.

Various embodiments are directed to apparatuses, methods, computer program products, computer readable media, and systems related to dynamic computing resource set generation and access control. In various embodiments, a system configured for automated resource access management associated with a selected computing resource set of a plurality of computing resource sets may be provided. The system may include at least one processor, and at least one memory associated with the at least one processor having computer coded instructions therein, with the computer coded instructions configured to, when executed by the at least one processor, cause the system to: receive a resource access request associated with the selected computing resource set, the resource access request comprising a resource access request data structure comprising an indication of the selected computing resource set and first account data associated with a first account, wherein the selected computing resource set comprises a plurality of constituent computing resources; store, at a database associated with a dynamic resource assembly system, access privilege data associated with the plurality of constituent computing resources of the selected resource set and the first account; and transmit the access privilege data to one or more of the plurality of constituent computing resources of the selected resource set, the access privilege data configured to cause association of the first account with the one or more of the plurality of constituent computing resources. The system may be configured to retrieve, from the dynamic resource assembly system, data comprising a plurality of identifiers associated with the plurality of constituent computing resources of the selected computing resource set before transmitting the access privilege data. In various embodiments, each of the plurality of constituent computing resources is independent. The system may be further configured to receive an indication of an update associated with one or more of the constituent computing resources; cause a registration interface to be rendered on a device associated with the first account; receive an updated resource access request associated with an updated selected computing resource set; and transmit updated access privilege data to the one or more constituent computing resources. The system may be configured to update one or more data structures associated with the plurality of computing resource sets at the dynamic resource assembly system in response to the indication of the update. In various embodiments, at least one of constituent computing resource associated with the updated selected computing resource set is unchanged relative to the selected computing resource set. In some embodiments, the system may be configured to, prior to receiving the resource access request: receive a request for one or more computing resource sets; retrieve a data structure associated with the one or more computing resource sets; and cause rendering of a computing resource set registration interface on a user device, the computing resource set registration interface configured to display an indication of the one or more computing resource sets, wherein the resource access request is generated in response to a selection of a user at the computing resource set registration interface. In various embodiments, the indication of the one or more computing resource sets comprises at least one core computing resource and at least one optional computing resource, and wherein the selection of the user comprises a selection of the at least one optional computing resource. In various embodiments, the computing resource set registration interface is further configured to present one or more customization options to the user, and wherein the selection of the user comprises attribute assets associated with the one or more customization options. In various embodiments, the one or more computing resource sets comprises a first computing resource set and a second computing resource set. In various embodiments, the first computing resource set and the second computing resource set comprise at least one common constituent computing resource. The resource access request data structure may further comprise channel data. In various embodiments, the system may be configured to receive an indication of an update associated with one or more of the constituent computing resources; generate a new computing resource set; and continue to support the selected computing resource set independent of the new computing resource set. In various embodiments, each of the plurality of constituent computing resources is associated with a token data structure, and wherein a total token value of the selected computing resource set comprises a combination of the token data structures of each of the plurality of constituent computing resources. In various embodiments, the system may include an application programming interface (API) configured to receive a plurality of resource access requests associated with a plurality of channels and a plurality of accounts. In various embodiments, the API is the only gateway to the system for receiving resource access requests.

In various embodiments, a method for automated resource access management associated with a selected computing resource set of a plurality of computing resource sets may be provide. The method may include receiving a resource access request associated with the selected computing resource set, the resource access request comprising a resource access request data structure comprising an indication of the selected computing resource set and first account data associated with a first account, wherein the selected computing resource set comprises a plurality of constituent computing resources; storing, at a database associated with a dynamic resource assembly system, access privilege data associated with the plurality of constituent computing resources of the selected resource set and the first account; and transmitting the access privilege data to one or more of the plurality of constituent computing resources of the selected resource set, the access privilege data configured to cause association of the first account with the one or more of the plurality of constituent computing resources. In various embodiments, the method may include retrieving, from the dynamic resource assembly system, data comprising a plurality of identifiers associated with the plurality of constituent computing resources of the selected computing resource set before transmitting the access privilege data. In various embodiments, each of the plurality of constituent computing resources is independent. In various embodiments, the method may include receiving an indication of an update associated with one or more of the constituent computing resources; causing a registration interface to be rendered on a device associated with the first account; receiving an updated resource access request associated with an updated selected computing resource set; and transmitting updated access privilege data to the one or more constituent computing resources. The method may include updating one or more data structures associated with the plurality of computing resource sets at the dynamic resource assembly system in response to the indication of the update. In various embodiments, at least one of constituent computing resource associated with the updated selected computing resource set is unchanged relative to the selected computing resource set. In various embodiments, the method may include, prior to receiving the resource access request: receiving a request for one or more computing resource sets; retrieving a data structure associated with the one or more computing resource sets; and causing rendering of a computing resource set registration interface on a user device, the computing resource set registration interface configured to display an indication of the one or more computing resource sets, wherein the resource access request is generated in response to a selection of a user at the computing resource set registration interface. In various embodiments, the indication of the one or more computing resource sets comprises at least one core computing resource and at least one optional computing resource, and wherein the selection of the user comprises a selection of the at least one optional computing resource. In various embodiments, the computing resource set registration interface is further configured to present one or more customization options to the user, and wherein the selection of the user comprises attribute assets associated with the one or more customization options. In various embodiments, the one or more computing resource sets comprises a first computing resource set and a second computing resource set. In various embodiments, the first computing resource set and the second computing resource set comprise at least one common constituent computing resource. In various embodiments, the resource access request data structure further comprises channel data. The method may further include receiving an indication of an update associated with one or more of the constituent computing resources; generating a new computing resource set; and continuing to support the selected computing resource set independent of the new computing resource set. In various embodiments, each of the plurality of constituent computing resources is associated with a token data structure, and wherein a total token value of the selected computing resource set comprises a combination of the token data structures of each of the plurality of constituent computing resources. In various embodiments, the method may include configuring an application programming interface (API) configured to receive a plurality of resource access requests associated with a plurality of channels and a plurality of accounts. In various embodiments, the API is the only gateway to the system for receiving resource access requests.

In various embodiments, computer program product for automated resource access management associated with a selected computing resource set of a plurality of computing resource sets may be provided. The computer program product may include a non-transitory computer-readable storage medium storing computer program code that, when executed by at least one apparatus, causes the apparatus to: receive a resource access request associated with the selected computing resource set, the resource access request comprising a resource access request data structure comprising an indication of the selected computing resource set and first account data associated with a first account, wherein the selected computing resource set comprises a plurality of constituent computing resources; store, at a database associated with a dynamic resource assembly system, access privilege data associated with the plurality of constituent computing resources of the selected resource set and the first account; and transmit the access privilege data to one or more of the plurality of constituent computing resources of the selected resource set, the access privilege data configured to cause association of the first account with the one or more of the plurality of constituent computing resources. In various embodiments, the computer program code, when executed by the apparatus, further causes the apparatus to retrieve, from the dynamic resource assembly system, data comprising a plurality of identifiers associated with the plurality of constituent computing resources of the selected computing resource set before transmitting the access privilege data. In various embodiments, each of the plurality of constituent computing resources is independent. In various embodiments, the computer program code, when executed by the apparatus, further causes the apparatus to: receive an indication of an update associated with one or more of the constituent computing resources; cause a registration interface to be rendered on a device associated with the first account; receive an updated resource access request associated with an updated selected computing resource set; and transmit updated access privilege data to the one or more constituent computing resources. In various embodiments, the computer program code, when executed by the apparatus, further causes the apparatus to update one or more data structures associated with the plurality of computing resource sets at the dynamic resource assembly system in response to the indication of the update. In various embodiments, at least one of constituent computing resource associated with the updated selected computing resource set is unchanged relative to the selected computing resource set. In various embodiments, the computer program product may be configured to cause the apparatus to, prior to receiving the resource access request: receive a request for one or more computing resource sets; retrieve a data structure associated with the one or more computing resource sets; and cause rendering of a computing resource set registration interface on a user device, the computing resource set registration interface configured to display an indication of the one or more computing resource sets, wherein the resource access request is generated in response to a selection of a user at the computing resource set registration interface. In various embodiments, the indication of the one or more computing resource sets comprises at least one core computing resource and at least one optional computing resource, and wherein the selection of the user comprises a selection of the at least one optional computing resource. In various embodiments, the computing resource set registration interface is further configured to present one or more customization options to the user, and wherein the selection of the user comprises attribute assets associated with the one or more customization options. In various embodiments, the one or more computing resource sets comprises a first computing resource set and a second computing resource set. In various embodiments, the first computing resource set and the second computing resource set comprise at least one common constituent computing resource. In various embodiments, the resource access request data structure further comprises channel data. In various embodiments, the computer program code, when executed by the apparatus, further causes the apparatus to: receive an indication of an update associated with one or more of the constituent computing resources; generate a new computing resource set; and continue to support the selected computing resource set independent of the new computing resource set. In various embodiments, each of the plurality of constituent computing resources is associated with a token data structure, and wherein a total token value of the selected computing resource set comprises a combination of the token data structures of each of the plurality of constituent computing resources. In various embodiments, the computer program code, when executed by the apparatus, further causes the apparatus to define an application programming interface (API) configured to receive a plurality of resource access requests associated with a plurality of channels and a plurality of accounts. In various embodiments, the API is the only gateway to the system for receiving resource access requests.

Various embodiments may include a dynamic resource assembly system. The dynamic resource assembly system may include at least one processor, and at least one memory associated with the at least one processor having computer coded instructions therein, with the computer coded instructions configured to, when executed by the at least one processor, cause the system to: receive a plurality of computing resource data sets associated with a plurality of computing resources, wherein the plurality of computing resources are independent; generate renderable assets associated with two or more of the plurality of computing resources configured to be presented via a graphical user interface on a display; receive an indication of a computing resource set associated with the two or more of the plurality of computing resources; generate the computing resource set by assembling a computing resource set data structure comprising two or more of the plurality of computing resource data sets associated with the two or more corresponding computing resources, such that each of the two or more corresponding computing resources defines a constituent computing resource associated with the computing resource set; generate a renderable asset associated with the computing resource set configured to be presented via the graphical user interface on the display. In various embodiments, each of the two or more of the plurality of computing resource data sets is associated with a constituent token data structure, and wherein the computing resource set is associated with a total token value comprising a combination of the constituent token data structures. In various embodiments, the system may be configured to receive channel data, wherein the two or more of the plurality of computing resources comprise a subset of the plurality of computing resources corresponding to the channel. In various embodiments, the system may include an operator terminal comprising the display configured to display the graphical user interface. In various embodiments, the indication of the computing resource set comprises a first indication of a core computing resource of the two or more corresponding computing resources. In various embodiments, the indication of the computing resource set comprises a second indication of an optional computing resource of the two or more corresponding computing resources, and wherein the optional computing resource is configured to be a user-selectable option of the computing resource set. In various embodiments, the indication of the computing resource set further comprises one or more customization options associated with at least one of the two or more corresponding computing resources. In various embodiments, the system may be configured to receive an indication of an update associated with one or more of the constituent computing resources; and update the computing resource set to include the update associated with the one or more of the constituent computing resources without modifying a remaining set of constituent computing resources. In various embodiments, the system may be configured to receive an indication of an update associated with one or more of the constituent computing resources; and discontinue offering the computing resource set. In various embodiments, the system may be configured to generate a new computing resource set comprising the update associated with one or more of the constituent computing resources. The system may be configured to receive a new computing resource data set associated with a new computing resource; and add the new computing resource data set to the plurality of computing resource data sets. In various embodiments, the system may receive an indication of a second computing resource set associated with a second set of two or more of the plurality of computing resources; and generate the second computing resource set by assembling a second computing resource set data structure comprising two or more of the plurality of computing resource data sets associated with the second set of two or more corresponding computing resources, such that each of the second set of two or more corresponding computing resources defines a constituent computing resource associated with the second computing resource set. In various embodiments, the computing resource set and the second computing resource set have at least one constituent computing resource in common. In various embodiments, the indication of the computing resource set, or a portion thereof, is generated with a trained machine learning model. In various embodiments, the trained machine learning model is trained using previously-generated computing resource sets. In various embodiments, the computing resource set is configurable by an end user, the computing resource set comprising the two or more of the plurality of computing resources, and one or more customizations. In various embodiments, the one or more customizations comprise customizations associated with individual ones of the two or more of the plurality of computing resources or customizations associated with the computing resource set as a whole.

In various embodiments, a method for dynamic resource assembly may be provided. The method may include receiving a plurality of computing resource data sets associated with a plurality of computing resources, wherein the plurality of computing resources are independent; generating renderable assets associated with two or more of the plurality of computing resources configured to be presented via a graphical user interface on a display; receiving an indication of a computing resource set associated with the two or more of the plurality of computing resources; generating the computing resource set by assembling a computing resource set data structure comprising two or more of the plurality of computing resource data sets associated with the two or more corresponding computing resources, such that each of the two or more corresponding computing resources defines a constituent computing resource associated with the computing resource set; generating a renderable asset associated with the computing resource set configured to be presented via the graphical user interface on the display. In various embodiments, each of the two or more of the plurality of computing resource data sets is associated with a constituent token data structure, and wherein the computing resource set is associated with a total token value comprising a combination of the constituent token data structures. In various embodiments, the method may include receiving channel data, wherein the two or more of the plurality of computing resources comprise a subset of the plurality of computing resources corresponding to the channel. In various embodiments, the method may include providing an operator terminal comprising the display configured to display the graphical user interface. In various embodiments, the indication of the computing resource set comprises a first indication of a core computing resource of the two or more corresponding computing resources. In various embodiments, the indication of the computing resource set comprises a second indication of an optional computing resource of the two or more corresponding computing resources, and wherein the optional computing resource is configured to be a user-selectable option of the computing resource set. In various embodiments, the indication of the computing resource set further comprises one or more customization options associated with at least one of the two or more corresponding computing resources. In various embodiments, the method may include receiving an indication of an update associated with one or more of the constituent computing resources; and updating the computing resource set to include the update associated with the one or more of the constituent computing resources without modifying a remaining set of constituent computing resources. In various embodiments, the method may include receiving an indication of an update associated with one or more of the constituent computing resources; and discontinuing offering the computing resource set. In various embodiments, the method may include generating a new computing resource set comprising the update associated with one or more of the constituent computing resources. The method may include receiving a new computing resource data set associated with a new computing resource; and adding the new computing resource data set to the plurality of computing resource data sets. In various embodiments, the method may include receiving an indication of a second computing resource set associated with a second set of two or more of the plurality of computing resources; and generating the second computing resource set by assembling a second computing resource set data structure comprising two or more of the plurality of computing resource data sets associated with the second set of two or more corresponding computing resources, such that each of the second set of two or more corresponding computing resources defines a constituent computing resource associated with the second computing resource set. In various embodiments, the computing resource set and the second computing resource set have at least one constituent computing resource in common. In various embodiments, the indication of the computing resource set, or a portion thereof, is generated with a trained machine learning model. In various embodiments, the trained machine learning model is trained using previously-generated computing resource sets. In various embodiments, the computing resource set is configurable by an end user, the computing resource set comprising the two or more of the plurality of computing resources, and one or more customizations. In various embodiments, the one or more customizations comprise customizations associated with individual ones of the two or more of the plurality of computing resources or customizations associated with the computing resource set as a whole.

In various embodiments, a computer program product for dynamic resource assembly may be provided. The computer program product may include a non-transitory computer-readable storage medium storing computer program code that, when executed by at least one apparatus, causes the apparatus to: receive a plurality of computing resource data sets associated with a plurality of computing resources, wherein the plurality of computing resources are independent; generate renderable assets associated with two or more of the plurality of computing resources configured to be presented via a graphical user interface on a display; receive an indication of a computing resource set associated with the two or more of the plurality of computing resources; generate the computing resource set by assembling a computing resource set data structure comprising two or more of the plurality of computing resource data sets associated with the two or more corresponding computing resources, such that each of the two or more corresponding computing resources defines a constituent computing resource associated with the computing resource set; generate a renderable asset associated with the computing resource set configured to be presented via the graphical user interface on the display. In various embodiments, each of the two or more of the plurality of computing resource data sets is associated with a constituent token data structure, and wherein the computing resource set is associated with a total token value comprising a combination of the constituent token data structures. In various embodiments, the computer program product may be configured to receive channel data, wherein the two or more of the plurality of computing resources comprise a subset of the plurality of computing resources corresponding to the channel. In various embodiments, the computer program code, when executed by the at least one apparatus, causes the apparatus to interact with an operator terminal comprising the display configured to display the graphical user interface. In various embodiments, the indication of the computing resource set comprises a first indication of a core computing resource of the two or more corresponding computing resources. In various embodiments, the indication of the computing resource set comprises a second indication of an optional computing resource of the two or more corresponding computing resources, and wherein the optional computing resource is configured to be a user-selectable option of the computing resource set. In various embodiments, the indication of the computing resource set further comprises one or more customization options associated with at least one of the two or more corresponding computing resources. In various embodiments, the computer program code, when executed by the apparatus, further causes the apparatus to: receive an indication of an update associated with one or more of the constituent computing resources; and update the computing resource set to include the update associated with the one or more of the constituent computing resources without modifying a remaining set of constituent computing resources. In various embodiments, the computer program code, when executed by the apparatus, further causes the apparatus to: receive an indication of an update associated with one or more of the constituent computing resources; and discontinue offering the computing resource set. In various embodiments, the computer program code, when executed by the apparatus, further causes the apparatus to: generate a new computing resource set comprising the update associated with one or more of the constituent computing resources. In various embodiments, the computer program code, when executed by the apparatus, further causes the apparatus to: receive a new computing resource data set associated with a new computing resource; and add the new computing resource data set to the plurality of computing resource data sets. In various embodiments, the computer program code, when executed by the apparatus, further causes the apparatus to: receive an indication of a second computing resource set associated with a second set of two or more of the plurality of computing resources; and generate the second computing resource set by assembling a second computing resource set data structure comprising two or more of the plurality of computing resource data sets associated with the second set of two or more corresponding computing resources, such that each of the second set of two or more corresponding computing resources defines a constituent computing resource associated with the second computing resource set. In various embodiments, the computing resource set and the second computing resource set have at least one constituent computing resource in common. In various embodiments, the indication of the computing resource set, or a portion thereof, is generated with a trained machine learning model. In various embodiments, the trained machine learning model is trained using previously-generated computing resource sets. In various embodiments, the computing resource set is configurable by an end user, the computing resource set comprising the two or more of the plurality of computing resources, and one or more customizations. In various embodiments, the one or more customizations comprise customizations associated with individual ones of the two or more of the plurality of computing resources or customizations associated with the computing resource set as a whole.

Various embodiments may include at least one non-transitory computer readable medium having computer coded instructions configured to, when executed by at least one processor, define at least one application programming interface (API). The at least one API may defining a gateway configured to connect a plurality of devices to a plurality of computing resources. In various embodiments, the at least one API comprising: an experience layer; and a system layer; wherein the experience layer is configured to receive one or more external API calls and transform the one or more external API calls into one or more internal API calls directly or indirectly to the system layer; wherein the system layer is configured to receive the one or more internal API calls and transmit computer executable instructions to execute one or more functions at the plurality of computing resources; wherein the at least one API is further configured to connect each of the plurality of computing resources with a dynamic resource assembly system configured to assemble functionality associated with the computing resources into at least one computing resource set. In various embodiments, the API is configured to receive a resource access request associated with a selected computing resource set of the at least one computing resource set, and wherein the API is configured to direct the resource access request to the dynamic resource assembly system. In various embodiments, the API is configured to receive an indication of an update from one of the plurality of computing resources; and transmit the indication of the update to the dynamic resource assembly system. In various embodiments, the API is configured to: receive access privilege data associated with a selected computing resource set of the at least one computing resource set, identify a plurality of constituent computing resources associated with the access privilege data, divide the access privilege data into a plurality of portions of access privilege data associated with respective ones of the plurality of constituent computing resources, and transmit the plurality of portions of access privilege data to the respective ones of the plurality of constituent computing resources. In various embodiments, the API is further configured to receive an indication of a new computing resource, and transmit an onboarding data structure to the dynamic resource assembly system. In various embodiments, the API is further configured to connect each of the plurality of computing resources and the dynamic resource assembly system with an operator terminal configured to modify one or more databases associated with one or more of the plurality of computing resources or the dynamic resource assembly system. In various embodiments, the computer coded instructions are further configured to, when executed by the at least one processor, update the API. In various embodiments, updating the API comprises adding one or more external API calls. In various embodiments, updating the API comprises modifying one or more external API calls. In various embodiments, the API is further configured to receive a message intended for multiple user devices and transmit the message to each of the multiple user devices. In various embodiments, the API is the only gateway to the system for receiving resource access requests associated with the at least one computing resource set.

Various embodiments may include an apparatus comprising one or more processors, and at least one non-transitory memory comprising instructions that, with the at least one processor, cause the apparatus to define at least one application programming interface (API). In various embodiments, the at least one API defining a gateway configured to connect a plurality of devices to a plurality of computing resources. The at least one API may include an experience layer; and a system layer; wherein the experience layer is configured to receive one or more external API calls and transform the one or more external API calls into one or more internal API calls directly or indirectly to the system layer; wherein the system layer is configured to receive the one or more internal API calls and transmit computer executable instructions to execute one or more functions at the plurality of computing resources; wherein the at least one API is further configured to connect each of the plurality of computing resources with a dynamic resource assembly system configured to assemble functionality associated with the computing resources into at least one computing resource set. In various embodiments, the API is configured to receive a resource access request associated with a selected computing resource set of the at least one computing resource set, and wherein the API is configured to direct the resource access request to the dynamic resource assembly system. In various embodiments, the API is configured to receive an indication of an update from one of the plurality of computing resources; and transmit the indication of the update to the dynamic resource assembly system. In various embodiments, the API is configured to: receive access privilege data associated with a selected computing resource set of the at least one computing resource set, identify a plurality of constituent computing resources associated with the access privilege data, divide the access privilege data into a plurality of portions of access privilege data associated with respective ones of the plurality of constituent computing resources, and transmit the plurality of portions of access privilege data to the respective ones of the plurality of constituent computing resources. In various embodiments, the API is further configured to receive an indication of a new computing resource, and transmit an onboarding data structure to the dynamic resource assembly system. In various embodiments, the API is further configured to connect each of the plurality of computing resources and the dynamic resource assembly system with an operator terminal configured to modify one or more databases associated with one or more of the plurality of computing resources or the dynamic resource assembly system. In various embodiments, the computer coded instructions are further configured to, when executed by the at least one processor, update the API. In various embodiments, updating the API comprises adding one or more external API calls. In various embodiments, updating the API comprises modifying one or more external API calls. In various embodiments, the API is further configured to receive a message intended for multiple user devices and transmit the message to each of the multiple user devices. In various embodiments, the API is the only gateway to the system for receiving resource access requests associated with the at least one computing resource set.

In various embodiments, a method may be provided for generating at least one application programming interface (API). The at least one API may define a gateway configured to connect a plurality of devices to a plurality of computing resources. The at least one API may include an experience layer; and a system layer; wherein the experience layer is configured to receive one or more external API calls and transform the one or more external API calls into one or more internal API calls directly or indirectly to the system layer; wherein the system layer is configured to receive the one or more internal API calls and transmit computer executable instructions to execute one or more functions at the plurality of computing resources; wherein the at least one API is further configured to connect each of the plurality of computing resources with a dynamic resource assembly system configured to assemble functionality associated with the computing resources into at least one computing resource set. In various embodiments, the API is configured to receive a resource access request associated with a selected computing resource set of the at least one computing resource set, and the API is configured to direct the resource access request to the dynamic resource assembly system. In various embodiments, the API is configured to receive an indication of an update from one of the plurality of computing resources; and transmit the indication of the update to the dynamic resource assembly system. In various embodiments, the API is configured to: receive access privilege data associated with a selected computing resource set of the at least one computing resource set, identify a plurality of constituent computing resources associated with the access privilege data, divide the access privilege data into a plurality of portions of access privilege data associated with respective ones of the plurality of constituent computing resources, and transmit the plurality of portions of access privilege data to the respective ones of the plurality of constituent computing resources. In various embodiments, the API is further configured to receive an indication of a new computing resource, and transmit an onboarding data structure to the dynamic resource assembly system. In various embodiments, the API is further configured to connect each of the plurality of computing resources and the dynamic resource assembly system with an operator terminal configured to modify one or more databases associated with one or more of the plurality of computing resources or the dynamic resource assembly system. In various embodiments, the method may include updating the API. In various embodiments, updating the API comprises adding one or more external API calls. In various embodiments, updating the API comprises modifying one or more external API calls. In various embodiments, the API is further configured to receive a message intended for multiple user devices and transmit the message to each of the multiple user devices. In various embodiments, the API is the only gateway to the system for receiving resource access requests associated with the at least one computing resource set.

Various embodiments may include a system comprising at least one processor, and at least one memory associated with the processor having computer coded instructions configured to, when executed by the at least one processor, cause the system to: retrieve a plurality of computing resource set data structures associated with a plurality of computing resource sets associated with a dynamic resource assembly system, wherein the plurality of computing resource set data structures comprise a plurality of identifiers associated with a plurality of constituent computing resources of each of the plurality of computing resource sets; cause rendering of a computing resource set registration interface, the computing resource set registration interface configured to receive an input selecting a selected computing resource set of the plurality of computing resource sets and/or a selected plurality of the constituent computing resources to define the selected computing resource set; generate a resource access request based on the input received via the computing resource set registration interface, the resource access request comprising a resource access request data structure comprising an indication of the selected computing resource set and first account data associated with a first account; transmit the resource access request to an application programming interface (API) to cause association of the first account with the selected computing resource set, including generating access privilege data associated with each of the selected plurality of the constituent computing resources of the selected computing resource set for the first account; cause rendering of a renderable confirmation asset on the computing resource set registration interface, the renderable confirmation asset configured to indicate the generation of the access privilege data. In various embodiments, the computing resource set registration interface is rendered according to a channel instruction set to visually represent the computing resource set registration interface as being associated with a particular channel. In various embodiments, the computing resource set registration interface is configured to present a subset of the plurality of computing resource sets and/or the plurality of the constituent computing resources to the user based on the channel.

Various embodiments may include a method comprising: retrieving a plurality of computing resource set data structures associated with a plurality of computing resource sets associated with a dynamic resource assembly system, wherein the plurality of computing resource set data structures comprise a plurality of identifiers associated with a plurality of constituent computing resources of each of the plurality of computing resource sets; causing rendering of a computing resource set registration interface, the computing resource set registration interface configured to receive an input selecting a selected computing resource set of the plurality of computing resource sets and/or a selected plurality of the constituent computing resources to define the selected computing resource set; generating a resource access request based on the input received via the computing resource set registration interface, the resource access request comprising a resource access request data structure comprising an indication of the selected computing resource set and first account data associated with a first account; transmitting the resource access request to an application programming interface (API) to cause association of the first account with the selected computing resource set, including generating access privilege data associated with each of the selected plurality of the constituent computing resources of the selected computing resource set for the first account; causing rendering of a renderable confirmation asset on the computing resource set registration interface, the renderable confirmation asset configured to indicate the generation of the access privilege data. In various embodiments, the computing resource set registration interface is rendered according to a channel instruction set to visually represent the computing resource set registration interface as being associated with a particular channel. In various embodiments, the computing resource set registration interface is configured to present a subset of the plurality of computing resource sets and/or the plurality of the constituent computing resources to the user based on the channel.

Various embodiments may include a computer program product comprising a non-transitory computer-readable storage medium storing computer program code that, when executed by at least one apparatus, causes the apparatus to: retrieve a plurality of computing resource set data structures associated with a plurality of computing resource sets associated with a dynamic resource assembly system, wherein the plurality of computing resource set data structures comprise a plurality of identifiers associated with a plurality of constituent computing resources of each of the plurality of computing resource sets; cause rendering of a computing resource set registration interface, the computing resource set registration interface configured to receive an input selecting a selected computing resource set of the plurality of computing resource sets and/or a selected plurality of the constituent computing resources to define the selected computing resource set; generate a resource access request based on the input received via the computing resource set registration interface, the resource access request comprising a resource access request data structure comprising an indication of the selected computing resource set and first account data associated with a first account; transmit the resource access request to an application programming interface (API) to cause association of the first account with the selected computing resource set, including generating access privilege data associated with each of the selected plurality of the constituent computing resources of the selected computing resource set for the first account; cause rendering of a renderable confirmation asset on the computing resource set registration interface, the renderable confirmation asset configured to indicate the generation of the access privilege data. In various embodiments, the computing resource set registration interface is rendered according to a channel instruction set to visually represent the computing resource set registration interface as being associated with a particular channel. In various embodiments, the computing resource set registration interface is configured to present a subset of the plurality of computing resource sets and/or the plurality of the constituent computing resources to the user based on the channel.

Various embodiments may include a coordinated electronic messaging system. The system may include at least one processor, and at least one memory associated with the processor having computer coded instructions configured to, when executed by the at least one processor, cause the system to: search access privilege data associated with a plurality of user accounts and a plurality of independent computing resources for at least one common attribute asset; identify a first group of user accounts of the plurality of user accounts sharing the at least one common attribute asset; identify at least one communication mode associated with each user account of the first group of user accounts, the first group of user accounts being associated with a plurality of devices; generate at least one electronic message to each user account based on the at least one common attribute asset; and transmit the at least one electronic message to each user account of the first group of user accounts via the at least one communication mode, such that a plurality of electronic messages are transmitted to the first group of user accounts via a plurality of communication modes, the plurality of communication modes comprising the plurality of devices. In various embodiments, the at least one common attribute asset comprises a common independent computing resource. In various embodiments, the at least one electronic message comprises an indication of an update to at least one of the plurality independent computing resources sharing the at least one common attribute asset. In various embodiments, the system may be configured to receive an updated resource access request from at least a portion of the first group of user accounts, the updated resource access request being associated with the at least one of the plurality independent computing resources. In various embodiments, the at least one electronic message comprises an indication of a discontinuation of at least one of the plurality independent computing resources sharing the at least one common attribute asset. In various embodiments, the at least one common attribute asset comprises a common channel. In various embodiments, the first group of user accounts span a plurality of channels. In various embodiments, the at least one electronic message comprises a credit indication identifying a token data structure assigned to each user account. In various embodiments, the at least one common attribute asset comprises a computing resource set comprising at least a portion of the plurality of independent computing resources. In various embodiments, each of the first group of user accounts is enrolled in at least one computing resource set comprising at least a portion of the plurality of independent computing resources. In various embodiments, at least two of the first group of user accounts are not enrolled in the same computing resource set. In various embodiments, the at least two of the first group of user accounts share a common independent computing resource. In various embodiments, the plurality of devices comprise at least one of a mobile phone, a terminal, a personal computer, and a merchant device.

Various embodiments may include a method for a coordinated electronic messaging system. The method may include searching access privilege data associated with a plurality of user accounts and a plurality of independent computing resources for at least one common attribute asset; identifying a first group of user accounts of the plurality of user accounts sharing the at least one common attribute asset; identifying at least one communication mode associated with each user account of the first group of user accounts, the first group of user accounts being associated with a plurality of devices; generating at least one electronic message to each user account based on the at least one common attribute asset; and transmitting the at least one electronic message to each user account of the first group of user accounts via the at least one communication mode, such that a plurality of electronic messages are transmitted to the first group of user accounts via a plurality of communication modes, the plurality of communication modes comprising the plurality of devices. In various embodiments, the at least one common attribute asset comprises a common independent computing resource. In various embodiments, the at least one electronic message comprises an indication of an update to at least one of the plurality independent computing resources sharing the at least one common attribute asset. In various embodiments, the method may include receiving an updated resource access request from at least a portion of the first group of user accounts, the updated resource access request being associated with the at least one of the plurality independent computing resources. In various embodiments, the at least one electronic message comprises an indication of a discontinuation of at least one of the plurality independent computing resources sharing the at least one common attribute asset. In various embodiments, the at least one common attribute asset comprises a common channel. In various embodiments, the first group of user accounts span a plurality of channels. In various embodiments, the at least one electronic message comprises a credit indication identifying a token data structure assigned to each user account. In various embodiments, the at least one common attribute asset comprises a computing resource set comprising at least a portion of the plurality of independent computing resources. In various embodiments, each of the first group of user accounts is enrolled in at least one computing resource set comprising at least a portion of the plurality of independent computing resources. In various embodiments, at least two of the first group of user accounts are not enrolled in the same computing resource set. In various embodiments, the at least two of the first group of user accounts share a common independent computing resource. In various embodiments, the plurality of devices comprise at least one of a mobile phone, a terminal, a personal computer, and a merchant device.

Various embodiments may include a computer program product for a coordinated electronic messaging system. In various embodiments, the computer program product may include a non-transitory computer-readable storage medium storing computer program code that, when executed by at least one apparatus, causes the apparatus to: search access privilege data associated with a plurality of user accounts and a plurality of independent computing resources for at least one common attribute asset; identify a first group of user accounts of the plurality of user accounts sharing the at least one common attribute asset; identify at least one communication mode associated with each user account of the first group of user accounts, the first group of user accounts being associated with a plurality of devices; generate at least one electronic message to each user account based on the at least one common attribute asset; and transmit the at least one electronic message to each user account of the first group of user accounts via the at least one communication mode, such that a plurality of electronic messages are transmitted to the first group of user accounts via a plurality of communication modes, the plurality of communication modes comprising the plurality of devices. In various embodiments, the at least one common attribute asset comprises a common independent computing resource. In various embodiments, the at least one electronic message comprises an indication of an update to at least one of the plurality independent computing resources sharing the at least one common attribute asset. In various embodiments, the computer program code, when executed by the apparatus, further causes the apparatus to receive an updated resource access request from at least a portion of the first group of user accounts, the updated resource access request being associated with the at least one of the plurality independent computing resources. In various embodiments, the at least one electronic message comprises an indication of a discontinuation of at least one of the plurality independent computing resources sharing the at least one common attribute asset. In various embodiments, the at least one common attribute asset comprises a common channel. In various embodiments, the first group of user accounts span a plurality of channels. In various embodiments, the at least one electronic message comprises a credit indication identifying a token data structure assigned to each user account. In various embodiments, the at least one common attribute asset comprises a computing resource set comprising at least a portion of the plurality of independent computing resources. In various embodiments, each of the first group of user accounts is enrolled in at least one computing resource set comprising at least a portion of the plurality of independent computing resources. In various embodiments, at least two of the first group of user accounts are not enrolled in the same computing resource set. In various embodiments, the at least two of the first group of user accounts share a common independent computing resource. In various embodiments, the plurality of devices comprise at least one of a mobile phone, a terminal, a personal computer, and a merchant device.

BRIEF DESCRIPTION OF THE DRAWINGS

Figure 1:
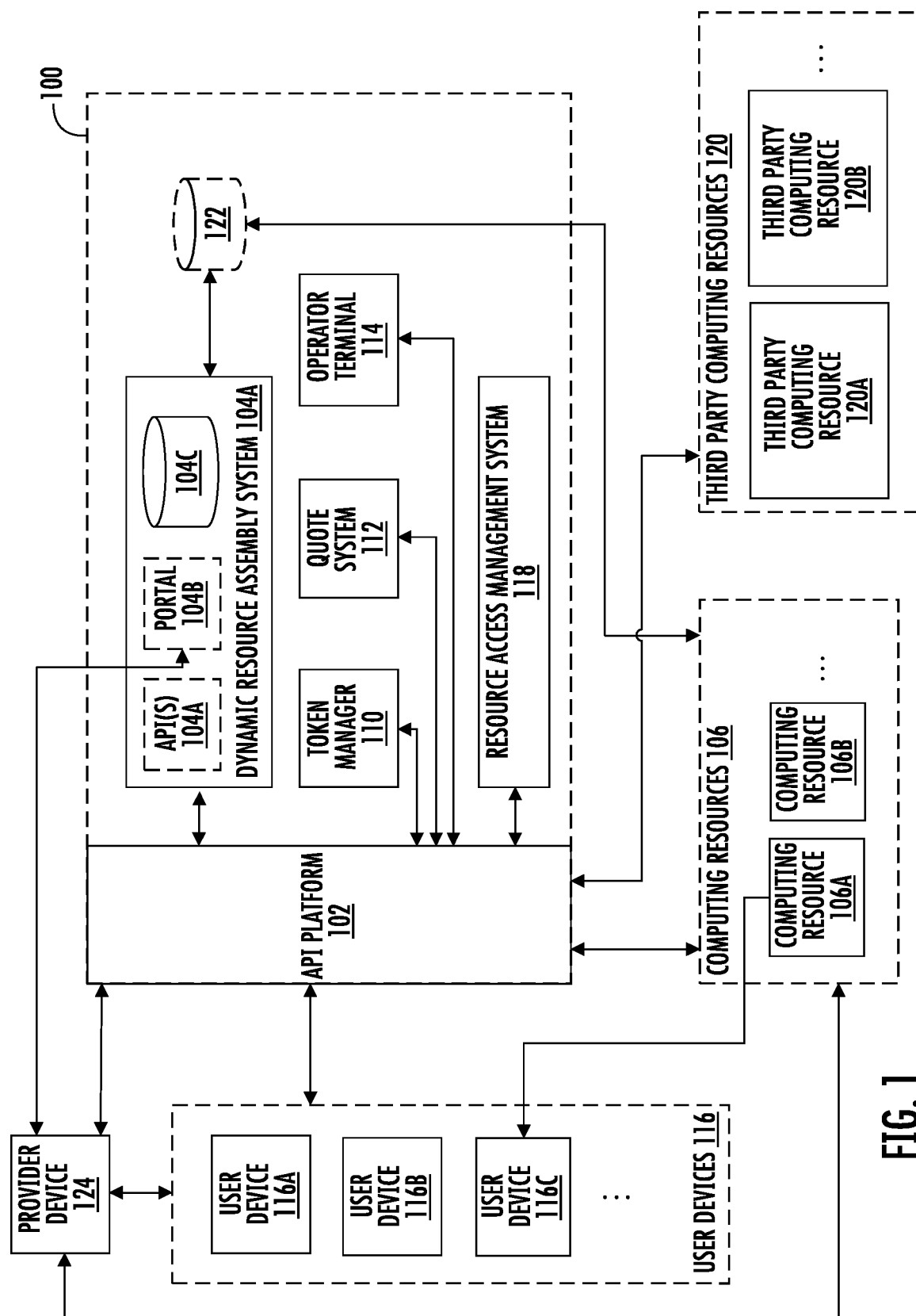
Figure 2:
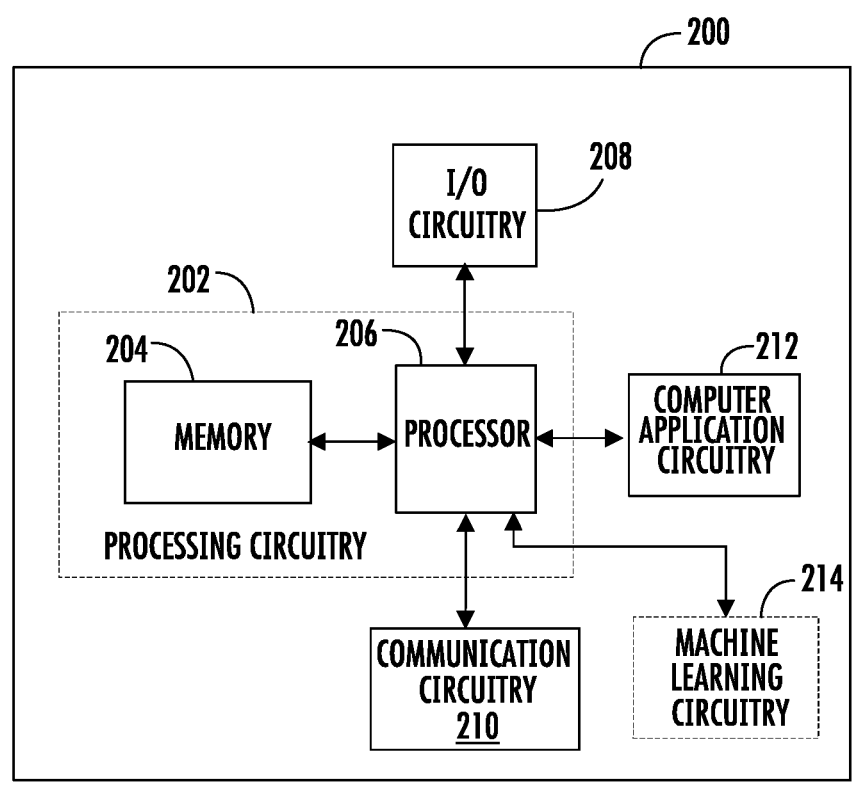
Figure 3:
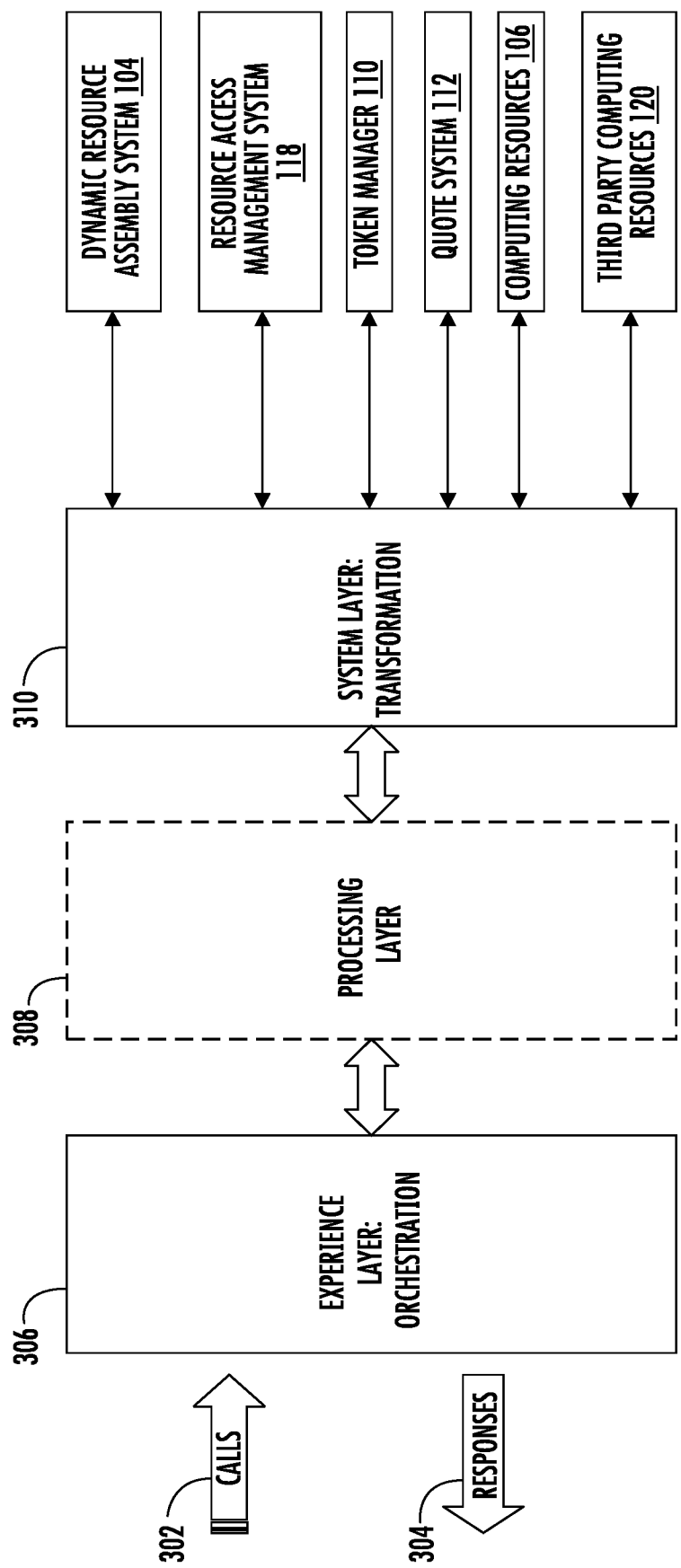
Figure 4:
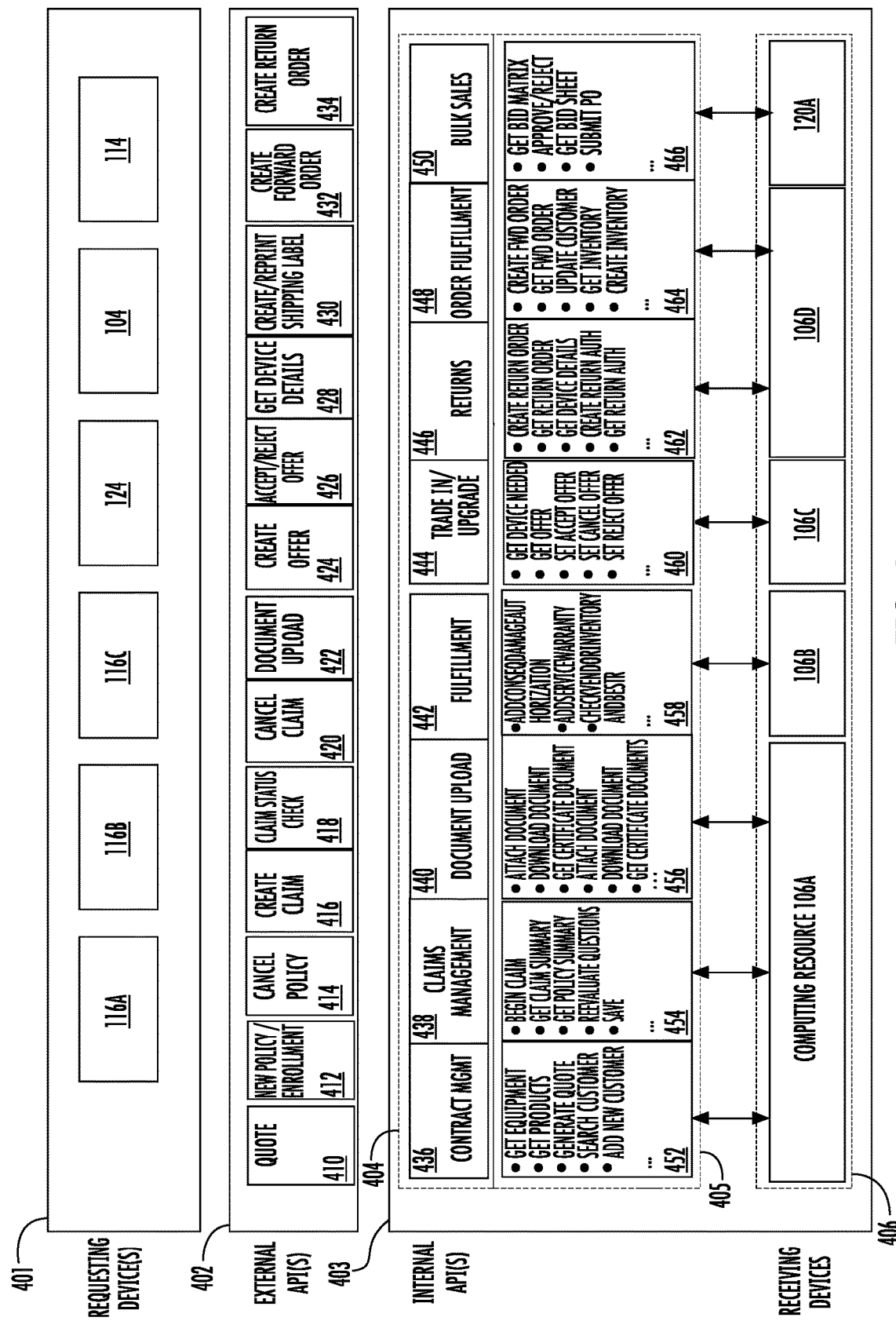
Figure 5:
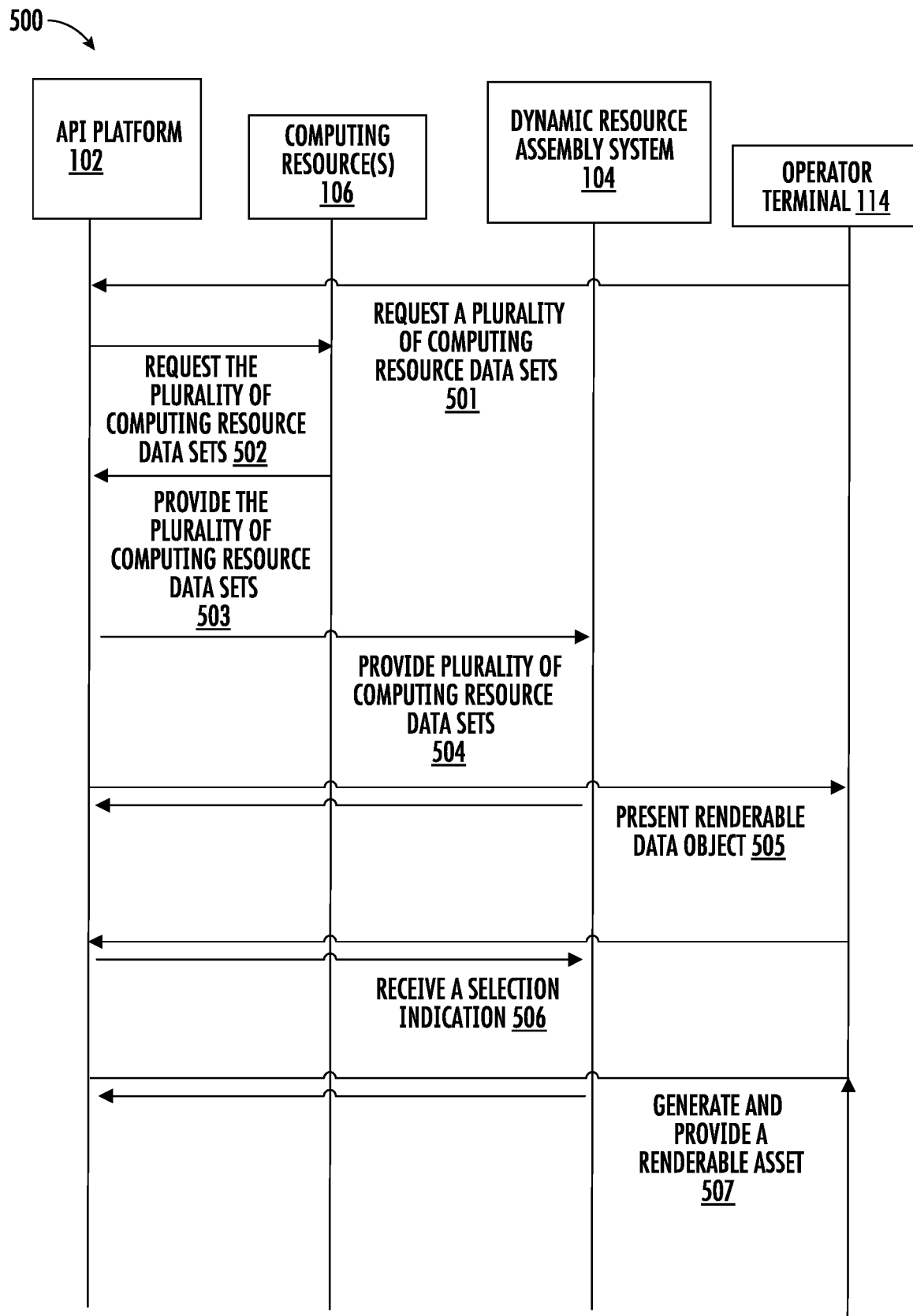
Figure 6A:
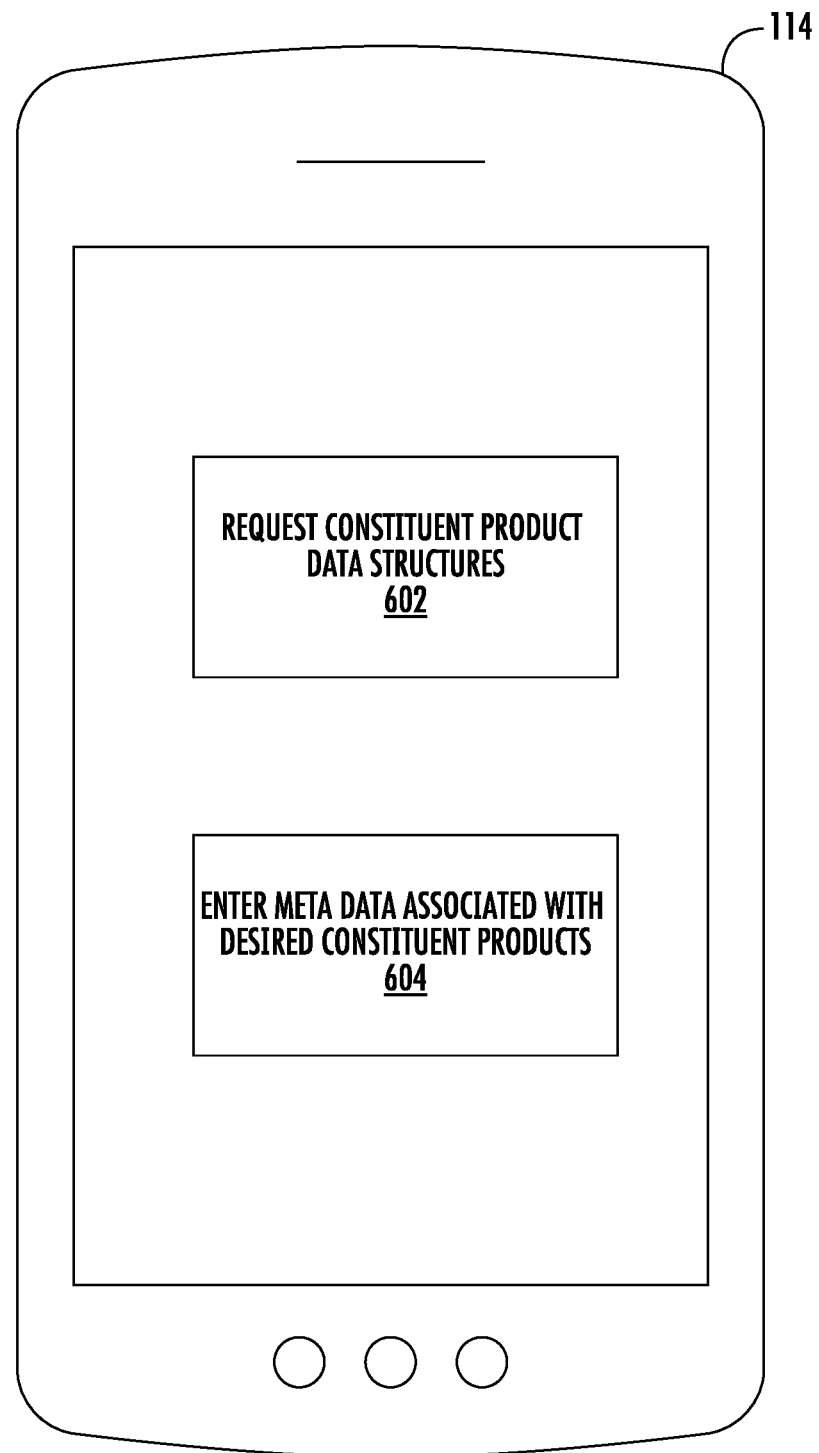
Figure 6B:
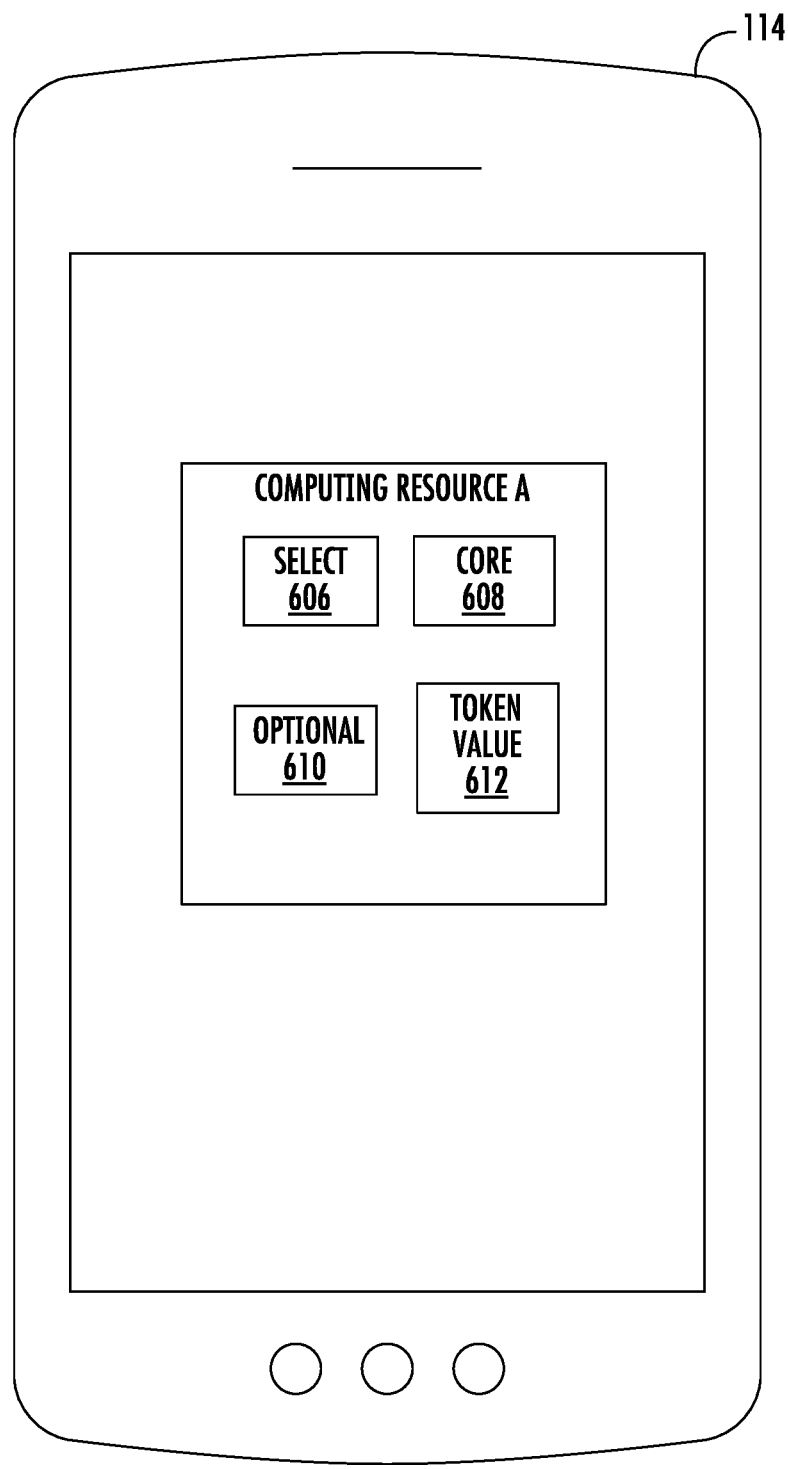
Figure 6C:
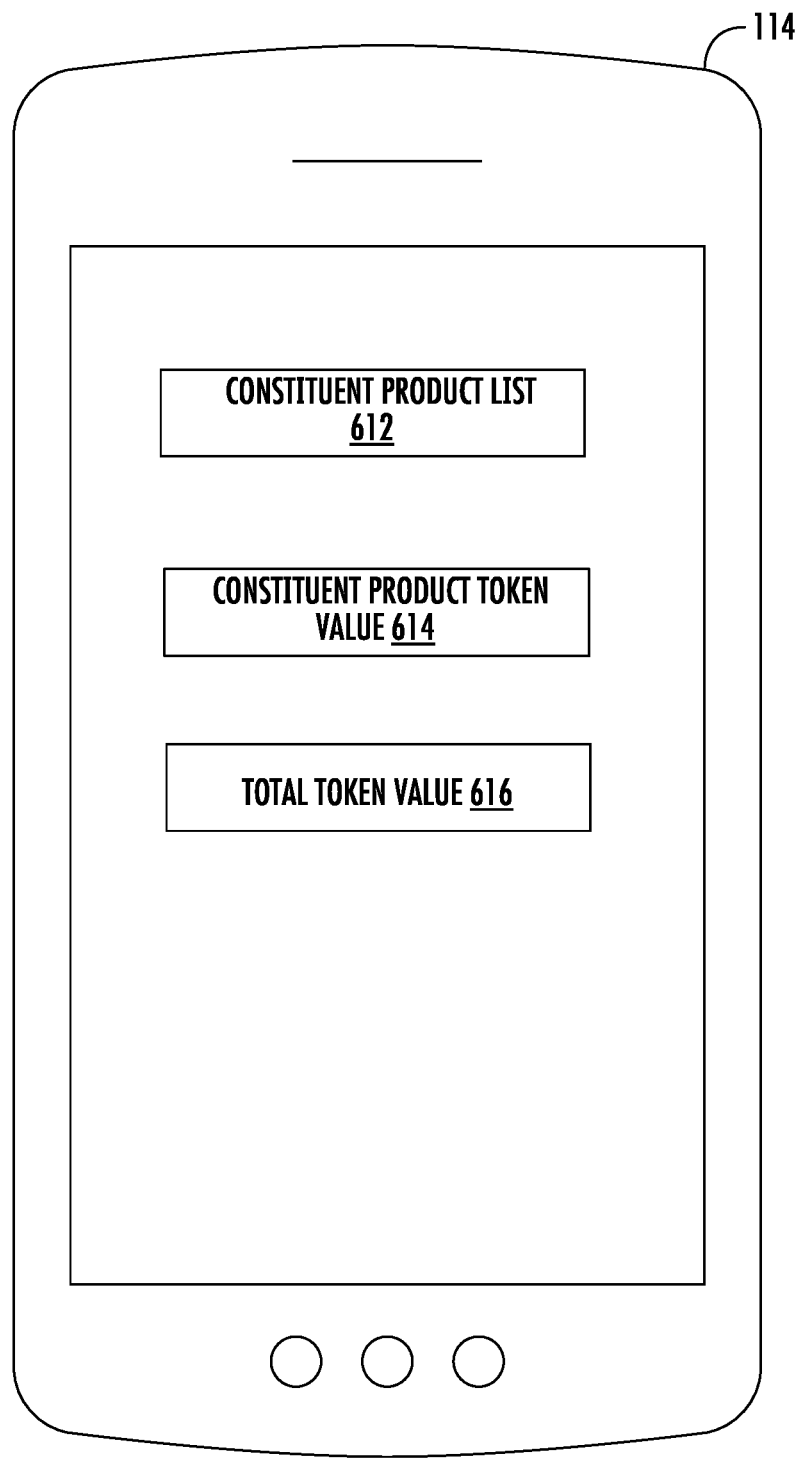
Figure 7:
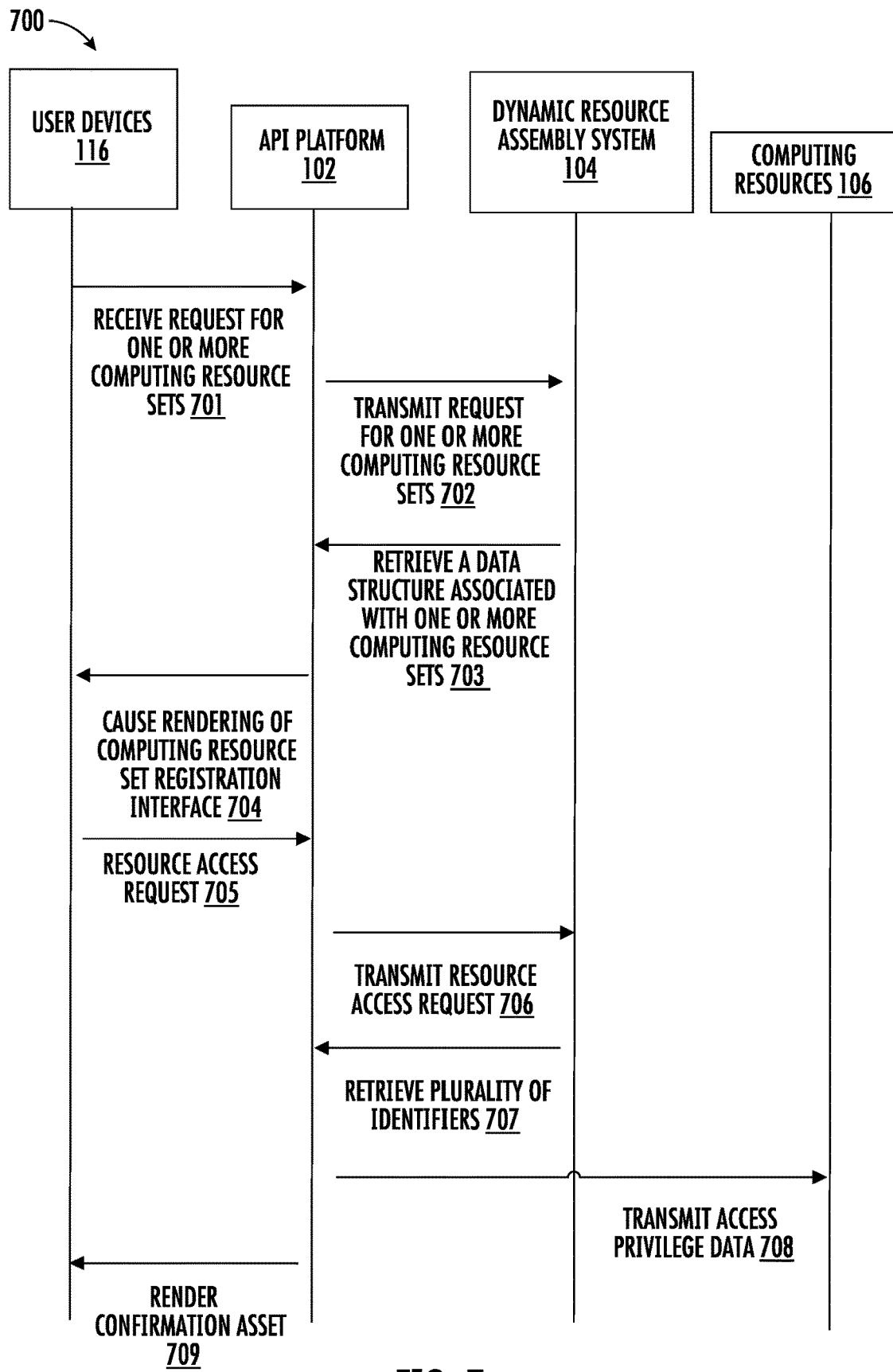
Figure 8A:
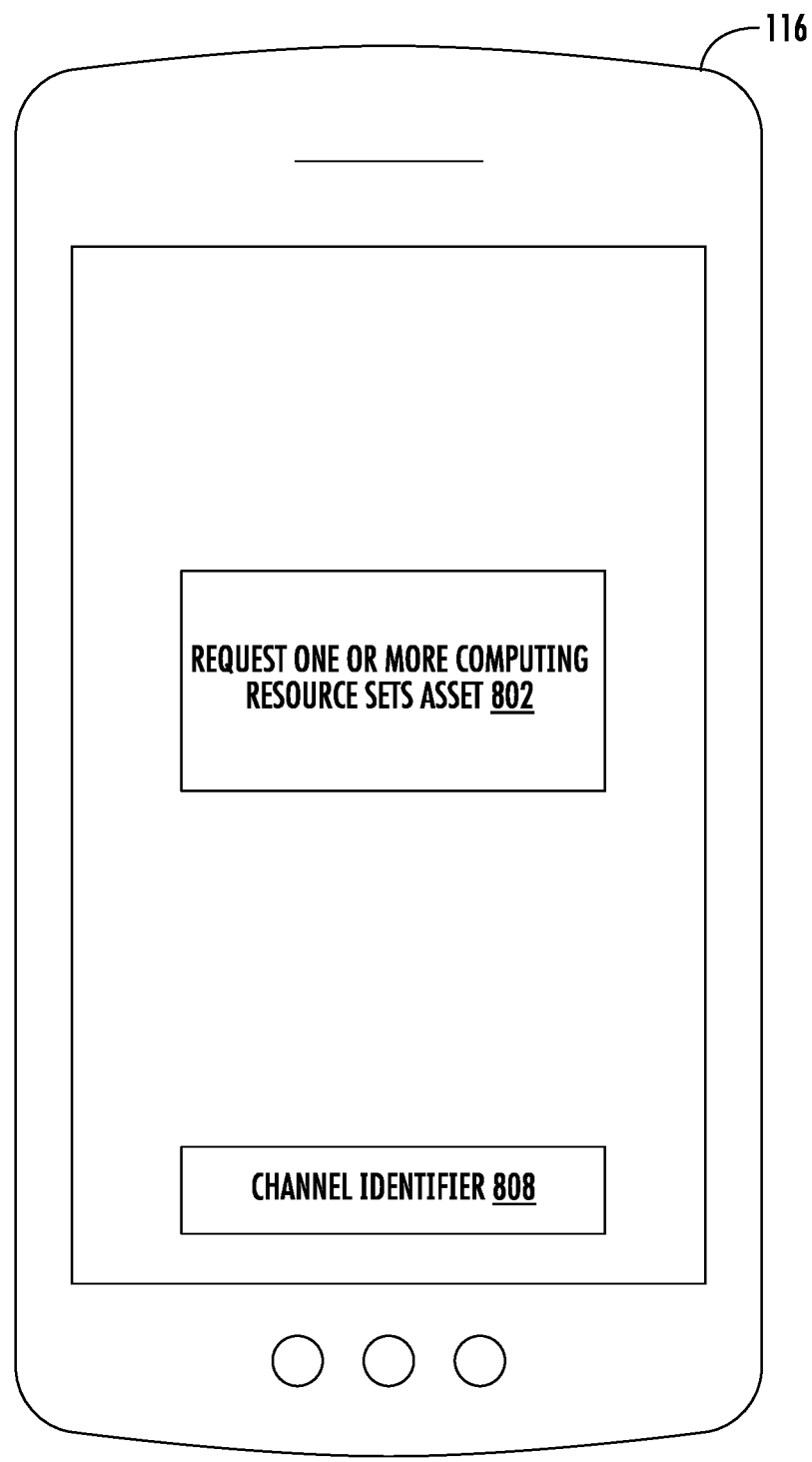
Figure 8B:
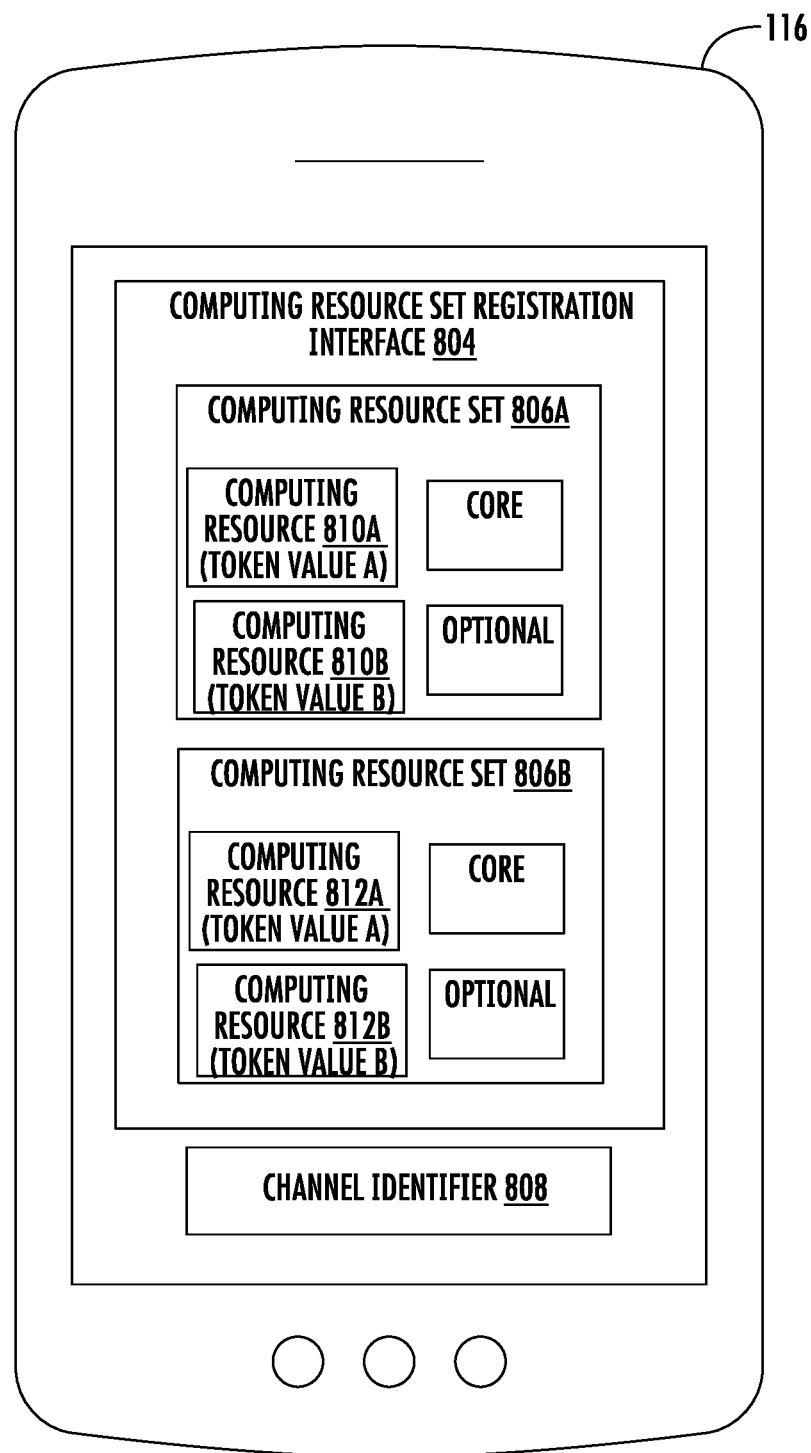
Figure 8C:
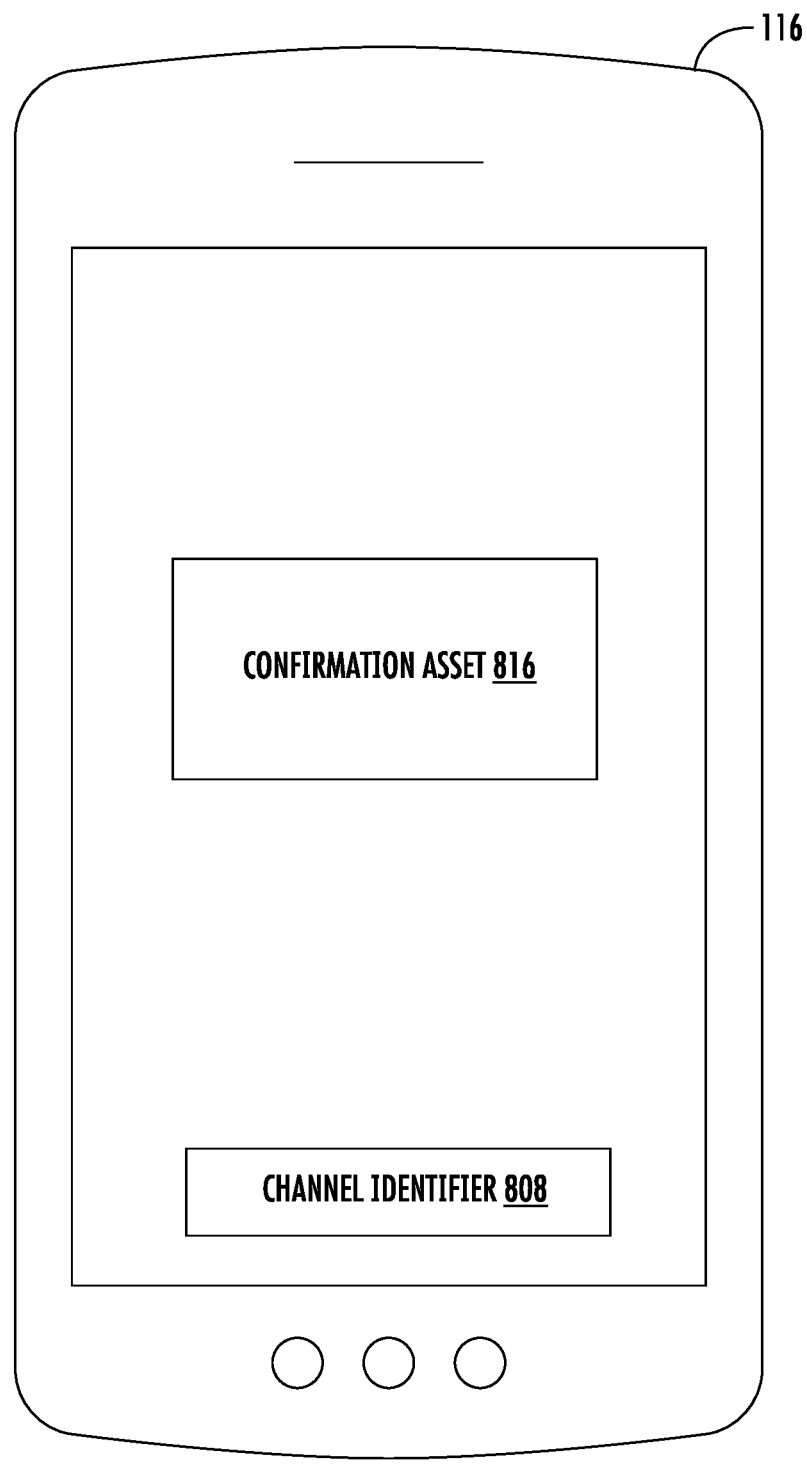
Figure 9:
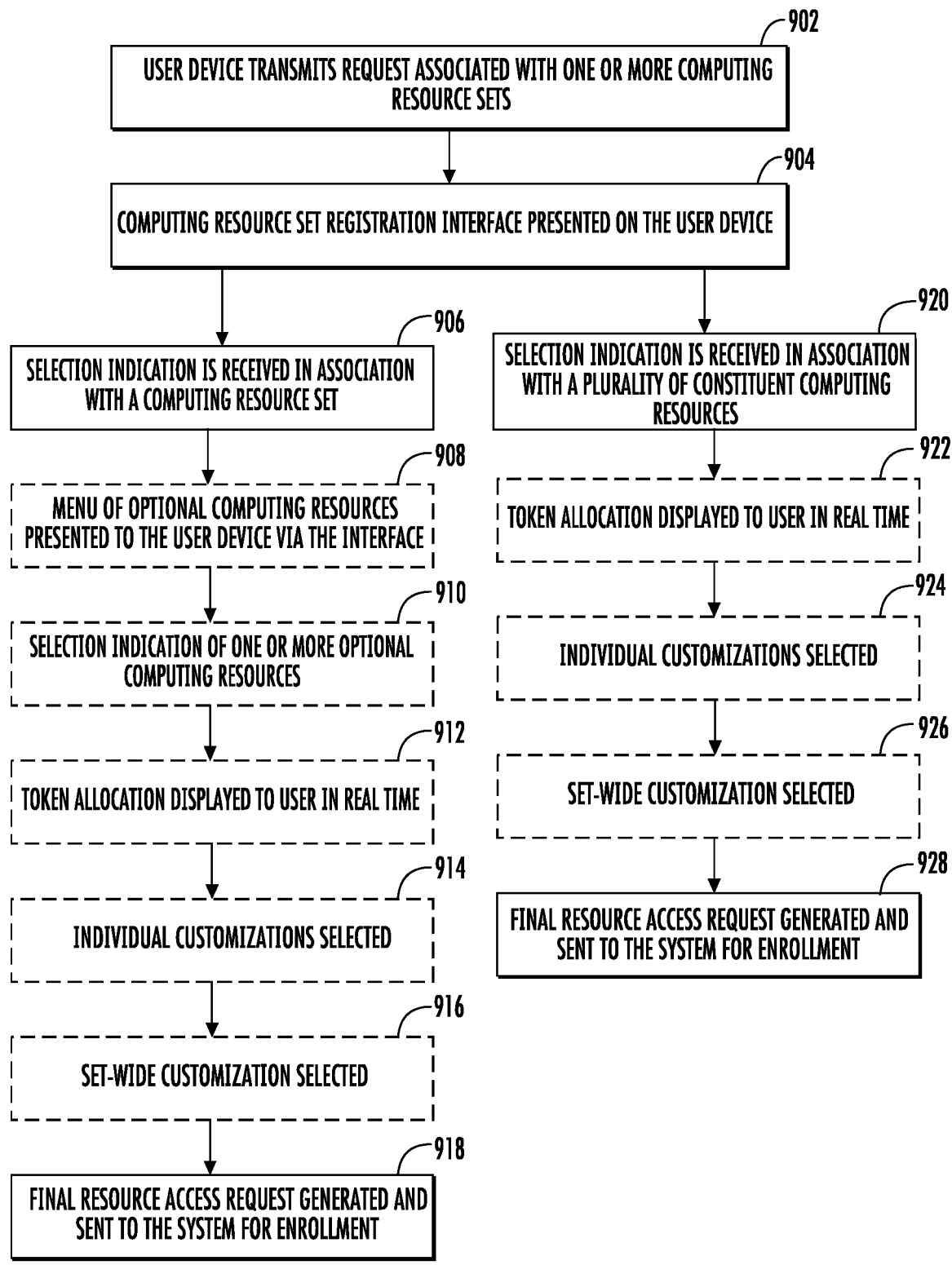
Figure 11:
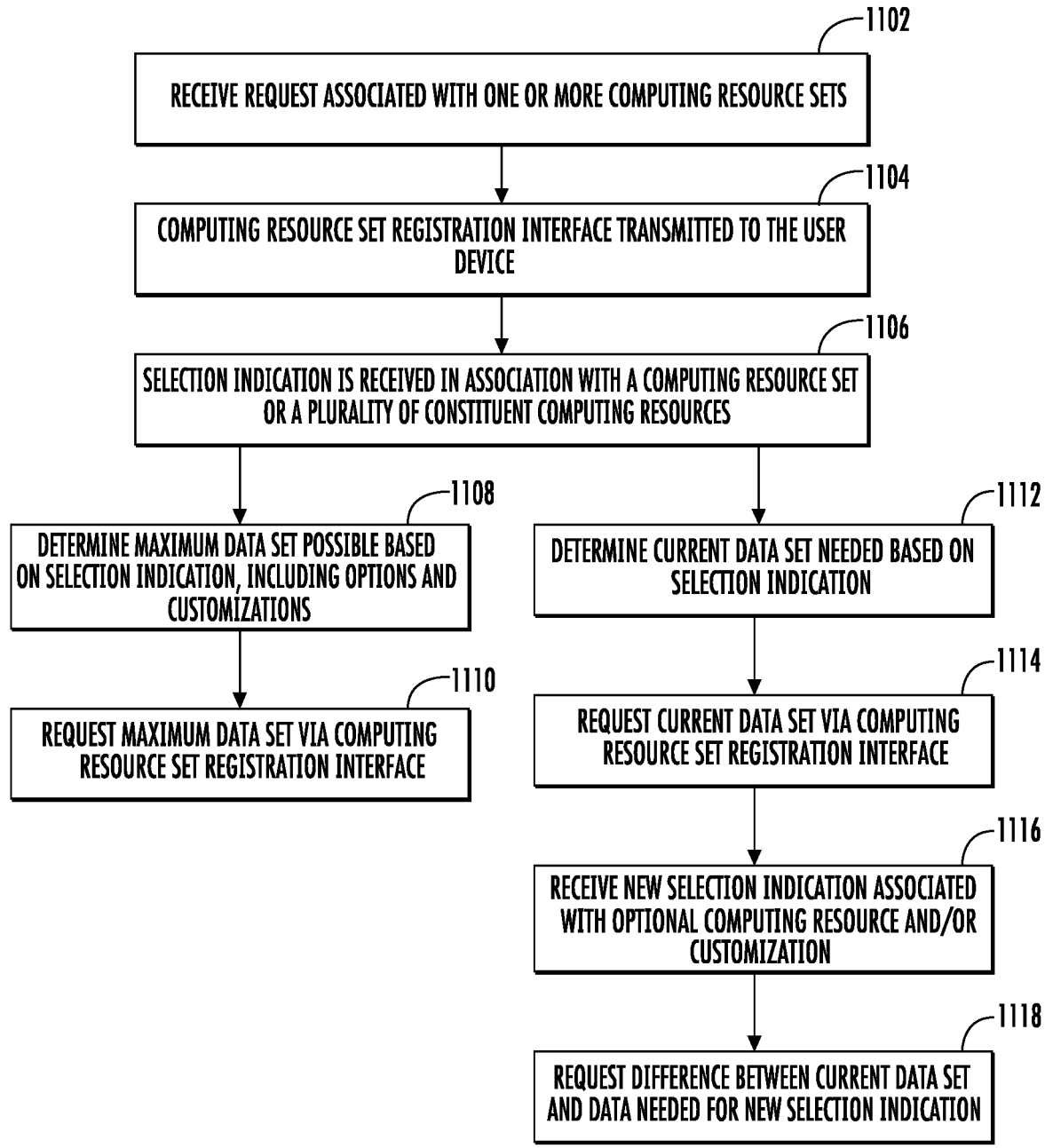
Figure 12:
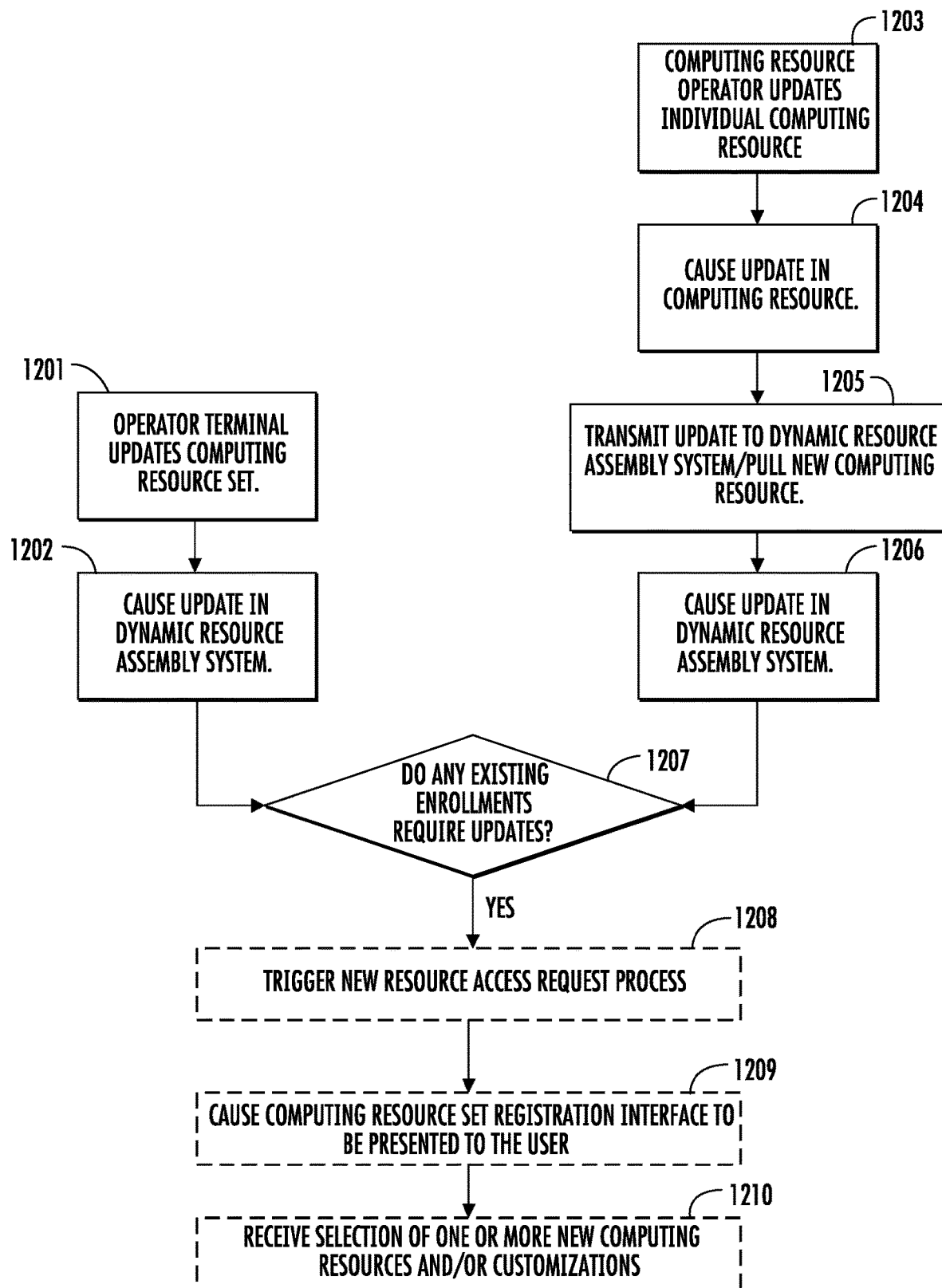
Figure 13:
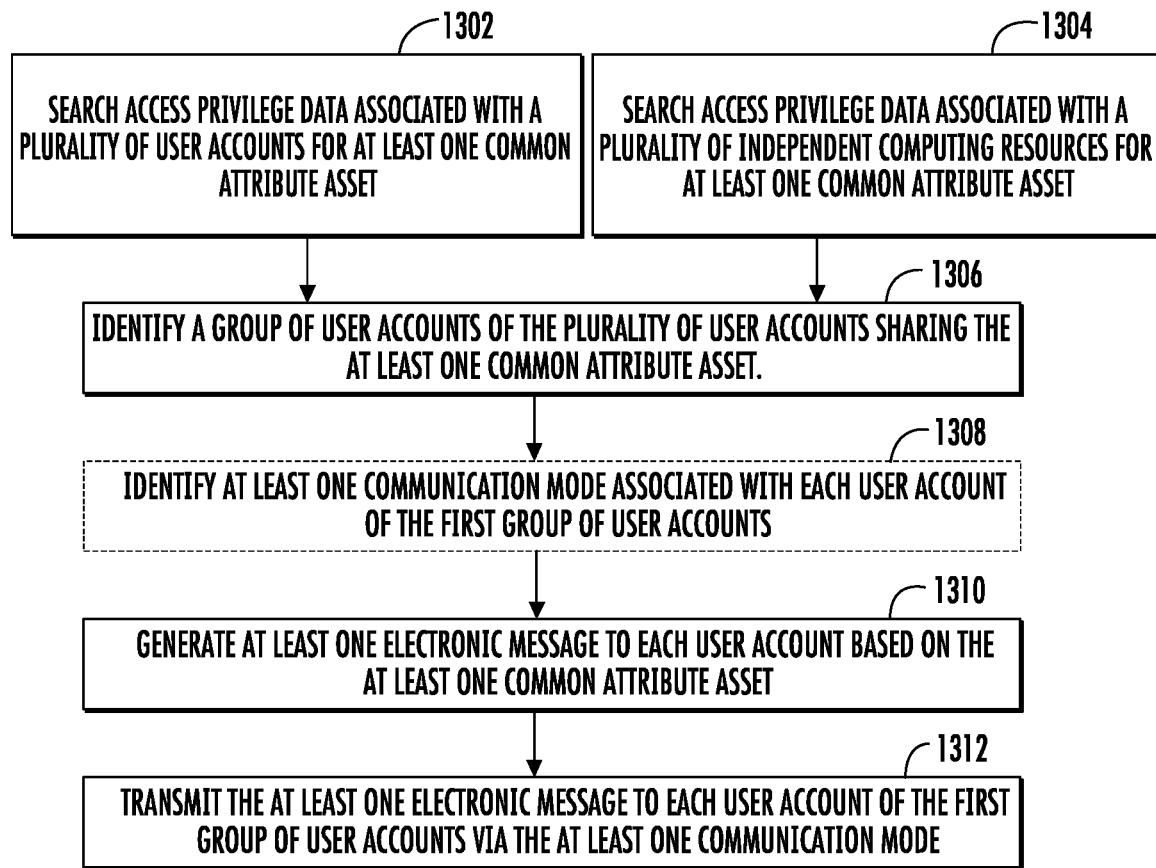

Having thus described certain embodiments of the present disclosure in general terms, reference will now be made to the accompanying drawings, which are not necessarily drawn to scale, and wherein:

FIG. 1 illustrates a block diagram of a provider system, computing resources, and various devices that may be specifically configured in accordance with various embodiments of the present disclosure;

FIG. 2 illustrates a block diagram of a computing device that may be specifically configured in accordance with various embodiments of the present disclosure;

FIG. 3 illustrates an example data flow of an API in accordance with various embodiments of the present disclosure;

FIG. 4 illustrates an example data structure of an API in accordance with various embodiments of the present disclosure;

FIG. 5 illustrates a lane diagram showing functionality of various components in accordance with various embodiments of the present disclosure;

FIGS. 6A-6C illustrate example devices and graphical user interfaces associated with generating a computing resource set in accordance with various embodiments of the present disclosure;

FIG. 7 illustrates a lane diagram showing functionality of various components in accordance with various embodiments of the present disclosure;

FIGS. 8A-8C illustrate example devices and graphical user interfaces associated with resource access management in accordance with various embodiments of the present disclosure;

FIG. 9 illustrates a flowchart depicting operations performed in accordance with various embodiments of the present disclosure;

FIGS. 10A-10H illustrate graphical user interfaces in accordance with various embodiments of the present disclosure;

FIG. 11 illustrates a flowchart depicting operations performed in accordance with various embodiments of the present disclosure;

FIG. 12 illustrates a flowchart depicting operations performed in accordance with various embodiments of the present disclosure; and FIG. 13 illustrates a flowchart depicting operations performed in accordance with various embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or an "exemplary embodiment" is not necessarily preferred or advantageous over other implementations.

Embodiments of the present disclosure now will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Various products and services facilitated by hardware and/or software systems may require a variety of backend and frontend infrastructure to maintain and support. Each of these products and services may be independent from and usable separately from each other, and they may require separate access and enrollment processes each facilitated by the front- and backend systems that support each respective product and service. The products and services may also be supported by one or more separate development teams running separate hardware and/or software systems that may not be configured to communicate with each other. Due, at least in part, to their independence, the development cycles, functionalities, values, billing processes, communication infrastructure, and other features of these products and services may also be necessarily separate and may not be comparable or interoperable. A user must thereby separately enroll and authenticate with each of the products and services. Combinations of the products and services, if any, may require manual, bespoke hardcoding and may be cumbersome and time-consuming to create and modify, while also reducing the usefulness of the combination to the end user.

The present disclosure relates generally to systems, methods, apparatuses, and computer program product for dynamic computing resource set generation and access management. Various embodiments described herein include systems and API infrastructures configured to dynamically generate computing resource sets that may include multiple independent computing resources. An end user may access, enroll in, and authenticate an account for the computing resource set via the systems described herein, which may allow the user to receive access to many separate computing resources corresponding to various products and services via a single, centralized electronic transaction with the systems and APIs described herein.

The systems may include intuitive graphical user interfaces, databases, and APIs to enable one or more provider(s) of the computing resources to create and offer computing resource set(s) comprising one or more computing resources in a centralized, modular, and intuitive manner. The API platform described herein may function as a single gateway operable for all clients across multiple devices, channels, and the like to facilitate consistency and modularity for the system. The API platform may expose intuitive and logical calls to external devices to streamline interoperability with other devices, while the API platform internally facilitates translating the external calls into API calls to the respective constituent computing resources.

The provider(s) may modify, add, remove, and/or exchange computing resources from the system and one or more various computing resource sets with little to no impact on the other computing resources in the system. Moreover, the various embodiments of the present disclosure may facilitate the provider centralizing assembly of, customization of, and access to the computing resource sets without affecting the underlying computing resources or requiring modification by the separate development teams responsible for the computing resources. In some instances, the individual computing resources may be initially modified to include setup and resource access API integrations with the centralized system, after which the centralized system can dynamically retrieve information and functionality associated with the individual computing resources. The various computing resources may interact consistently with the API platform and systems of the centralized system, thereby reducing the frontend development load on the individual computing resources by decoupling the set assembly, access management, and related functions from the computing resource development and related functions. In some embodiments, a uniform set of governance and security standards can be applied across all channels and clients for more secure, robust, and lean operability. The centralized system may also allow for rapid versioning of the APIs to iterate faster when the needed changes are identified and to manage the impact of the change and also protecting the clients from breaking their existing integrations. In some embodiments, changes may happen entirely or primarily internally (e.g., substituting one like computing resource for another, or upgrading the underlying servers and computer systems of a given computing resource, with little to no impact on the end user). In various embodiments, data, including customer data, may be protected with typical data privacy security standards to comply with PII requirements.

In various embodiments, the end users may engage in a single resource access management process whereby one or more sets or "bundles" of independent, constituent computing resources are presented via a graphical user interface, and the user selects and customizes each of the constituent computing resources via a single process for the entire set. In this manner, functions such as billing, promotions, and messaging may be centralized without necessarily requiring separate functions executing on each of the constituent computing resources. The API platform described herein may then facilitate the resource access management process and distribute access privilege data to the respective backend computing resources with no further input required from the user or the backend computing resources. Following this initial enrollment, the user and/or system may dynamically add, remove, or exchange at least some individual computing resources without affecting delivery of or access to the remaining resources in the set. Computing resources with separate authentication and validation requirements may be integrated with the user account associated with the centralized enrollment so that the user may access each of the constituent computing resources as if separately enrolled in each using the credentials assigned to the centralized system, even in situations where a third party is providing one or more of the constituent computing resources. Likewise, the centralized systems and APIs can seamlessly integrate functionally with third parties (e.g., pushing notifications to a third-party partner, such as a third party installer of a ring doorbell that a customer may be entitled to) while appearing seamless and without requiring additional burden or touch points for the end user.

In some embodiments, API endpoint management may be used for each distinct distribution channel (e.g., merchant storefront, provider webpage, third party branded webpage, mobile app, etc.) to facilitate a unique correlation between the distribution channel and the product(s) being offered in that channel. The backend systems (e.g., computing resources) may have a distinct configuration by channel so the back end systems can easily distinguish between different products and distinguish between different distribution channels for each product. For example, if a particular product or feature is being distributed through five different distribution channels, the backend systems will have five unique identifiers configured to allow for distinction and any customer experience (CX) and/or functionality-related items that may be specific one or more distribution channels. For example, different renderable data objects and/or different constituent computing resources, or subsets or customizations thereof, may be unique to a particular channel or subset of channels and accessed via the code associated with the channel.

In some embodiments, user login credentials may be synchronized across multiple platforms associated with the resource access management system and/or the constituent computing resources and any other associated systems so that a user will be able to enroll and establish credentials via, for example, a webpage and may be immediately authorized to utilize the same credentials for signing into a companion mobile app and vice versa. The user login credentials may be associated with a single user account configured to be used, for example, for all resource access management and computing resource related functions (e.g. billing, adding/removing computing resources). In some embodiments, such as some third party constituent computing resources, a user may be prompted to create a new centralized account and/or new credentials in response to initiation of a resource access management process with the provider system and/or with one or more individual computing resources, the latter of which may be triggered by an example provider system transmitting an enrollment request to the third party constituent computing resource.

The various embodiments described herein may achieve numerous improved efficiencies over separate, decentralized computing resources. Such improvements may include, but are not limited to; reduced processor loads and server requirements by centralizing numerous previously distributed and duplicative functions; centralized messaging services; swappable, modular computing resources that cause little to no downtime for any other computing resource when modified, added, or removed; a holistic development environment facilitating improved machine learning model training and improved delivery of services to the user; reduced transaction time for both providers and end users; rapidly deployable computing resource sets and reduced set-wide development time with minimal to no effect on the development cycles of the underlying computing resources; more rapid computing resource development time with set-generation centralized in the primary system; improved customer experience; higher service performance for the user with unique, customizable combinations of distinct computing resources; and the like. The various embodiments discussed herein may also present a unified, consistent token system for comparison of the computing resources so that they may be swapped and adjusted to give the user the best performance and customizability for their particular needs.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, some-times referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, and/or the like. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," refers to a physical storage medium (e.g., volatile, or non-volatile memory device).

As used herein, the terms "data structure" or "data set" refers to a collection of data capable of being collectively transmitted, received, and/or stored.

As used herein, the term "computing resource" refers to one or more software and/or hardware based programs, applications, products, platforms, or services provided to, made available to, or otherwise usable by users and/or user computing devices. A "computing resource" may be a distinct, independent software and/or hardware based programs, applications, products, platforms, or services from one or more other computing resources, and the computing resource may be separately operable independent from any other computing resources. As a non-limiting example, a "computing resource" may include computing device protection services, computing device electronic security services, electronic fraud prevention services, computing device insurance, computing device password protection services, computing device user alias services, computing device fault detection, computing device repair, or the like as described herein. In some embodiments, a computing resource may be associated with an identifier. As used herein, the term "identifier" may refer to a code, key, pointer, memory address, credential, and/or other data that uniquely identifies a particular computing resource. As used herein, a "constituent computing resource" may refer to a computing resource that forms a part of a computing resource set as described and defined herein.

As used herein, the term "computing resource set" refers to a collection of one or more constituent computing resources, such as a bundle of constituent computing resources. The term "computing resource set" may further include data associated with the one or more computing resources and/or the computing resource set as a whole, including customizations and the like. A "computing resource set" need not be permanently fixed or finalized and may refer to a collection of constituent computing resources and/or data associated therewith that are in template form, are temporary, are incomplete, or are available for modification and/or customization. A "computing resource set" may include one or more "core" constituent computing resources that are permanently included in a given computing resource set and/or one or more "optional" constituent computing resources that may be added or removed by a user. In some embodiments, the computing resource set may include "default optional" computing resources, which are optional computing resources that are selected by default, and "non-default optional" computing resources, which are optional computing resources that are not selected by default. In some embodiments, a "computing resource set" may be modified or updated with new customizations and/or constituent computing resources. In some embodiments, the systems and APIs described herein may create new "computing resource sets" upon modification or updating of a pre-existing computing resource set. A "computing resource set" may be created by a provider entity, including a third party provider, for offering to, selection by, and/or customization by an end user or may be created in response to an indication from an end user. In some embodiments, a "computing resource set" may be stored as a collection of identifiers and data associated with various constituent computing resources. In some embodiments, computing resources may be assigned "categories" or other metadata associated with their general purpose, function, intended beneficiary, and/or any other criteria. In some instances, one or more computing resource sets may include a common category or metadata to allow a user to enroll in an entire computing resource set focused on the common category or metadata.

As used herein, the term "dynamic resource assembly system" refers to one or more computing devices embodied in hardware, software, firmware, and/or a combination thereof configured to dynamically assemble one or more computing resource sets according to various embodiments of the present disclosure.

As used herein, the term "computing resource set registration interface" refers to an interactive graphical user interface that is configured for selective presentation and/or selection of various renderable data objects.

As used herein, the term "API platform" refers to one or more computing devices embodied in hardware, software, firmware, and/or a combination thereof configured facilitate the providing of an application programming interface associated with the various functions and systems described herein. As used herein, the term "API" may refer to an application programming interface, which may represent a software interface configured to connect two or more computing devices, systems, subsystems, components, programs, or the like.

As used herein, the term "renderable data object" refers to a set of executable instructions that, when executed by a processor of a computing device, renders assets for display. In some embodiments, the renderable data object may be rendered on an interface.

As used herein, the term "subset" may refer to a proper subset. A proper subset of a set is portion of the set that is not equal to the set. For example, if elements A, B, and C belong to a first set, a subset including elements A and B is a proper subset of the first set. However, a subset including elements A, B, and C is not a proper subset of the first set.

As used herein, the term "access privilege data" refers to data configured to grant, authenticate, validate, or otherwise confirm the ability of a user, user account, or other entity or an identifier associated therewith to access one or more computing resources or a portion thereof "Access privilege data" may refer to data associated with an entitlement of the user, user account, or other entity or identifier associated therewith to or for one or more computing resources. The access privilege data may be generated in accordance with an entitlement rule set that defines the rules for enrollment in the constituent computing resources (e.g., point based, or the like).

As used herein, the terms "resource access management" and "resource access control" refer to the processes associated with generating, modifying, deleting, storing, or otherwise related to the control of access privilege data and the associated access that may be granted to one or more users or other entities. "Resource access management" may refer, in some embodiments, to access privilege data associated with computing resources or a portion thereof "Resource access management" may refer to enrollment of a user in one or more computing resources, one or more computing resource sets, and/or portions of any of the foregoing. As used herein, the term "resource access management system" refers to one or more computing devices embodied in hardware, software, firmware, and/or a combination thereof configured to programmatically facilitate resource access management. For example, in some embodiments, a "resource access management system" may refer to an online clearinghouse (OCH) for managing enrollments in one or more computing resources and/or computing resource sets. As used herein, the term "resource access request" refers to a computer-readable request configured to facilitate enrollment in, for example, one or more computing resource sets, one or more computing resources, and/or portions thereof. A "resource access request" may also refer to computer-readable request configured to update, modify, add to, or cancel any of the foregoing enrollments. In some embodiments, "resource access request" may be transmitted from a user device to a system via an API platform to cause access privilege data to be generated and/or assigned in relation to a particular user account(s) and the one or more computing resource sets, one or more computing resources, and/or portions thereof.

As used herein, the term "independent", in reference to two or more pieces of hardware, software, firmware, and/or a combination thereof, refers to the possibility, but not the requirement, that such hardware, software, firmware, and/or a combination thereof may operate without requiring operation of the other. The term "independent" encompasses such elements that may optionally refer to or cooperate with other elements, so long as they may be made to operate as standalone hardware, software, firmware, and/or a combination thereof under at least some circumstances without frustrating the entire purpose thereof. For example, computing resources may be independent from each other, such that computing resources may be added, removed, and substituted from computing resource sets without reliance upon the inclusion of other computing resources within the computing resource set (e.g., a device protection software may be configured to not depend upon a password management application to function and vice versa).

As used herein, the term "attribute asset" refers to data, including metadata, associated with a larger data or functional construct. For example, an "attribute asset" may refer to data associated with a customer, such as a channel or merchant associated with the customer. By way of another example, an "attribute asset" may refer to data associated with a computing resource, such as one or more customizations, parameters, data values, or the like associated with the computing resource.

As used herein, the term "communication mode" may refer to hardware, software, firmware, or combination thereof that facilitates communication between two entities. For example, a push notification sent to a software application operating on a cellular phone may be a "communication mode" for the various systems described herein to reach an end user. The "communication mode" may contain various contact information, protocols, channels, and the like for transmitting an electronic communication to a recipient entity, such as an end user.

As used herein, the term "client" refers to a piece of computing hardware and/or software configured to communicate with or access one or more portions of the systems described herein, such as via a network. In some embodiments, the "client" may refer to software or a combination of hardware and software operating on a user device, wherein the client is configured to communicate with the systems of the present disclosure, such as via one or more APIs, portals, or the like. In some embodiments, the "client" may refer to any software and/or hardware capable of facilitating communication with the system, including but not limited to a temporary execution of software on a user device, such as a portal or web page rendered via the Internet, and the client need not be a dedicated application or installed piece of software on the user device.

As used herein, the term "customization" refers to one or more attribute assets associated with a computing resource or computing resource set. A "customization" may include one or more user-selectable portions of the computing resource or computing resource set. In some embodiments, a "customization" may include attribute assets associated with a computing resource or computing resource set that are incorporated into association with the computing resource or computing resource set at the system level, separate from the computing resources themselves. By way of non-limiting example, "customizations" may include configurable options (including optional computing resources or portions thereof) such as a number of user devices protected, a number of alias' granted (e.g., for user identity protection), a number of tech support sessions (e.g., for diagnostics and tech support), as well as billing modes (e.g., monthly, bi-monthly, yearly, etc.), discounts, promotions, tech support coverage level, installation services, deductibles, loyalty/referral credits, and the like. In some embodiments, one or more customizations may be triggered automatically or offered automatically based on the composition of the computing resource set. For example, the system may offer tiered pricing based on the number of computing resources, number of devices, or total token value; a percent discount based on a particular combination or total token value; or the like. A customization may comprise any level of granularity, and in some embodiments, may be predetermined options associated with individual computing resources, computing resource sets, or portions thereof, whether prior to, as part of, or following combination of the computing resources into a computing resource set. In some embodiments, a customization may be associated with a computing resource set (or portion thereof). In some embodiments, a given computing resource sets may comprise the same core constituent computing resources, including required and/or optional computing resources (e.g. Antivirus, VPN, Newspaper subscription), and variability within the computing resources may be available for customization at a more granular level (e.g., number of active VPN connections within a VPN computing resource, etc.). For example, one constituent computing resource may comprise cloud backup, and the cloud backup would be the core computing resource(es), but the user could select customizations of memory size (e.g., 5, 20 or 50 GB). Some examples of computing-resource-set-wide customizations may include a deductible amount and/or claim limit. In some embodiments, the customizations may affect and/or be limited by the total token value of the computing resource set and/or the individual token data structures of the constituent computing resources.

As used herein, a "channel" refers to a route, means, or other distinguishing criteria by which a user accesses and associates with the system, APIs, and/or one or more computing resources or resource sets. By way of non-limiting example, a "channel" may include a particular merchant (e.g., a cellular carrier, device retailer, cable television provider, or the like) or provider associated with the user or user device, a particular type of user device, a category of user (e.g., customer type), or any other similar association relevant to the user and the system. In some embodiments, a "channel" may refer to the ultimate front-end system through which an end user accesses the system (e.g., via a direct to consumer interface and storefront, via a skinned merchant interface and storefront, etc.). In some embodiments, a computing resource set may be transmitted to a user device with a "channel instruction set" associated with the channel from which the user engages with the system. The channel instruction set may include computer executable instructions for skinning or adjusting the interface to match the design language of the channel (e.g., a merchant page). In some embodiments, the merchant page or other channel may perform the skinning function, while the API and system provide the computing resource sets and data to be inserted into the channel page. A channel may be used to distinguish the computing resource sets presented to multiple customers. For example, one merchant (e.g., cellular carrier A) may require its users to receive a minimum level of protection that includes computing resources "X" and "Y", and a second merchant (e.g., cellular carrier B) may require its users to receive a minimum level of protection that includes computing resources "X" and "Z". In such embodiments, the "channel" may correspond to "cellular carrier A" and "cellular carrier B", and the system may use the channel identity to inform the computing resource sets offered to the two respective users. For example, the user associated with carrier A may only be presented with computing resource sets that include X and Y as core computing resources, and the user associated with carrier B may only be presented with computing resource sets that include X and Z as core computing resources.

Example System Architecture

Methods, apparatuses, systems, computer-readable media, and computer program products of the present disclosure may be embodied by any of a variety of devices in various system architectures. For example, the method, apparatus, system, computer-readable media, and computer program product of an example embodiment may be embodied by one or more computing devices, such as a server or other entity, configured to communicate with one or more devices, such as one or more user devices (e.g., mobile phones, personal computers, servers, or other entities) and/or one or more computing resource servers. Example embodiments include one or more servers configured to facilitate an API platform, resource access management, and/or one or more additional functions associated with computing resource sets. Additionally, or alternatively, methods, apparatuses, systems, computer-readable media, and/or computer program products of an example embodiment may be embodied by one or more software modules configured to perform some or all of the operations performed disclosed herein and executed on one or more hardware modules or systems, such as one or more servers connected to one or more other devices.

In this regard, FIG. 1 is a schematic block diagram of an example provider system 100, one or more user devices 116, and one or more computing resources 106, 120 according to various embodiments of the present disclosure. As illustrated, the example provider system 100 may include one or more subsystems, devices, and components, including hardware, software, and/or firmware, for carrying out various functions according to embodiments of the present disclosure. In some embodiments, one or more illustrated subsystems, devices, and components may be discrete systems and/or components or may be part of larger systems (e.g., a provider system 100) without departing from the present disclosure. In various embodiments, an API platform 102 may be configured to communicate with and/or facilitate communication between one or more of a dynamic resource assembly system 104, a token manager 110, a quote system 112, an operator terminal 114, a resource access management system 118, one or more databases 122, one or more provider devices 124, one or more computing resources 106, 120, and/or one or more user devices 116. In the depicted embodiment of FIG. 1, the provider system includes an API platform 102 may be configured to communicate with and/or facilitate communication between one or more of a dynamic resource assembly system 104, a token manager 110, a quote system 112, an operator terminal 114, a resource access management system 118, and one or more databases 122. In some embodiments, at least some computing resources (e.g., computing resources 106) may further be considered to be included in the provider system 100. In the depicted embodiment, computing resources 106 may be embodied in one or more computing devices, servers, systems, or portions thereof and may be, but need not be, separate physical devices. In some embodiments, two or more of the computing resources may be embodied in the same physical device or in one or more cloud-based devices (e.g., remote servers). In some embodiments, a provider device 124 may further be considered to be included in the provider system 100 or external to the provider system 100 (e.g., a contact center associated with the provider system). In some embodiments, the functions of one or more of the illustrated systems, devices, sub-systems, and components may be performed by a single computing device or by multiple computing devices.

The various systems, devices, sub-systems, and components illustrated in FIG. 1 may be configured to communicate via one or more communication mechanisms, including wired or wireless connections, such as over a network, bus, or similar connection. For example, a network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to TCP/IP based networking protocols. For example, the system 100, including the API platform 102, may be connected to the user devices 116 and/or the provider device 124 via one or more networks. In various embodiments, the system 100, including the API platform 102, may be connected to at least some of the one or more computing resources 106, 120 via one or more networks. In various embodiments, the systems, devices, sub-systems, and components depicted in FIG. 1 as being included in the system 100, although not required to be an integral system, may be connected via one or more networks.

As depicted, an API platform 102 may be provided, which may be configured to facilitate communication to, from, and/or between one or more of the other depicted systems, devices, sub-systems, and components. In various embodiments, the API platform 102 may comprise an API configured to serve as a gateway for the one or more user devices 116 to the provider system 100 and the computing resources 106, 120 (if separate from the provider system). In some embodiments, the API may be the sole gateway for all user-based functionality associated with the provider system 100, which API may interact with a plurality of clients on a plurality of user devices associated with one or more different entities. The API platform 102 may be configured to facilitate the operations of the system 100 for the assembly, access management, and/or adaptive updating of one or more computing resource sets; for the use of one or more constituent computing resources 106, 120; and/or for any functions related to any of the foregoing. The API platform 102 may comprise one or more services, a server cluster, one or more network nodes, a cloud computing infrastructure, one or more desktop computers, one or more laptop computers, one or more mobile computing devices, some combination thereof, or the like. The API platform 102 may be separate from or integrated into any of the other hardware and/or software of the provider system 100.

The system 100 may include one or more computing resources 106, 120. As described above, each constituent computing resource may refer to one or more software and/or hardware based programs, applications, platforms, or services provided to users and/or user devices. For example, the computing resources 106, 120 may be provided to or access to such resources may be made available to user devices 116. When forming part of a computing resource set, such computing resources may be called constituent computing resources. Some example computing resources 160, 120 may include, but are not limited to, user device protection services, user device electronic security services, electronic fraud protection services, user device fault detection, user device repair, user insurance (e.g., rental insurance, car insurance, home insurance, travel insurance, etc.), eye care protection, automotive protection, or any other software and/or hardware based programs, applications, platforms, or services capable of being provided to users and/or user devices. In some embodiments, some of the computing resources 106 may be offered, provided, and maintained by the same entity that operates the API platform 102 (e.g., a provider) or an entity affiliated therewith, while other computing resources 120 may be provided by one or more third party entities not affiliated with the API platform 102. For example, one of the third-party constituent computing resources 120 may be an anti-virus software provided by a third party electronic security service. In some embodiments, each of the constituent computing resources 106, 120 may be independent of other constituent computing resources. Third party constituent computing resources 120 may be integrated into the system 100 by the API platform 102 such that the computing resource sets can comprise provider-supported computing resources, third-party computing resources, or both with no change to the resource access management process for the end user.

The system 100 may be configured to transmit an enrollment request (e.g., via assigning access privilege data) to the third-party constituent computing resources to facilitate access thereto. The third-party constituent computing resources may perform a separate, internal resource access management process configured to facilitate access management for the particular subset of the third-party constituent computing resource to which the user is entitled. In some embodiments, a separate renderable data object may be transmitted to the user from the third-party computing resource with additional data and/or requests associated with the third-party computing resource (e.g., a welcome email, terms, and instructions for separate enrollment). The various communications, whether from the provider system 100 or a separate system, may be sent immediately upon selection of the relevant computing resource, or portion thereof; upon selection and completion of resource access management in a computing resource set; and/or at some later time following completion of enrollment.

In some embodiments, some or all of a token data structures associated with the third-party constituent computing resource may be allocated to the third-party computing resource via electronic transmission. In some embodiments, the total token value may be tracked and/or dictated and managed by the provider system 100 and may be updated periodically, with updates to the relevant token data structures being pushed to the constituent computing resource systems. The access privilege data and/or token data structure(s) may be configured to be transmitted from the provider system and the constituent computing resources to coordinate provision of the constituent computing resources and/or termination thereof as needed.

The system 100 may include a dynamic resource assembly system 104 which may comprise one or more computing devices embodiment in hardware, software, firmware and/or a combination thereof configured to dynamically assemble one or more computing resource sets and perform functions and store data associated therewith. In the depicted embodiments, the dynamic resource assembly system 104 comprises one or more APIs 104A for receiving calls and executing functions associated with the dynamic resource assembly system. The depicted dynamic resource assembly system 104 further comprises a portal 104B (e.g., a web portal) configured to allow access directly to the dynamic resource assembly system (e.g., by a provider employee using a provider device 124 to manage one or more services associated with the dynamic resource assembly system and/or a computing resource set. The dynamic resource assembly system 104 may further include one or more databases 104C for storing data associated with the computing resources, computing resource sets, any access privilege data associated therewith, and/or any other data relevant to the dynamic resource assembly system. Each computing resource set may comprise a collection of one or more constituent computing resources that has been dynamically created and/or stored by the dynamic resource assembly system 104.

In some embodiments, the system 100 may further include a quote system 112 and/or a token manager 110. In some embodiments, the quote system 112 may comprise hardware, software, and/or firmware configured to provide a quote for each of the one or more computing resource sets. In some embodiments, the quote system 112 may be configured to generate and/or apply one or more customizations associated with the computing resource sets for dynamically determining pricing of the computing resource set. In some embodiments, the token manager 110 may comprise hardware, software, and/or firmware configured to provide token allocation and management for one or more computing resource sets. As used herein, a "token" may comprise any data structure configured to weight and compare one or more of the constituent computing resources, or any subset or combination thereof, against each other. The tokens may share a common unit and may be directly comparable between computing resources, even in an instance in which computing resources are independent. Tokens may comprise assigned values for the one or more of the constituent computing resources, or any subset or combination thereof. For example, tokens may be defined by currency or a proxy therefor.

In some embodiments, the system may include a resource access management system 118 comprising hardware, software, and/or firmware configured to manage resource access management requests associated with one or more computing resource sets. For example, the resource access management system 118 may define an online clearinghouse (OCH) configured to interface between one or more systems or components of the provider system 100 and one or more outside systems (e.g., user devices 116) via the API platform 102. For example, in some embodiments, the OCH may act as a mapping layer between one or more clients and one or more backend internal/third-party systems (e.g., various computing resources). For example, the OCH portion of the resource access management system 118 may facilitate custom experience API calls for individual clients, which may then be mapped onto the call accepted by the backend systems, such that custom APIs can be generated and implemented for individual clients without modification of the API platform 102 as a whole.

As described above, the various components and systems depicted in FIG. 1 may be configured to provide various functions including assembly, access management, and/or adaptive updating of one or more computing resource sets comprising one or more constituent computing resources. In some embodiments, the one or more computing resource sets comprising one or more constituent computing resources may be associated with one or more accounts and/or one or more user devices 116. Although the one or more user devices 116 are illustrated as separate from the system 100 in FIG. 1, it will be understood in view of this disclosure that in some embodiments, at least some of the one or more user devices 116 may be a component of the system 100 and may be integral with the system or spaced from the system. For example, in some embodiments, user device 116A and user device 116B may be a component of the system 100 while user device 116C is a separate component from the system 100 (e.g., a customer user device). Additionally, while three such user devices 116 are illustrated in FIG. 1, it will be appreciated that this illustration is by way of example, and not by way of limitation, as the system 100 may include additional user devices 106 or fewer user devices configured to interact with/within the system 100. The one or more user devices 116 may each be embodied as any computing device including any hardware, software, and/or firmware, such as by way of non-limiting example, a cellular phone, smart phone, communication device, tablet computing device, digital camera/camcorder, audio/video player, digital video recorder, router, laptop computing device, desktop computing device, wearable computing device, server, internet of things computing device, "smart" appliances (e.g., refrigerator, washer, or dryer with network connectivity), mobile computing device, and/or any combination thereof. By way of example, in some embodiments, a first user device 116A may comprise a customer mobile phone, a second user device 116B may comprise a customer computing device configured to access a customer portal, and a third user device 116C may comprise a merchant computing device configured to access a merchant portal. In the depicted embodiment, the merchant computing device 116C may optionally be configured to receive data from one or more computing resources 106 (e.g., a merchant management service, such as a repair service). Each user device 116 may individually communicate with the API platform 102 (e.g., via one or more networks).

In some embodiments, a provider device 124 may be provided. Similar to the user device 116, the provider device 124 may be a component of the system 100 or separate from the system. In some embodiments, the provider device 124 may allow front or backend access to the API platform 102 and/or one or more components or systems of the system 100. For example, the provider device 124 may comprise a customer service device configured to facilitate the same functions as the user devices 116 when used by a customer service representative on behalf of a customer (e.g., via phone connection to the customer). In various embodiments, the provider device 124 may additionally or alternatively allow a provider user access to a web portal 104B associated with the dynamic resource assembly system 104 to facilitate direct interaction, viewing, and/or modification of one or more aspects of the dynamic resource assembly system (e.g., viewing, assembly, removal, modification, or other functions or data associated with a computing resource set). In various embodiments, the provider device 124 may additionally or alternatively allow a provider user access to one or more functions and/or data associated with one or more computing resources (e.g., managing a claim for a protection product). In various embodiments, the provider device 124 may interact with the API platform 102 as the sole gateway for at least some functions of the system 100, including front-end functions that could be performed via the one or more user devices 116.

The system 100 may include an operator terminal 114 from which an operator (e.g., a developer or other operator associated with the provider and/or the system 100) may control the operations of the system 100 for dynamic assembly, access management, adaptive updating, and/or any other functions performed at the system or in association with the one or more computing resource sets. In this regard, for example, an operator may be able to use the operator terminal 114 to control the operations of the API platform 102, dynamic resource assembly system 104, and/or the constituent computing resources 106. In some embodiments, the operator terminal 114 may include an operator interface configured to receive an indication of an operator input. As such, the operator terminal 114 may include, for example, a keyboard, a mouse, a joystick, a touch screen display, a microphone, a speaker, and/or other input output mechanisms.

Having now generally described several embodiments of the system architecture, example apparatuses now be described in accordance with several example embodiments.

Example Apparatuses of the Disclosure

FIG. 2 illustrates a block diagram of a computing device 200 in accordance with some example embodiments. For example, in some embodiments, the API platform 102, the dynamic resource assembly system 104, resource access management system 118, and/or one or more of the constituent computing resources 106, 120, if embodied in a particular embodiment, may be embodied by one or more computing devices 200. In some embodiments, the token manager 110, quote system 112, operator terminal 114, provider device 124, and/or one or more of the user devices 116 may at least including processing circuitry 202 as shown with respect to the computing device 200. It should be noted, however that the components, devices, or elements illustrated in and described with respect to FIG. 2 below may not be mandatory and thus one or more may be omitted in certain embodiments. Additionally, some embodiments may include further or different components, devices, or elements beyond those illustrated in and described with respect to FIG. 2. In some embodiments, the functionality of the system 100 or any subset thereof may be performed by a single computing device 200 or multiple computing devices 200. In some embodiments, the computing device 200 may comprise a plurality of physical devices.

Although components are described with respect to functional limitations, it should be understood that the particular implementations necessarily include the user of particular computing hardware. It should also be understood that certain of the components described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

In some embodiments, "circuitry" may include processing circuitry, storage media, network interfaces, input/output devices, and/or the like. In some embodiments, other elements of the computing device 200 may provide or supplement the functionality of another particular set of circuitry. For example, the processor 206 in some embodiments provides processing functionality to any of the sets of circuitry, the memory 204 provides storage functionality to any of the sets of circuitry, the communication circuitry 210 provide network interface functionality to any of the sets of circuitry, and/or the like.

The computing device 200 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the computing device 200 in accordance with various example embodiments, and thus may provide means for performing functionalities of the computing device 200 in accordance with various example embodiments. The processing circuitry 202 may be configured to perform data processing, application and function execution, and/or other processing and management services according to one or more example embodiments. In some embodiments, the computing device 200 or a portion(s) or component(s) thereof, such as the processing circuitry 202, may be embodied as or comprise a chip or chip set. In other words, computing device 200 or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computing device 200 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 (and/or co-processor or any other processing circuitry assisting or otherwise associated with the processor) and, in some embodiments, such as that illustrated in FIG. 2, may further include memory 204. The processing circuitry 202 may be in communication with or otherwise control a user interface 208, a communication circuitry 210, and/or a computer application circuitry 212. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the computing device 200 as described herein. In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein. The use of the terms "processor" and "processing circuitry" may be understood to include a single core processor, a multi-core processor, multiple processors internal to the computing device 200, and/or one or more remote or "cloud" processor(s) external to the computing device 200.

In some example embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions and/or the like for enabling the computing device 200 to carry out various functions in accordance with one or more example embodiments. For example, the memory 204 may be configured to buffer input data for processing by the processor 206. Additionally or alternatively, the memory 204 may be configured to store instructions for execution by the processor 206. As yet another alternative, the memory 204 may include one or more databases that may store a variety of files, contents, or data sets. Among the contents of the memory 204, applications may be stored for execution by the processor 206 in order to carry out the functionality associated with each respective application. In some cases, the memory 204 may be in communication with one or more of the processor 206, user interface 208, communication circuitry 210, or computer application circuitry 212 via a bus(es) for passing information among components of the computing device 200.

The input/output circuitry 208 may provide output to the user or an intermediary device and, in some embodiments, may receive one or more indication(s) of user input. In some embodiments, the input/output circuitry 208 is in communication with processor 206 to provide such functionality. The input/output circuitry 208 may include one or more user interface(s) and/or include a display that may comprise the user interface(s) rendered as a web user interface, an application interface, and/or the like, to the display of a user device, a backend system, or the like. The input/output circuitry 208 may be in communication with the processing circuitry 202 to receive an indication of a user input at the user interface and/or to provide an audible, visual, mechanical, or other output to the user. As such, the input/output circuitry 208 may include, for example, a keyboard, a mouse, a joystick, a display, a touch screen display, a microphone, a speaker, and/or other input/output mechanisms. As such, the input/output circuitry 208 may, in some example embodiments, provide means for a user to access and interact with the computing device 200. The processor 206 and/or input/output circuitry 208 comprising or otherwise interacting with the processor 206 may be configured to control one or more functions of one or more user interface elements through computer program instructions (e.g., software and/or firmware) stored on a memory accessible to the processor 206 (e.g., stored on memory 204, and/or the like).

The communication circuitry 210 may include one or more interface mechanisms for enabling communication with other devices and/or networks. In some cases, the communication circuitry 210 may be any means such as a device or circuitry embodied in either hardware, or a combination of hardware and software that is configured to receive and/or transmit data from/to a network and/or any other device or module in communication with the processing circuitry 202. By way of example, in an instance in which the API platform 102 is embodied as a computing device 200 or a portion thereof, the communication circuitry 210 may be configured to enable the computing device 200 to communicate with the dynamic resource assembly system 104 and/or other computing devices via a network, bus, or the like. Accordingly, the communication circuitry 210 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods. In an instance in which the API platform 102 is embodied as a computing device 200 or a portion thereof, the communication circuitry 210 may be configured to, alone or in combination with other circuitry, such as the computer application circuitry 212 and/or processing circuitry 202, process, transform, receive, and/or transmit various signals to and from the system or system components and subsystems.

In some embodiments, the processor 206 (or the processing circuitry 202) may be embodied as, include, or otherwise control a computer application circuitry 212. As such, the computer application circuitry 212 may be embodied as various means, such as circuitry, hardware, a computer program product comprising computer readable program instructions stored on a computer readable medium (for example, the memory 204) and executed by a processing device (for example, the processor 206), or some combination thereof. The computer application circuitry 212 may be capable of communication with one or more of the memory 204, user interface 208, or communication circuitry 210 to access, receive, and/or send data as may be needed to perform one or more of the functionalities of the computer application circuitry 212, including some or all of the functions associated with the system or component embodied by the computing device 200 as described herein. In accordance with some example embodiments, the computer application circuitry 212 may provide means for implementing and controlling functionality of a computer application associated with the embodiments disclosed herein.

In various embodiments, the computing device 200 may include machine learning circuitry 214, which may include hardware components, software components, and/or a combination thereof designed or configured to request, receive, process, generate, and transmit data, data structures, control signals, and electronic information for training and executing a trained machine learning model configured to facilitating the functionalities described herein, including assembly, access management, and/or adaptive updating of one or more computing resource sets comprising one or more constituent computing resources.

Having now generally described several embodiments of the apparatuses, the operation of the API platform will now be described in accordance with several example embodiments.

Example API Platforms

As discussed above, the API platform (e.g., API platform 102 shown in FIG. 1) may comprise hardware, software, or both configured to facilitate operation of an API according to various embodiments of the present disclosure. While described herein as a single "API" for example purposes, the API may comprise one or more APIs embodied on one or more computing devices. The API may comprise a software interface configured to facilitate communication between two or more computing devices or portions of computing devices (e.g., various components or systems described herein). The API may be configured to serve as a single gateway for all user devices associated with the front end operation of the processes and systems described herein. As described herein, the API may present simplified and intuitive calls to the user devices (e.g., user devices 116, including any provider devices 124) to facilitate external interaction with the system 100. Moreover, in various embodiments, the API may further present one or more internal or external API calls to one or more internal components and sub-systems configured to facilitate coordination and streamlining of system operations. In addition, the internal API calls may enable the API to integrate and swap independent components and sub-systems (e.g., individual computing resources) without modifying the respective independent components and sub-systems. For example, the API may be configured and reconfigured to call, receive, and otherwise function with one or more components and sub-systems by programming the API to interact with preexisting APIs and other software and hardware functions associated with the independent components and sub-systems. Moreover, the API is configured to translate and transform the intuitive and streamlined external calls into the appropriate internal calls for the appropriate components and sub-systems without the external user (e.g., a customer, merchant, or provider entity using one or more user devices, including a provider device) being aware of the internal structure or operation of the system, which may facilitate the updating, addition, or removal of one or more internal features while the external user experience remains intuitive and streamlined. The system may thereby be modularly updated while, in some embodiments, only modifying the API and/or the requesting/receiving devices while leaving the remainder of the system unmodified. In some embodiments, the API may at least facilitate resource access management and the establishment of access privilege data entitling the user to the various computing resources both as between the user and the provider system 100 and as between the provider system 100 and the computing resources 106, 120. In some embodiments, communication gateways other than the API platform 102 may be used for one or more additional functions (e.g., reporting, processing of user request following completion of resource access management, etc.).

FIG. 3 illustrates an example data flow of an API facilitated by an API platform (e.g., API platform 102 shown in FIG. 1). In the illustrated embodiment, the API receives one or more calls 302 from one or more requesting devices, systems, subsystems, or other components and returns one or more responses 304 to the requesting devices, systems, subsystems, or other components. The calls may be generated by any of the entities shown or described herein, including, by way of example, any user devices 116A (via one or more clients operating on such devices, including provider devices 124), the dynamic resource assembly system 104, the token manager 110, the quote system 112, the operator terminal 114, the resource access management system 118, and/or one or more computing resources 106, 120 (in each instance, embodies of which are illustrated in FIG. 1). The respective requesting device, system, or component may be programmed with one or more specific calls to transmit to the API based on an API specification associated with the API. The one or more calls may be transmitted in at least some instances in which the requesting device needs data and/or functional coordination with any other connected device (e.g., in connection with the logical process flows described herein). In this manner, the API may serve as a gateway to the internal processes of the system and may be built atop and may provide interoperability between one or more independent devices, systems, subsystems, or other components, including various microservices.

As further illustrated in FIG. 3, the API may comprise two or more layers embodied in software and/or hardware. The layers may include, for example, an experience layer 306 and a system layer 310. The experience layer 306 may be oriented to the user of the API such as various portals, clients, etc. associated with the devices discussed above. The experience layer may be configured to receive the calls, which may simplify integration for the users and user devices by receiving and handling intuitive calls formulated logically based on the functions they are configured to invoke without regard to the respective backend devices, components or systems that execute the function (e.g., a single "status check" function may be called at the experience layer even though a plurality of internal calls and functions may be necessary to arrive at a "status" to be returned to the requester). The experience layer 306 may thereby be responsible for orchestration of the internal functionality of the system, with a front end of the experience layer being responsible for simplification of integration of the internal functionality for the requesting devices and the backend supporting realization of value by calling the system layer. The experience layer 306 may be configured to expose one or more external API calls to the plurality of clients and transform the one or more external API calls into one or more internal API calls directly or indirectly (e.g., via one or more processing layers 308) to the system layer 310. In various embodiments, the system layer 310 of the API may be oriented to the internal devices, systems, subsystems, and/or components capable of executing one or more functions in furtherance of the calls. By way of example, FIG. 3 shows the dynamic resource assembly system 104, resource access management system 118, token manager 110, quote system 112, and one or more computing resources 106, 120 connected to the system layer 310 and configured to receive computer program instructions (e.g., API calls) from the system layer and to return data and/or execute functions upon receipt of such instructions. The primary role of the system layer 310 may be transformation, with the system layer being oriented to the backend devices, systems, subsystems, and components. The system layer 310 may include a frontend that may be responsible for abstraction of the differences and inconsistencies in the backend relative to the initial calls received by the experience layer 306. The backend of the system layer 310 then utilizes the individual source systems (e.g., the dynamic resource assembly system 104, resource access management system 118, token manager 110, quote system 112, and one or more computing resources 106, 120) to process the requests. In some embodiments, the system layer may be configured to receive the one or more internal API calls directly or indirectly from the experience layer 306 and transmit computer executable instructions to execute one or more functions, by way of non-limiting example on the plurality of computing resources 106, 120 and/or dynamic resource assembly system 104. In some embodiments, the API may comprise an additional one or more processing layers 308 between the experience layer 306 and the system layer 310 configured to further streamline the transformation and processing of incoming calls to the API.

The API may serve as the gateway for calls between two or more of the devices, systems, or other components shown and described herein. Any of the various programmatic functions described herein may be executed via a set of calls and responses between the respective requesting device, the API, and the respective responding device(s).

Examples of such functionality the API connecting one or more of the plurality of computing resources 106, 120 with a dynamic resource assembly system 104 configured to assemble the computing resources into at least one computing resource set for presentation and/or further interaction with an external client (e.g., as operating on an external device 116, 124). In another example embodiment, a developer portal (e.g., operating via operator terminal 114 may access the front or backend functionality of one or more of the plurality of computing resources 106, 120 and/or dynamic resource assembly system 104 via the API. As described above, the functionality of one or more of the internal devices, systems, subsystems, or other components may trigger further calls to the API for executing downstream functions. In this manner, a recipient of instructions from the system layer 310 may become a requester by sending one or more calls 302 to the experience layer 306.

Turning to FIG. 4, a conceptual data structure is shown with example API calls at multiple layers of the API in accordance with various embodiments of the present disclosure. In the depicted embodiment, a plurality of requesting devices 401 are shown in accordance with various embodiments herein. The requesting devices 401 transmit calls 410-434 to one or more external APIs 402, the calls 410-434 comprising intuitive functions organized at a high level based on the end functionality sought by the requesting device(s). For example, a call for a quote 410 at the external APIs 402 may facilitate one or more calls 436-450 at the internal APIs 403 with a greater level of specificity than the requesting device needs to provide. The result is a simplified integration for the requesting devices and an improved programming and user experience.

With continued reference to FIG. 4, the external APIs 402 receive the calls 410-434 which are then processed at the API platform (e.g., API platform 102 shown in FIG. 1) to generate the one or more internal API calls 436-450, which may have one or more component steps 452-466, each of which may be a separate computer-executable process for carrying out the instructions of the requesting device. At bottom of FIG. 4, various receiving devices 406 are shown, which are responsible for processing the requests once they have been transformed into sufficiently detailed computer-executable instructions to be interpreted and acted on by the respective receiving devices. As discussed above, the receiving devices may be any device, system, or component configured to communicate with the API platform 102, either directly or indirectly, to carry out one or more functions relevant to the present disclosure.

In the depicted embodiment, the external APIs 402 may be callable, for example, by one or more external systems, such as a particular channel through which resource access management is being performed for one or more computing resource sets. For example, one or more mobile applications, websites, or partner devices (e.g., devices 116A-116C, 124, 104, 114, etc.) may be configured to call the external APIs to facilitate their associated functionality. In the depicted embodiment, the internal APIs may be callable, for example, by the dynamic resource assembly system 104 to perform one or more backend internal and/or third party processes to carry out the user's request.

Versioning of the API may be done by updating the content of the API call and/or the location that the API points. In some embodiments, such as those not requiring core changes at the consuming software (e.g., at the computing resources), no endpoint URL change is necessary. In some embodiments, such as larger changes requiring core changes at the consuming software (e.g., at the computing resources), the underlying software may be changed first and the API subsequently updated via changing the content of the API call and/or the location to which the API points to match the updated software, which may involve a change in the endpoint URL.

Having now generally described several embodiments of the API platform, the operation of computing resource set generation will now be described in accordance with several example embodiments.

Computing Resource Set Generation

Referring now to FIGS. 5-6C, an example flow diagram 500 and interfaces are illustrated for generating a computing resource set comprising a plurality of constituent computing resources. In some embodiments, the computing resource set generation process may include an operator, using the operator terminal 114 (or by another entity, client, and/or device), transmitting instructions to cause the dynamic resource assembly system 104 to request a plurality of computing resource data sets 501 associated with a plurality of computing resources. In some embodiments, the request for a plurality of computing resource data sets 501 may be configured to include data associated with one or more computing resources 106. In some embodiments, the request 501 may comprise a request for "all available computing resource(s)" or a smaller subset thereof and need not explicitly identify one or more computing resources in the request. As depicted, the request may be sent from the operator terminal 114, or other device, to the API platform 102, which then requests the plurality of computing resource data sets 501 from the computing resources 106 via the various API call processes discussed above, with the operator terminal 114 being the requesting device and the computing resource(s) 106 being the receiving device(s). In some embodiments, one or more databases may store the computing resource data sets 501. The computing resource data sets may be maintained in conjunction with the computing resources such that any modification to the computing resources may also modify the computing resource data sets associated therewith.

The operator terminal 114 may include a graphical user interface configured to display a renderable asset 602 (shown in FIG. 6A) that can be selected by the operator to cause transmission of the request for the plurality of computing resource data sets 501. In some embodiments, the graphical user interface of the operator terminal 114 may include a second renderable asset 604 through which the operator can enter data associated with desired computing resources, if some criteria is desired to be specified (e.g., computing resources, or a subset thereof, associated with a particular channel or compatible with a particular user device). In some embodiments, as illustrated in FIG. 5, the request for a plurality of computing resource data sets 501 may be transmitted to the API platform 102. In some other embodiments, the request for a plurality of computing resource data sets 501 may instead be transmitted directly to the computing resources 106.

In some embodiments, the API platform 102 may request the plurality of computing resource data sets 502 from the computing resources 106 and/or one or more databases or computing systems associated therewith. The computing resources 106 may provide the plurality of computing resource data sets 503 to the API platform 102 and the API platform 102 may provide the plurality of computing resource data sets 504 to the dynamic resource assembly system 104. In some embodiments, the operator (whether via the operator terminal or another client/device) may instruct the dynamic resource assembly system 104 to retrieve the computing resource data sets, which may then cause the dynamic resource assembly system to retrieve the computing resource data sets. In some embodiments, the dynamic resource assembly system may already have the plurality of computing resource data sets and the generation process may begin via interaction with the dynamic resource assembly system 104.

In some embodiments, the dynamic resource assembly system 104 may be configured to generate and present one or more renderable data objects 505 comprising renderable assets to the interface of the operator terminal 114, or other relevant client/device. In some embodiments, the dynamic resource assembly system 104 may be configured to receive a selection indication from the operator terminal 114, or other relevant client/device. With reference to FIG. 6B, the renderable assets may be configured to be presented via a graphical user interface on a display of the operator terminal 114, or another relevant client/device. In some embodiments, the selection indication may comprise an indication to generate a computing resource set. For example, the indication may include an indication of a computing resource set associated with the two or more of the plurality of computing resources. In this regard, the selection indication may indicate that the dynamic resource assembly system 104 should generate a computing resource set comprising a subset of the plurality of computing resources. The selection indication may further indicate one or more attribute assets associated with one or more of the plurality of computing resources. In some embodiments, each of the selected subset of the plurality of computing resources may be associated with an identifier. In some embodiments, the operator may make the selection indication via a renderable asset (e.g., exemplified by rendered asset 606 shown on FIG. 6B). In some embodiments, the operator may be able to designate each of the subset of computing resources as either a core computing resources via a rendered asset 608 or an optional computing resources via a rendered asset 610. "Core" may refer to an unremovable computing resource as part of the generated computing resource set, while "optional" may be removed and/or replaced with one or more other computing resources during the resource access process by a customer (e.g., a customer associated with an account). In some embodiments, each of the subset of computing resources may be associated with a token value or a set of possible token values depending on customizations made by the customer during an attribute asset selection of the resource access process. In some embodiments, the token value(s) of each computing resource may be preset. In this regard, the token value(s) may be displayed to the operator via a renderable asset rendered on a display 612. In some embodiments, the operator may be able to customize the token value of each of the subset of constituent computing resources during the generation of the computing resource set. For example, in such embodiments, the operator may be able to set the token value(s) of a constituent computing resource via the renderable asset 612. This process may be repeated one or more additional times, if desired, to add additional computing resources to the computing resource set.

In some embodiments, after receiving the selection indication 506 and generating the computing resource set, the dynamic resource assembly system 104 may be configured to generate a renderable asset associated with the computing resource set (e.g., a confirmation screen). In some embodiments, the dynamic resource assembly system 104 may provide the renderable asset 507 associated with computing resource set to the operator terminal 114, or other relevant client/device, for display to the operator. In this regard, as shown in FIG. 6C, the renderable asset(s), when rendered, may include a listing the computing resources in the computing resource set 612 and any relevant data associated therewith, a listing of the token value 614 of each computing resource, and/or the total token value 616 of the computing resource.

Having now generally described several embodiments of computing resource set generation, the operation of resource access management will now be described in accordance with several example embodiments.

Resource Access Management

Referring now to FIGS. 7-8C, an example flow diagram 700 and interfaces are illustrated for resource access management for at least one computing resource set by one or more users. In some embodiments, the generation of the computing resource set(s) and management of resource access by an end user associated with an account may be separate processes, with, for example, an operator associated with the provider generating one or more computing resource sets and the end user associated with the account enrolling in one of the computing resource sets by submitting a resource access request. The process of resource access management (e.g., enrollment in a computing resource set by an end user) may include, for example, choosing a computing resource set from a plurality of computing resource sets, choosing one or more optional constituent computing resources of the bundle, and making one or more customizations to the bundle (e.g., assigning various attribute assets to individual constituent computing resources and/or the overall computing resource set). In some embodiments, the process of resource access management may include enabling the end user to create an entire computing resource set from its constituent parts (e.g., merging the processes of FIG. 5 with those of FIG. 7—the user device 116 being used in place of the operator terminal 114). The process of resource access management may include associating an account associated with the end user with a computing resource set, optionally including one or more customizations to the computing resource set, and may include storing access privilege data associated with the computing resource set and/or one or more constituent computing resources to facilitate access to the plurality of constituent computing resources by the end user (e.g., entitling the end user to the one or more constituent computing resources).

In some embodiments, the computing resources 106, 120 assembled into a computing resource set may relate to multiple different devices or entities under a single account. In some embodiments, an end user may register one or more entities (e.g., people, pets, etc.), devices (e.g., mobile phones, computers, vehicles, etc.), real estate, or any other relevant denomination with their account, and the computing resources may be assigned or associated with one or more of the entities, devices, real estate, or other denominations as part of the resource access management process. In some embodiments, the end user may manually assign one or more of the constituent computing resources to the particular entities, devices, real estate, or other denominations that will receive the benefit of the computing resources. In some embodiments, the constituent computing resources may automatically link to the particular entities, devices, real estate, or other denominations, such as, for example, if the computing resources are relevant to one or more of the entities, devices, real estate, or other denominations (e.g., in some embodiments, an example automotive protection product may only be assigned to vehicles, such that any vehicles under the account may automatically or manually be linked with the automotive protection product).

With reference to FIG. 7, in some embodiments, resource access management may begin through a request from the one or more user devices (e.g., user device 116A) to the API platform 102, subsequently transmitted to a dynamic resource assembly system, to view one or more computing resource sets 701. In some embodiments, the user may request the one or more computing resource sets via a renderable asset 802 (e.g., shown rendered in FIG. 8A) rendered on a user interface of the one or more user devices 116. The interface may further include a channel identifier 808 or other similar indication of the portal, device, or other relationship between the system 100 and the user device 116A that would enable enrollment. In some embodiments, the channel identifier 808 may comprise a label, logo, or other graphical element. In some embodiments, the interface rendered on the user device may be entirely skinned to match the corresponding channel (e.g., a merchant skin) to indicate affiliation with the channel and/or to appear as if the merchant is offering the computing resource set themselves. In some embodiments, the available computing resource sets may be informed by the corresponding channel, such that only a subset of a total computing resource set population may be available for transmission to the user.

The API platform 102 may transmit the request 702 to the dynamic resource assembly system 104 enabling the API platform 102 to retrieve a data structure associated with the one or more computing resource sets 703 from the dynamic resource assembly system 104. In some embodiments, the dynamic resource assembly system 104 may transmit the full computing resource set(s) for the user to review, and in some embodiments, data, including renderable assets, identifiers, information, decision points to be made, or the like, may be transmitted without transmitting the full data structure to the user device. In some embodiments, each of the computing resource sets associated with the dynamic resource assembly system 104 may include a plurality of constituent computing resources associated with a plurality of constituent computing resources 106. In some embodiments, data associated with the one or more computing resource sets (e.g., renderable assets, information, or the like) may be transmitted from the dynamic resource assembly system. In some embodiments, the resource access management system 118 may facilitate at least a portion of the resource access management process.

In some embodiments, in response to receiving the indication of the one or more computing resource sets from the dynamic resource assembly system 104, the API platform 102 may cause rendering of a computing resource set registration interface 704 on the one or more user device 114 that requested the computing resource sets. In some embodiments, the computing resource set registration interface may include one or more rendered assets associated with one or more computing resource sets each a list of one or more constituent computing resources. For example, with reference to FIG. 8B, the depicted computing resource set registration interface includes a first computing resource set 806A and a second computing resource set 806B. The first computing resource set 806A may include a first constituent computing resource 810A and a second constituent computing resource 810B. The first constituent computing resource 810A may be associated with a token value data structure A and may be designated as a "core" constituent computing resource (e.g., if the user selects computing resource set 806A constituent computing resource 810A will be a required part of the computing resource set 806A). The second constituent computing resource 810B may be associated with a token value data structure B and may be designated as an "optional" constituent computing resource (e.g., if the user selects computing resource set 806A, the user has the option of including constituent computing resource 810B as part of the computing resource set 806A). A renderable asset associated with a second computing resource set 806B may likewise be displayed on the computing resource set registration interface 804, and the second computing resource set 806B may include core computing resource(s) (e.g., computing resource 812A) and may include optional computing resource(s) (e.g., computing resource 812B). In some embodiments, each computing resource set may be associated with a total token value. In this regard, the user may be able to configure the optional constituent computing resources of the computing resource set and/or one or more customizations such that the combined token value of each constituent computing resource may be equal to the total token value. In some embodiments, as discussed herein, the total token value may be related to the token value of each constituent computing resource with one or more customizations thereto (e.g., a discount). In some embodiments, a computing resource set may have a default cost that includes the cost of the core constituent computing resources. In such instances, the token value of the constituent computing resources may be set to zero as already being included in the default cost. The total token value may be dynamically updated during the resource access management process via communication with the quote system (e.g., quote system 112 shown in FIG. 1) via the API platform 102. In some embodiments, after the user associated with the one or more user devices 116 has selected one of the computing resource sets, the user may be able to customize the selected one of the computing resource sets. In some embodiments, a maximum total token value may be determined prior to selection of the computing resources and may be allocated for a particular resource access management process. During operation, a user may select computing resources and/or customizations totaling at or below the maximum total token value. In some embodiments, the user may elect to add to the maximum total token value for additional cost. In some embodiments, a total token value may be less than the sum of the token values of the constituent computing resources (e.g., bundle discounts). In some embodiments, the user may begin by selecting computing resources and/or customizations and may be notified of the total token value after the selection.

In some embodiments, based on the user selections associated with the computing resource set registration interface, user device 116 may transmit a resource access request 705 associated with the selected computing resource set to the API platform, which may then transmit the resource access request to the dynamic resource assembly system 706. The resource access request may include a resource access request data structure, including data such as an indication of the selected computing resource set, account data (e.g., enabling the system to identify whether it is a known customer, new user, etc.), device type (e.g., what type of computing device is the one or more user device 114), and/or customer channel. In this regard, the dynamic resource assembly system 104 may be configured to associate the account with the selected computing resource set, and to store access privilege data associated with each of the plurality of constituent computing resources of the selected resource set and the account to record the enrollment of the user account.

Based on the resource access request data structure, the API platform 102 may retrieve, from the dynamic resource assembly system 104, a plurality of identifiers 707 associated with the plurality of constituent computing resources. In some embodiments, each identifier may be configured to identify one or more of the plurality of constituent computing resources associated with the selected computing resource set or may identify a relevant computing system associated with one or more of the plurality of constituent computing resources (e.g., one or more backend servers associated with the respective computing resource). In some embodiments, upon receiving the plurality of identifiers, the API platform 102 may be configured to transmit at least a portion of the access privilege data 708 to each of a plurality of constituent computing resources or the relevant computing systems defining the constituent computing resources. The access privilege data may be configured to cause each of the plurality of constituent computing resources or the relevant computing systems defining the constituent computing resources to activate access to a respective portion of the selected computing resource set, collectively enabling access to the entire computing resource set via the sum of enabling access to the independent constituent computing resources. As such, each constituent computing resource associated with the computing resource set may be enabled for use by the user. Additionally, the API platform 102 may be configured to cause rendering of a renderable confirmation asset 709 on the user interface of the one or more user devices 116 (e.g., rendered confirmation asset 816 shown in FIG. 8C).

In some embodiments, each backend system (e.g., computing resources 106, 120) may have its own API supporting the various functions associated with the respective resources. These APIs may be called by the internal calls (e.g., internal calls 403 shown in FIG. 4) to facilitate functions including resource access management. In some embodiments, the API platform and/or various other external and internal APIs may require user-identifying information (e.g., name and/or email). In some embodiments, the API(s) may require user-device-identifying information (e.g., make, model, and/or serial number). In some embodiments, the various backend systems (e.g., constituent computing resources) may communicate with each other directly or may communicate with each other via the provider system 100. In some embodiments, the provider system 100 may collect periodic or continual data associated with a particular user and/or particular computing resource for storage and/or analysis.

In some embodiments, the provider system 100 and the constituent computing resources 106, 120 may each store the relevant access privilege data associated with the computing resource set and the respective constituent computing resources. In some embodiments, the provider system 100 may serve as system of record for sending and receiving verification requests and access privilege data updates to the backend systems (e.g., the various computing resources).

As discussed above, in some embodiments, one or more other users or other entities may facilitate the generation and/or resource access request process for the computing resource sets. By way of non-limiting example, a customer service representative using a provider device 124, a merchant using a merchant user device 116C, etc. may coordinate with the end-user to facilitate enrollment in one or more selected computing resource sets. Any device or similar computing device having network access and credentials to the system 100 may be used to generate and/or manage resource access to the computing resource sets.

Turning to FIG. 9, an example process for generating a resource access request configured to facilitate resource access management is shown from the perspective of a user device. One of ordinary skill in the art will appreciate, in light of the present disclosure, that the system communicating with the user device may likewise have reciprocal functions to those illustrated, similar to those shown with respect to FIG. 7.

At step 902, the user device may transmit request associated with one or more computing resource sets. The request may be received by the system and interpreted as a request to begin a resource access management process to enroll in one or more computing resource sets. At step 904, a computing resource set registration interface may be presented on the user device (e.g., such as registration interface 804 shown in FIG. 8B). The computing resource set registration interface may display rendered assets associated with one or more of the computing resource sets to enable user selection. In some embodiments, one or more customizations or optional computing resource sets may be visually previewed to the user to illustrate the potential modifications available to the computing resource set. The interface may facilitate selection and resource access management for one or more computing resource sets. As illustrated in FIG. 9, the user may either initially select a computing resource set 906 or may select a plurality of individual, constituent computing resources 920. In an instance in which the selection indication is made in association with a computing resource set 906, the user device may either present the user with additional options for customizing the computing resource set to their preferences 908-916 or may transmit a resource access request to the system 918 in an instance in which the computing resource set is not customizable.

In an instance in which the computing resource set is customizable, the user device may present a menu of one or more optional computing resources via the interface 908. In some instances, the computing resource set that has been selected may include certain "core" computing resources that must remain within the computing resource set while other "optional" computing resources may be added, removed, or substituted in or out. The user device may then receive a selection of one or more optional computing resources 910 to be included in the computing resource set. At least during a portion of the customization process, the interface may display a token allocation representing a token data structure to the user 912. The token allocation may visualize the relative resource requirements of the computing resources to facilitate meeting any token caps or quotas and to allow the total token value to be monitored when building the final computing resource set.

In some embodiments, one or more of the individual constituent computing resources, whether optional or core, of the computing resource set may comprise customization options, such as a service level, one or more premium software features of the computing resource, or the like. In such embodiments, the user may be prompted to and may indicate a selection of the individual customizations 914. In some instances, the token allocation may be updated based on the selection.

In some embodiments, one or more computing-resource-set-wide customizations may be presented to the user, such as one or more promotions (e.g., introductory discount period, complementary constituent computing resource), discounts, benefits, deductibles, claim limits, or the like. In such embodiments, the user may be prompted to and may indicate a selection of the set-wide customizations 916. In some instances, the token allocation may be updated based on the selection. Once complete and customized, a final resource access request associated with the fully customized computing resource set may be transmitted to the system to facilitate enrollment 918. In some embodiments, this transmission may include incremental transmission of portions of the final computing resource set as the user makes selections or may include a single transmission with all relevant resource access request data.

In some embodiments, a trained machine learning model may be used to recommend one or more computing resource sets, one or more constituent computing resources making up a computing resource set, one or more individual customizations, and/or one or more set-wide customizations. In some embodiments, the trained machine learning model may be used to assemble one or more computing resource sets, for example based on a comparison of computing resources commonly used together or with a particular channel, category, account, or other demographic. The machine learning model may be trained using supervised or unsupervised learning based on one or more prior computing resource sets and/or user account data. In some embodiments, the system may be configured to aggregate data associated with a plurality of user accounts and/or a plurality of computing resource sets to determine a recommendation for a user. For example, one recommendation may be a "most popular" computing resource set, which may be absolute or determined based on demographic data associated with the user. In some embodiments, one or more other computer-executed models may be utilized for various functions, including generating recommendations for a user.

By way of example, individual and aggregated user history data, including computing resource usage information may be compiled to be used for training and/or implementation with a machine learning model. In some embodiments, based on utilization experience, the provider system may calculate the computing resources or features thereof that correspond to other usage patterns of users, and the machine learning models may determine likely computing resources to recommend to a particular user. For example someone selecting a VPN-related computing resource may be interested in antivirus as well. In some embodiments, demographic data associated with particular users may be applied to the machine learning models. The demographic data may be generalized by region and/or distribution channel to identify recommendations for subsets of users. Recommendations generated by the machine learning models may pertain to specific features or combination of features of the computing resources and/or computing resource sets. One or more graphical user interfaces may present renderable data objects associated with the recommendations to the user.

In some embodiments, the provider system may maintain one or more user profiles associated with one or more users. The user profile(s) may include data including, but not limited to, the aforementioned user history data and demographic data. In some embodiments, the user history data may comprise usage information, including computing resource set and computing resource information associated with the user. Additionally or alternatively, the user history data may include user activity and interaction levels associated with one or more computing resources and/or clients (e.g., frequency of interaction with a mobile app) to determine interest and satisfaction. In some embodiments, user history data may include device information for the user. In some embodiments, the user profile(s) may be at least partially entered by the user, such as during the resource access management process. In some embodiments, the user profile(s) may be at least partially generated and stored based on user interaction with one or more client devices and/or computing resources. The provider system 100 may be configured to aggregate and compare the data associated with a plurality of user profiles. Based on prior selections of similarly situated users (e.g., users with similar demographic data and/or user history data), the provider system may provide a recommendation of one or more computing resources, computing resource sets, and/or portions or customizations thereof based on the similarly situated users' user history data. In some embodiments, a machine learning model according to the present disclosure may be used to generate the recommendations. In some embodiments, an initial training set may be generated by sampling users user history data and demographic data with no recommendations. In some embodiments, the recommendations may include new or modified computing resource sets, computing resources, and/or customizations or portions thereof that are calculated to better match the user history data and/or demographic data. In some embodiments, for example, after using a computing resource for a first device, the provider system may generate a renderable data object to present an offer for adding the computing resource to one or more other devices. In some embodiments, the provider may detect the addition of one or more devices to a user profile and recommend one or more computing resources associated with the new device(s). For example, the provider system may generate a renderable data object configured to present an exchange suggestion to remove one or more computing resources, computing resource sets, and/or portions or customizations thereof from an existing user profile and to add one or more other computing resources, computing resource sets, and/or portions or customizations thereof for the new device(s). In some embodiments, the provider system 100 may maintain a preexisting total token data value or threshold total token data value associated with the user profile and/or computing resource set(s) prior to the addition of the new device(s). In some embodiments, the provider system 100 may increase the total token data value or threshold total token data value in exchange for an increased cost. In some embodiments, the provider system 100 may detect that a user has inadequate or ineffective computing resources based on a token value versus usage comparison and generate one or more renderable data objects suggesting a modification to the computing resources, computing resource sets, and/or portions or customizations thereof.

Figure 10A:
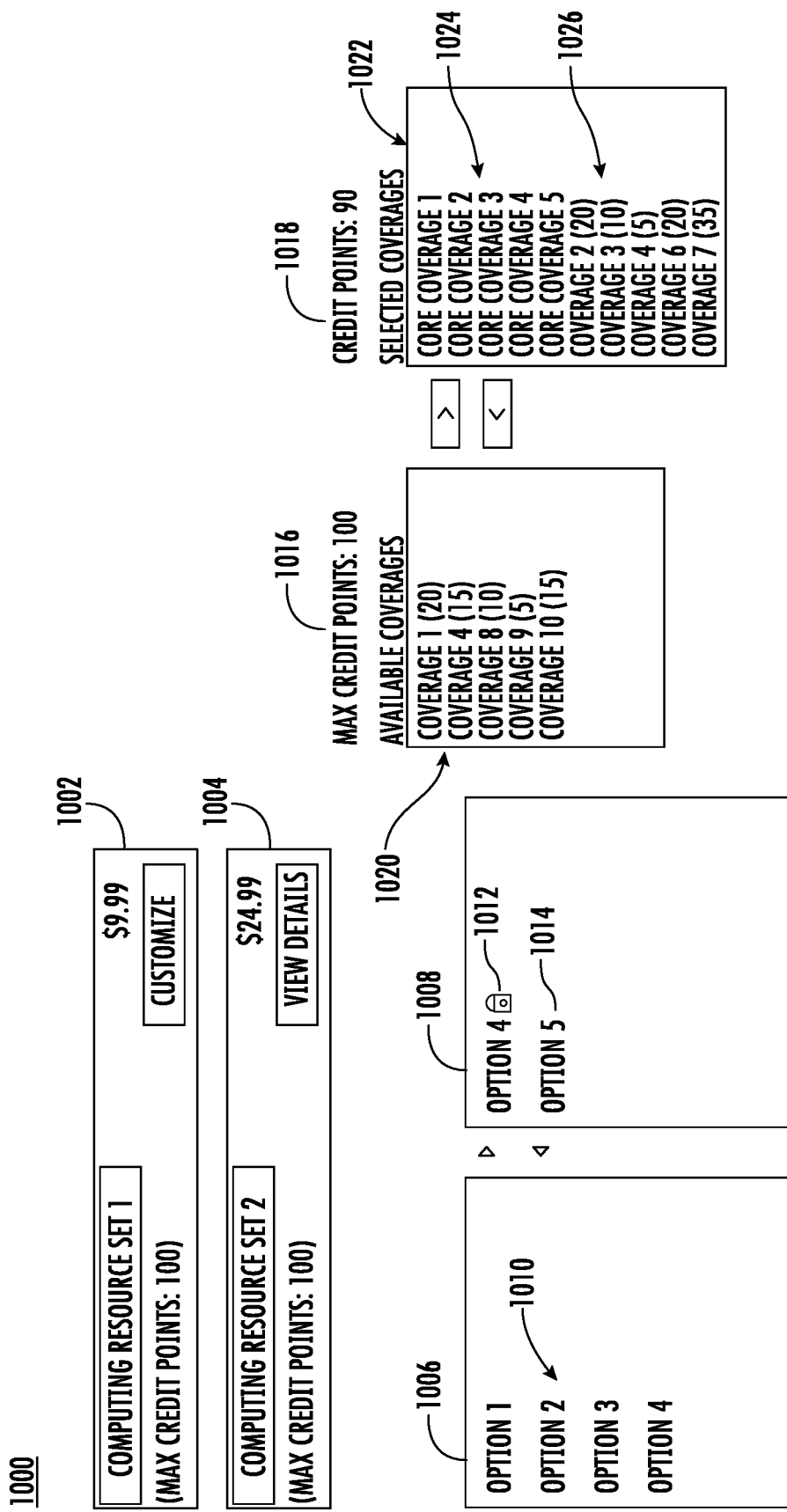

Turning to FIG. 10A, an example user interface is shown for facilitating computing resource set configuration (e.g., by a provider entity) according to various embodiments discussed herein. In the depicted embodiment, a plurality of computing resource sets are shown 1002, 1004. The interface may further include one or more customization menus 1006, 1008, 1016, 1018 configured to enable the user to preview and/or select one or more options and/or customizations associated with the computing resource set. For example, some embodiments of the computing resource sets 1004 may be pre-configured such that no further customization is required, while other computing resource sets 1002 may be customizable. For the customizable computing resource set 1002, a preview menu may be shown 1006, 1008 prior to selection of the "Customize" button that shows default options 1010, locked (e.g., unavailable) options 1012, and selectable options 1014. Once the customizable computing resource set 1002 is selected, a token allocation may be shown at the top of the menus to enable enrollment (e.g., within a "max" of 100 credit points in the example shown). The depicted leftmost column 1016 shows a list 1020 the available computing resources (e.g., coverages) not currently part of the computing resource set along with the total token allocation available, and the depicted rightmost column 1018 shows a list 1022 of the currently-selected computing resources (both core 1024 and optional 1026) that form part of the selected computing resource set. In some embodiments, the user may add computing resources from the left column to the right column or remove at least the optional coverages from the right column to the left column before finalizing the computing resource set with or without selecting any additional customizations. In embodiments with a maximum token value (e.g., a token cap), the interface may prohibit adding computing resources that cause the computing resource set to exceed the maximum token value. In the depicted embodiment, each computing resource lists its individual token value in parenthesis.

Figure 10B:
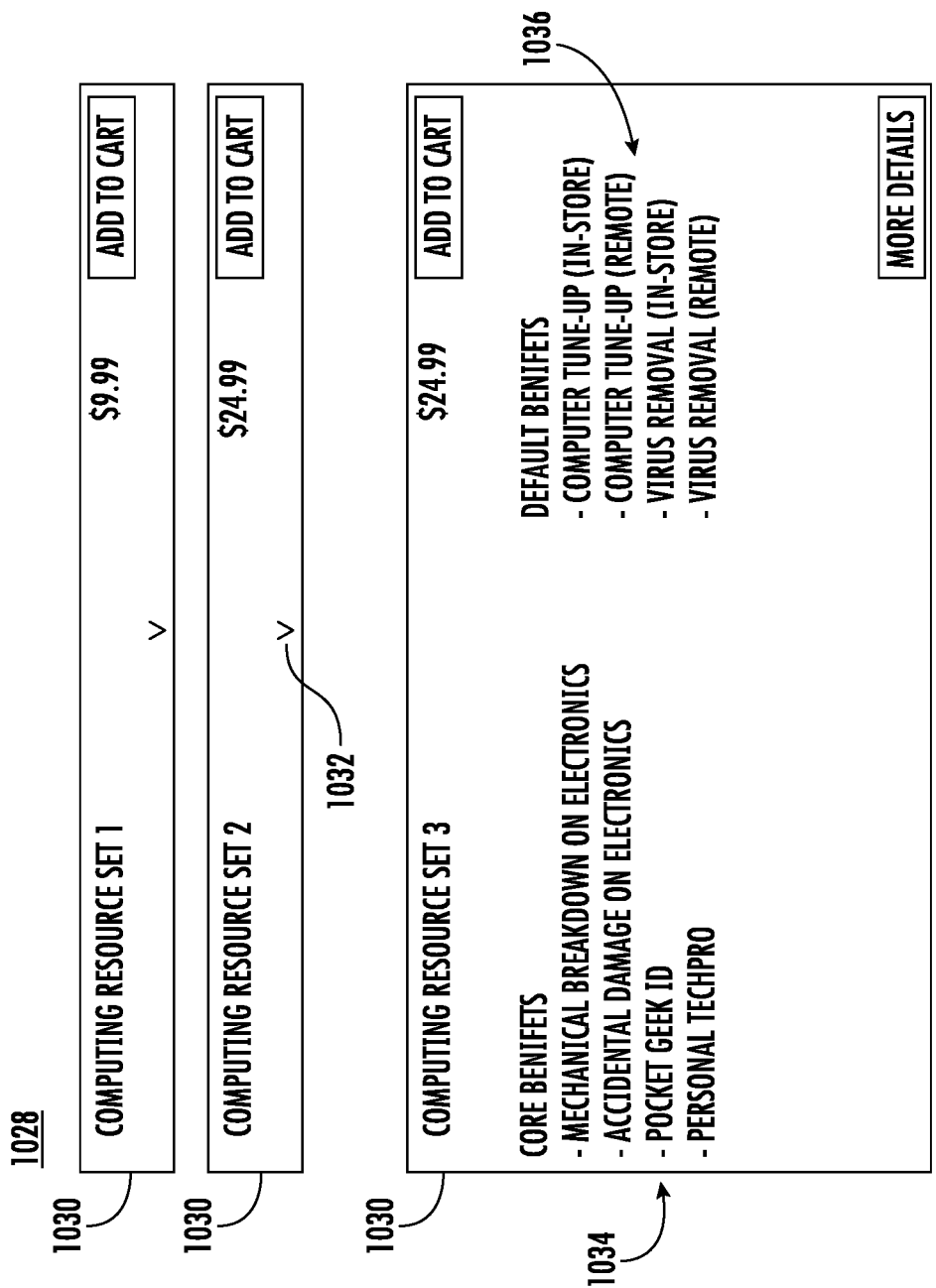

With reference to FIG. 10B, an example user interface 1028 is shown for facilitating resource access management (e.g., enrollment by an end user). The depicted interface includes three computing resource sets 1030 along with their associated token value that may be separately or collectively enrolled. Each rendered asset associated with each computing resource set 1030 may include a dropdown menu 1032 that provides additional details about the respective computing resource sets. For example, the rendered assets associated with the lowermost computing resource set include a list of core computing resources 1034 and a list of default optional computing resources 1036 that may be substituted or removed by the user.

Figure 10C:
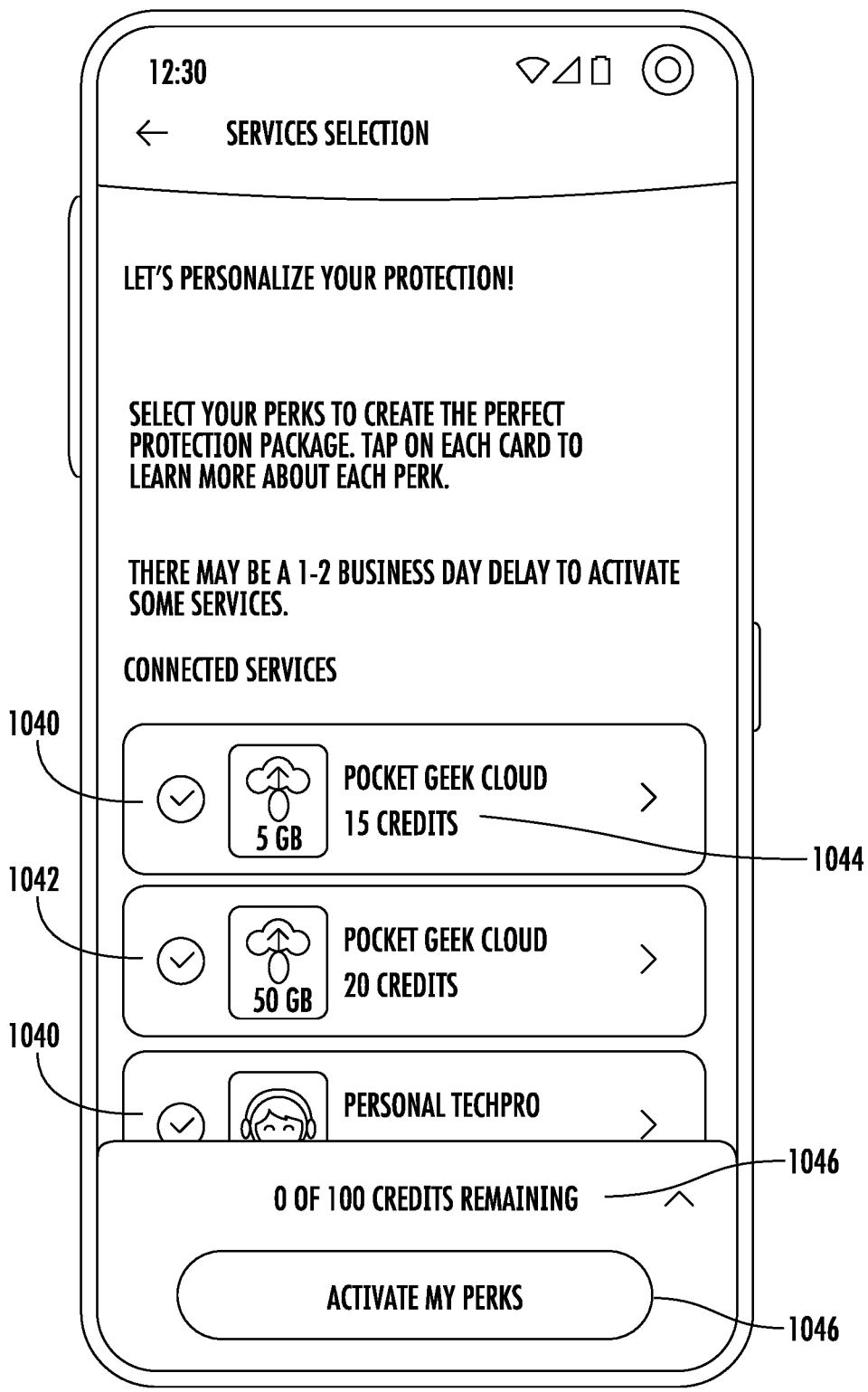

FIG. 10C shows an example mobile device interface 1038 for resource access management (e.g., enrollment by an end user). The depicted interface has multiple computing resources 1040 with radio buttons selected to indicate inclusion in the computing resource set, and one computing resource 1042 with the radio button deselected to indicate exclusion from the computing resource set. The interface 1038 further displays a representation of the token data structure 1044 associated with each computing resource, and a representation of a total token value remaining for enrollment 1046 (e.g., 0 credits remaining in the depicted embodiment). Moreover, the interface 1038 includes an "activate my perks" button 1046 configured to cause transmission of a final resource access request to the system.

Figure 10D:
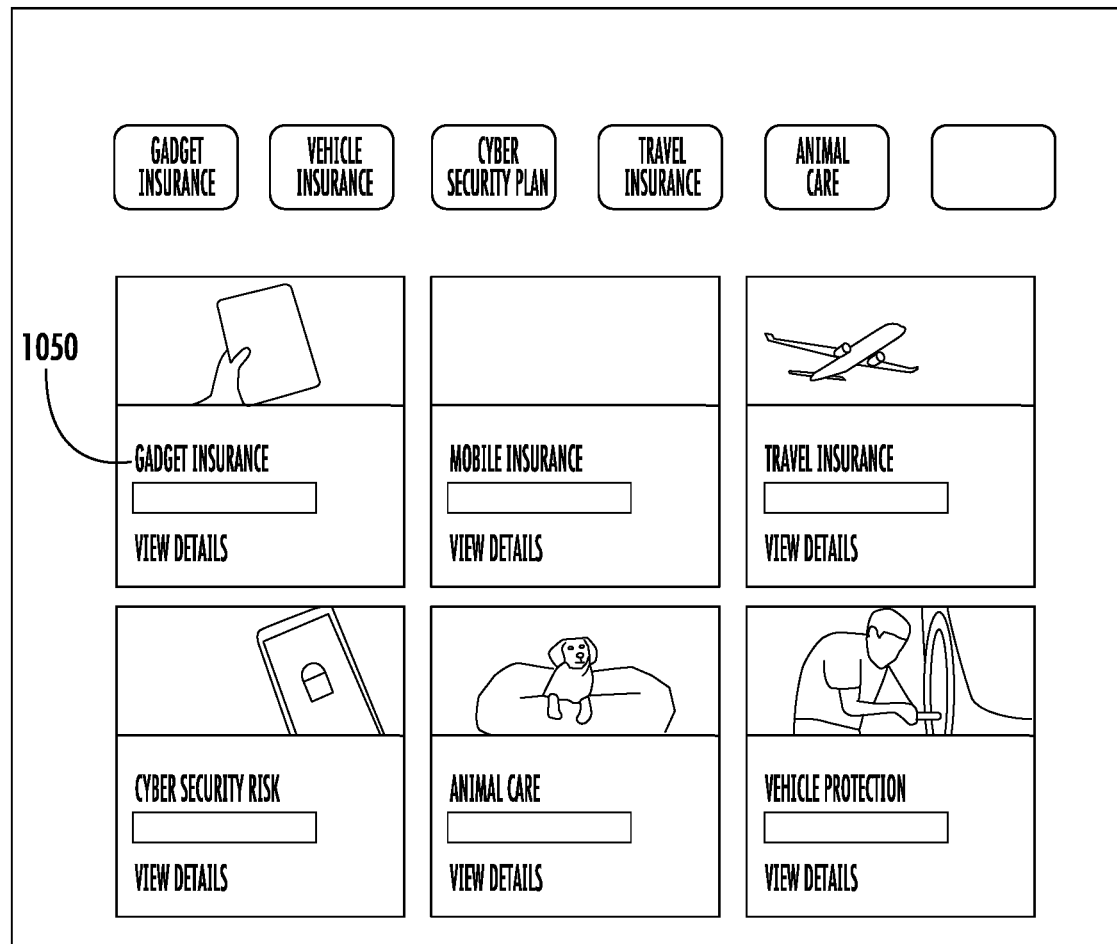
Figure 10F:
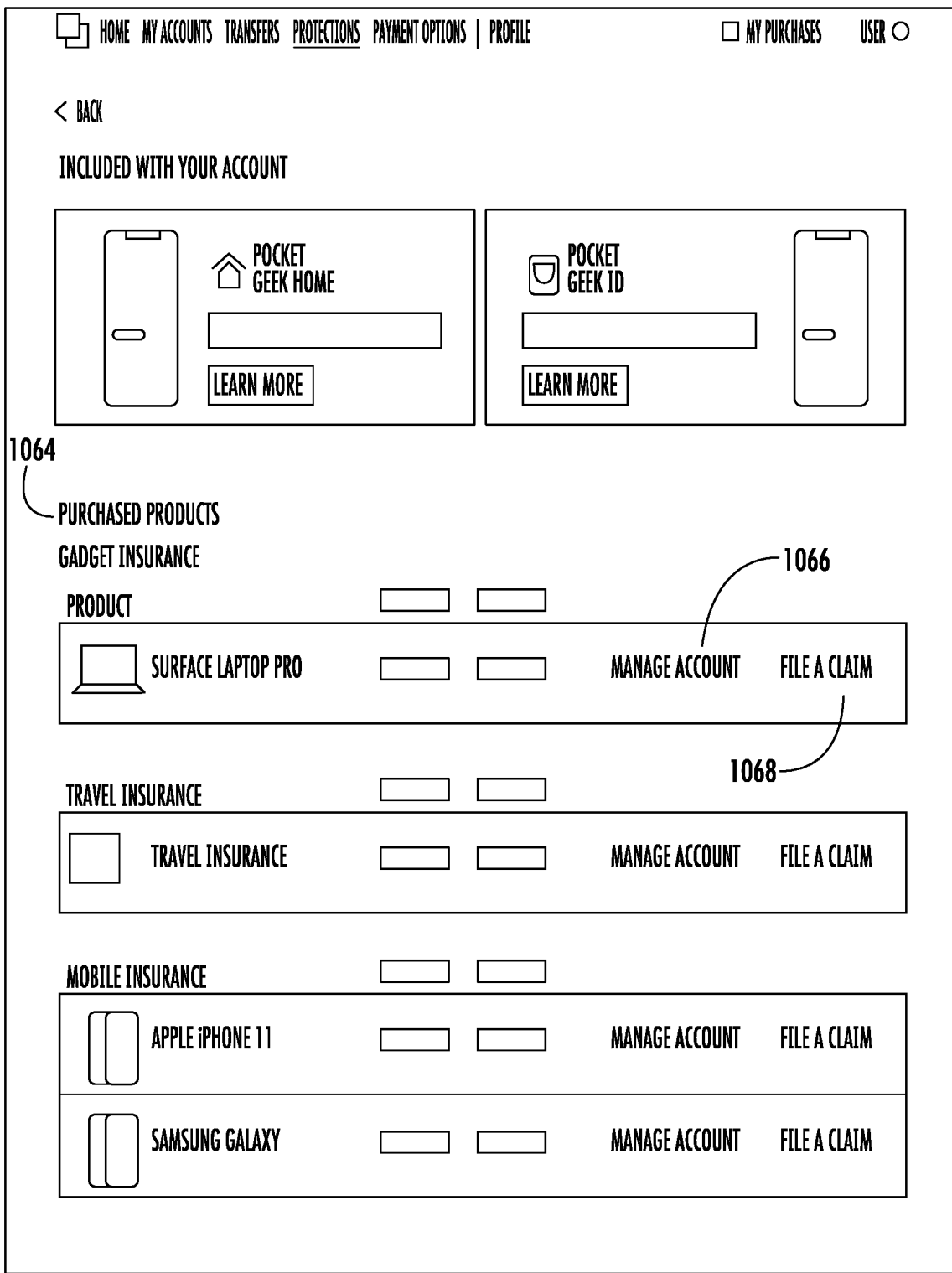

FIGS. 10D-10F depict interfaces 1048, 1052, 1054 associated with resource access request management (e.g., enrollment by an end user). The depicted interfaces 1048, 1052, 1054 have been "skinned" by the API platform and system to appear to be managed by a merchant as part of a merchant channel. With reference to FIG. 10D, a listing of computing resource sets 1050 is shown, with each being categorically organized with computing resources that are focused around a similar purpose or function (e.g., separate computing resource sets for "gadget insurance", "mobile insurance", "travel insurance", "cyber security risk", "animal care", and "vehicle protection"). Each of the computing resources within the identified computing resource sets may be related to this similar purpose or function. By way of non-limiting example, the "cyber security risk" computing resource set may include computing resources corresponding a VPN service, aliasing software, and virus removal tool bundled together for the user to enroll in as a package. In this manner, the end user may enroll in multiple computing resource sets depending on the categories of protection desired. FIG. 10E depicts a detail view interface 1052 of one of the selected computing resource sets, showing a "gadget insurance" computing resource set with constituent computing resources corresponding to "accident damage", "mechanical & electrical breakdown", and "functional parts & labor". FIG. 10F depicts a detail view interface 1054 having a listing of the computing resources 1064 associated with the account. The detail view interface 1054 includes options to manage a user account 1066 (e.g., delete or modify a particular computing resource or computing resource set). The detail view interface 1054 also includes an option to "file a claim" 1068 (e.g., access or use the particular computing resource). The button 1068 may connect to a new web page or new portal associated with the individual constituent computing resource for making use of the computing resource. In this manner, the interface and centralized system may provide organization and management for all of the computing resources while facilitating API interface with the individual computing resources as needed. The API platform software may include API calls associated with APIs of the various computing resources to facilitate this interoperability.

FIGS. 10G-10H depict interfaces 1056, 1062 for a centralized, direct-to-consumer management system. The depicted interface 1056 of FIG. 10G includes sub-menus for device management 1058 and tech services 1060. As depicted, multiple devices may be supported by a single "family" account.

With reference to FIG. 11, an example process for data gathering and interface updating is shown in accordance with various embodiments of the present disclosure. At step 1102, the system receives a request associated with one or more computing resource sets as in various other embodiments herein. The user device may then render the computing resource set registration interface 1104 for resource access management. In connection with the various embodiments disclosed herein, the system may require data for processing the resource access request, such as data associated with the user account. In doing so, the system may have different data levels that are needed for different computing resource sets and/or constituent computing resources. In some embodiments, due to the availability of multiple computing resource sets and multiple customizations, including optional computing resources, within certain computing resource sets, the system may not know precisely which data is required in advance of the final resource access request.

As depicted in FIG. 11, in some embodiments, the system may, in some embodiments, determine a maximum data set possible based on the remaining decision points, including options and customizations 1108. In such embodiments, the system may analyze the data required for all options and customizations still available to the user and may request all of the potentially necessary data up front, even if one or more options or customizations are later not selected and the collected data is ultimately in excess of what is required. In such embodiments, the maximum data set 1110 may be requested from the user via entry at the interface displayed on the user device.

In some embodiments, the system may determine the current data set needed based on the then-existing computing resources and customizations of the computing resource set 1112, and the system may request only the current data set from the user 1114. If future selection indications are received from the user that alter the data needed for resource access management 1116, the system may request the additional data represented by the difference between the current data set and the data needed for the new selection indication at that time 1118.

In yet some other embodiments, no data or only a minimal amount of data may be requested from the user prior to finalizing the computing resource set, and an additional step of requesting the data from the user after the computing resource set has been assembled and finalized may be used.

Following the resource access management process, in an instance in which a user is enrolled in a computing resource set, the user may interact with the constituent computing resources according to rules established at the computing resource level. For example, a third party computing resource 120 may send onboarding instructions and the user may utilize the third-party computing resource through direct interaction with the third-party computing resource. In such embodiments, the provider system 100 may remain the central source of truth for access privilege data, such that the third-party computing resource may continue to provide the resource to the user while the provider system 100 indicates the user's corresponding access privilege data. By way of another example, a computing resource may communicate with the user via the provider system 100 for some or all utilization of the resource.

In cases where there are multiple computing resources in one computing resource set, the provider system may provide a filtering unified entry point that may interface via the API platform 102 with the individual backend internal and third-party systems. The provider system 100 may identify direct the user down a workflow path associated with a user's needs (e.g., auto claim versus mobile claim versus renter claim) to provide a unified experience for all users or a large portion of users.

Having now generally described several embodiments of resource access management, the operation of adaptive updating one or more computing resource sets will now be described in accordance with several example embodiments.

Computing Resource Set Adaptive Updating

In some embodiments, the computing resource sets may be adaptively updated. Adaptive updates may occur through a number of different means, including by a provider entity (e.g., a developer) at the system level, by a developer at the individual computing resource level, by an end user adjusting enrollment, and/or via any other mechanism. For example, one or more constituent computing resources that form a part of computing resource sets may no longer be integrated into or offered by the system 100, one or more customizations and attribute assets assigned to any portion of a computing resource set may change after initial enrollment, the token value of a constituent computing resource that forms a part of a computing resource set may change, and/or any other modification may be made to all or some of a selected computing resource set to which one or more accounts are enrolled. In some instances, the dynamic resource assembly system 104 may create a new, discontinue offering the original computing resource set to new enrollees and may either preserve the pre-existing selected computing resource set for the already-enrolled accounts or may trigger an update process for the already-enrolled accounts. In either event, the pre-existing selected computing resource set may be discontinued for new enrollees and the pre-existing enrollment may include a time stamp and/or explicit list of the constituent computing resources and relevant customizations so that the pre-existing enrollment may be frozen in time at the point of enrollment regardless of changes to the currently-offered computing resource set to new enrollees, unless a future change prohibits the pre-existing enrollment from continuing (e.g., a constituent computing resource is no longer available, even to pre-existing users, such as by destruction or other loss of the underlying computing resource). In some embodiments, the system 100 may be configured such that updates can be made to computing resource sets and propagated throughout the system 100. In some embodiments, adaptively updating (including substituting) the computing resource set(s) may have no effect on portions of the computing resource set that are unchanged, ensuring dynamic updating with seamless transition for unaffected constituent computing resources. Likewise, in some embodiments, the user can trigger the update process themselves by navigating to an update menu on the user device without being prompted by the system. In either event, the user can modify one or more of the constituent computing resources and/or the computing resource set quickly and intuitively with minimal to no impact or change to computing resources that the user desires to retain.

Referring now to FIG. 12, adaptive updating of computing resource sets is illustrated. In some embodiments, updates may be initiated by an operator of the operator terminal 114 or another device connected to the system. For example, an operator of the operator terminal 114 may initiate an update 1201 to modify or discontinue a particular computing resource set or a portion thereof (e.g., changing a "core" product to an "optional" product) at the dynamic resource assembly system 104 level in the system. In some embodiments, each computing resource set is uniquely identified via separate identifier, and modification of a preexisting computing resource set may generate a new computing resource set with the modified parameters rather than changing the previous computing resource set. In each instance, this may be considered "updating" the computing resource set. The updated or new computing resource set may be stored in a database associated with the dynamic resource assembly system 1202 and/or may be transmitted to the API platform. In some embodiments, updates may occur in real time as one or more computing systems associated with the individual constituent computing resources are changed. In some embodiments, an end user can update or modify their computing resource set(s) or portions thereof, including customizations, through various tools associated with the provider system 100 including the dynamic resource assembly system 104. In some embodiments, a third party user (e.g., a technician, developer, or other agent) may be able to, at any time, modify or delete a computing resource set (e.g., by modifying one or more templates prior to enrollment or modifying the enrollment after). In some embodiments, options may be enabled or disabled for various computing resource sets following enrollment, such that the end user may be able to utilize the tools associated with the provider system 100 to view and update their computing resource set based on the newly-enabled options. Corresponding renderable data objects may be generated and presented to a user to present the one or more options and tools and to allow the user to select the one or more updates and options available.

As another example, one or more of the constituent computing resources 106 may be updated 1203 such that the computing resource(s) is modified or can no longer be offered as part of the computing resource set. The update to the one or more of the constituent computing resources 106 may be performed by a developer of the respective computing resource(s) 1204 and may be made independent of the rest of the system 100. For example, each computing resource may have separate servers, update frequencies, code repositories, and the like, and may each be updated independently from each other and from the dynamic resource assembly system and remaining portions of the system. At step 1205, the computing resource may either transmit an update to the dynamic resource assembly system or the dynamic resource assembly system (either directly or via another portion of the system, such as the API platform), may retrieve the new parameters associated with the computing resource. For example, in some instances, an operator accessing the dynamic resource assembly system may cause the dynamic resource assembly system to retrieve updates to one or more of the computing resources or may add or remove computing resources from the system. In some instances, the dynamic resource assembly system may retrieve the current implementation of the computing resources periodically or in each instance in which a user desires to create or enroll in a computing resource set. In yet some other instances, the individual computing resources may transmit updates to the dynamic resource access system following any modifications to the computing resources. At step 1206, the dynamic resource assembly system may update based on the updated computing resource, such that any future resource access management process with a new account or new enrollment will use the updated computing resource and/or updated computing resource set.

Following either type of update in steps 1202 and 1206, the system may determine if any existing selected computing resource sets associated with an account as part of a preexisting enrollment require updates 1207. As noted above, updates may not be required in each instance, and the system may continue to support modified or discontinued legacy computing resource sets that are frozen in time at the point of enrollment. If the system is no longer able to support a legacy enrollment, a new resource access request process may be initiated. If so, a new resource access request process may be initiated 1208 which may be substantially similar to the process described above, such as in reference to FIG. 7, and a computing resource set registration interface may be presented to the user 1209 and a selection of an updated selected computing resource set may be received 1210. In some instances, the new resource access request process may be limited to only computing resources and/or other features that are different from the original enrollment. In some instances, an entire new resource access request process may start and may allow the user to select any currently available computing resource set. In some instances, the modified computing resource or other feature of the computing resource set may be updated and/or removed from the legacy enrollment automatically with no further action required by the user. In some embodiments, the user and/or provider may be given a choice of which process to use.

In some embodiments, an entirely new computing resource may be added to the system via an onboarding data structure that may be the dynamic resource assembly system. In some embodiments, the dynamic resource assembly system may categorize or allow a provider entity to categorize the new computing resource based on its relationship to other existing computing resources.

Having now generally described several embodiments of adaptive updating one or more computing resource sets, the system messaging capabilities will now be described in accordance with several example embodiments.

System Messaging Capabilities

The integration and coordination of the various independent computing resources described herein via the described system(s) and the generation of computing resource sets may further facilitate additional computational efficiency. In some embodiments, the system may be configured to narrowly target a subset of user devices across channels, networks, device types, computing resource sets, and other criteria with messaging capabilities configured to facilitate reduced processing and transmission loads on the system while improving user experience.

With reference to FIG. 13, an embodiment of a process for facilitating a coordinated electronic messaging system is shown and described. The messaging process may begin by identifying a message that must be sent to one or more user devices, such as in connection with any of the processes noted herein (e.g., in connection with the updating process described above). The messaging process may then include identifying at least one common attribute asset to which the message(s) are to be directed. The common attribute asset may be determined by the nature of the message. For example, if a particular constituent computing resource has been updated or removed, the common attribute asset may be the constituent computing resource or a subset of the constituent computing resource corresponding to the update. By way of another example, if one or more changes are made at the system to a channel or other subset of user accounts, then the common attribute asset may be the user account data and/or computing resource set data corresponding to the identified channel or user accounts. In this manner, the common attribute asset represents that least common denominator among user devices to whom the message must be delivered. As with the various embodiments discussed herein, the user device may be any device capable of interacting with the system, including but not limited to mobile phones, terminals, personal computers, or merchant devices.

At steps 1302 and 1304, the system may search access privilege data associated with a plurality of user accounts and/or a plurality of independent computing resources for at least one common attribute asset, identified according to the process noted above. At step 1306, the system may identify a group of user accounts of the plurality of user accounts sharing the at least one common attribute asset. At step 1308, the process may include identifying at least one communication mode associated with each user account of the first group of user accounts, which may be the communication mode(s) by which the system (e.g., via the API platform 102) communicates with the various user accounts. At step 1310, the depicted process includes generating at least one electronic message to each user account based on the at least one common attribute asset. At step 1312, the process includes transmitting the at least one electronic message to each user account of the first group of user accounts via the at least one communication mode.

Thus, the coordinated electronic messaging system may facilitate communication with the user accounts corresponding to the common attribute asset even in instances in which the user accounts are part of otherwise different channels or are enrolled in different computing resource sets. For example, if two accounts associated with two different channels are subscribed to two different computing resource sets that share a common independent computing resource or another common attribute asset, messages may be targeted to those two accounts without affecting or messaging any other users associated with the two different channels or the two different computing resource sets who do not share the common attribute asset. In such embodiments, the two user accounts may not even be enrolled in the same computing resource set to receive the message, so long as the common attribute asset is shared. Other examples of criteria that may be selected for electronic messaging include device make, device model, user demographic information, country code, channel ID, region, currency, or the like.

In some embodiments, the messaging system can be used as part of the update processes described herein, whereby the message comprises an indication of an update to at least one of the plurality independent computing resources sharing the at least one common attribute asset, and the user may respond to the message, such as transmitting an updated resource access request, the updated resource access request being associated with the at least one of the plurality independent computing resources. In some instances, the message may be a notification of a modification to the user account or the computing resource set, such as a discontinuation of at least one of the plurality independent computing resources, which may also include a modification to the total token value (e.g., a credit of the value of the discontinued computing resource). Moreover, in some embodiments, the API and messaging system may be used to send messages to single users or groups of users requiring the same data, such as account onboarding, Terms & Conditions, and the like.

Having now generally described several embodiments of the messaging capabilities of the system, several, non-limiting examples of constituent computing resources will now be described in accordance with several example embodiments.

Example Computing Resources

Various embodiments of the present disclosure relate to computing resources and, when assembled, sets of computing resources available for a user. The present disclosure contemplates various flexible, modular systems capable of facilitating and delivering access to numerous computing resources, including computer software, services, products, and the like. The computing resources may comprise ongoing services (e.g., SaaS software) and/or user-owned or permanently-licensed software. In some embodiments, the computing resources may comprise mobile phone apps, desktop computer software, cloud-hosted software, or any other delivery mechanism of software. Further due to the modularity and flexibility of the dynamic resource assembly system, the system is able to combine any permutation of computing resources, rapidly assign a token value thereto, and provide the benefit of each computing resource to the user. In some embodiments, as discussed herein, third-party computing resources (e.g., computing resources 120 shown in FIG. 1 that may be provided by an entity other than the provider of the system) may be seamlessly integrated into the system with no change for the user's enrollment or authentication process by integrating the third-party computing resources with the API platform.

Various non-limiting examples of computing resources that may be used alone or in combination with other computing resources as a computing resource set may include the following: computing device protection products and services (e.g., theft/loss, accidental damage, mechanical breakdown coverage); computing device electronic security services; electronic fraud prevention services; password protection services; user alias services; digital identity protection services; computing device fault detection; computing device repair; insurance (e.g., rental insurance, car insurance, home insurance, travel insurance, etc.); computing device screen damage replacement; credit protection and monitoring services; computing device diagnostic products and services; technical support and remote assistance services (e.g., via phone and/or electronic interface); Pocket Geek app services; antivirus for mobile; antivirus for desktop; cloud storage and backup; VPN services and software; automotive products and services; key fob replacement policy; dent and ding repair; lease wear & tear; tire & wheel damage; appearance protection; windshield chips & cracks; additional living expense protection; travel insurance; pet insurance; eye glass protection; installation and setup services; computer tune-up services; data transfer services; virus removal services; access to merchant or other third-party physical stores for repair; data backup (e.g., 50 gigabytes, 1 terabyte, etc.); installation services (e.g., home installation for home tech); technical support on phone, app, and/or chat; technical support in person; discounted repairs; and/or any other software and/or hardware based programs, applications, platforms, or services capable of being provided to users and/or user devices.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a descriptive sense and not for purposes of limitation.

The invention claimed is:

1. A dynamic resource assembly system, the dynamic resource assembly system comprising at least one processor, and at least one memory associated with the at least one processor having computer coded instructions therein, with the computer coded instructions configured to, when executed by the at least one processor, cause the system to:
receive a plurality of computing resource data sets associated with a plurality of computing resources, wherein the plurality of computing resources are independent;
generate renderable assets associated with two or more of the plurality of computing resources configured to be presented via a graphical user interface on a display;
receive an indication of a computing resource set associated with the two or more of the plurality of computing resources;
generate the computing resource set by assembling a computing resource set data structure comprising two or more of the plurality of computing resource data sets associated with the two or more of the plurality of computing resources, such that each of the two or more of the plurality of computing resources defines a constituent computing resource associated with the computing resource set; and
generate a renderable asset associated with the computing resource set configured to be presented via the graphical user interface on the display.

2. The system according to claim 1, wherein each of the two or more of the plurality of computing resource data sets is associated with a constituent token data structure, and wherein the computing resource set is associated with a total token value comprising a combination of the constituent token data structures.

3. The system according to claim 2, further configured to:
receive channel data, wherein the two or more of the plurality of computing resources comprise a subset of the plurality of computing resources corresponding to the channel.

4. The system according to claim 1, wherein the indication of the computing resource set comprises a first indication of a core computing resource of the two or more of the plurality of computing resources.

5. The system according to claim 4, wherein the indication of the computing resource set comprises a second indication of an optional computing resource of the two or more of the plurality of computing resources, and wherein the optional computing resource is configured to be a user-selectable option of the computing resource set.

6. The system according to claim 5, wherein the indication of the computing resource set further comprises one or more customization options associated with at least one of the two or more of the plurality of computing resources.

7. The system according to claim 1, further configured to:
receive an indication of an update associated with one or more of the constituent computing resources; and
update the computing resource set to include the update associated with the one or more of the constituent computing resources without modifying a remaining set of constituent computing resources.

8. The system according to claim 1, further configured to:
receive an indication of a second computing resource set associated with a second set of two or more of the plurality of computing resources; and
generate the second computing resource set by assembling a second computing resource set data structure comprising two or more of the plurality of computing resource data sets associated with the second set of two or more of the plurality of computing resources, such that each of the second set of two or more of the plurality of computing resources defines a constituent computing resource associated with the second computing resource set.

9. The system according to claim 8, wherein the computing resource set and the second computing resource set have at least one constituent computing resource in common.

10. The system according to claim 1, wherein the indication of the computing resource set, or a portion thereof, is generated with a trained machine learning model.

11. A method for dynamic resource assembly the method comprising:
receiving a plurality of computing resource data sets associated with a plurality of computing resources, wherein the plurality of computing resources are independent;
generating renderable assets associated with two or more of the plurality of computing resources configured to be presented via a graphical user interface on a display;
receiving an indication of a computing resource set associated with the two or more of the plurality of computing resources;
generating the computing resource set by assembling a computing resource set data structure comprising two or more of the plurality of computing resource data sets associated with the two or more of the plurality of computing resources, such that each of the two or more of the plurality of computing resources defines a constituent computing resource associated with the computing resource set; and
generating a renderable asset associated with the computing resource set configured to be presented via the graphical user interface on the display.

12. The method according to claim 11, wherein the indication of the computing resource set comprises a first indication of a core computing resource of the two or more of the plurality of computing resources.

13. The method according to claim 12, wherein the indication of the computing resource set comprises a second indication of an optional computing resource of the two or more of the plurality of computing resources, and wherein the optional computing resource is configured to be a user-selectable option of the computing resource set.

14. The method according to claim 13, wherein the indication of the computing resource set further comprises one or more customization options associated with at least one of the two or more of the plurality of computing resources.

15. The method according to claim 11, further comprising:
receiving an indication of an update associated with one or more of the constituent computing resources; and
updating the computing resource set to include the update associated with the one or more of the constituent computing resources without modifying a remaining set of constituent computing resources.

16. The method according to claim 11, further comprising:
receiving an indication of an update associated with one or more of the constituent computing resources; and
discontinuing offering the computing resource set.

17. The method according to claim 16, further comprising:
generating a new computing resource set comprising the update associated with one or more of the constituent computing resources.

18. The method according to claim 11, further comprising:
receiving an indication of a second computing resource set associated with a second set of two or more of the plurality of computing resources; and
generating the second computing resource set by assembling a second computing resource set data structure comprising two or more of the plurality of computing resource data sets associated with the second set of two or more of the plurality of computing resources, such that each of the second set of two or more of the plurality of computing resources defines a constituent computing resource associated with the second computing resource set.

19. The method according to claim 18, wherein the computing resource set and the second computing resource set have at least one constituent computing resource in common.

20. The method according to claim 11, wherein the indication of the computing resource set, or a portion thereof, is generated with a trained machine learning model.

21. The method according to claim 11, wherein the computing resource set is configurable by an end user, the computing resource set comprising the two or more of the plurality of computing resources, and one or more customizations.

22. The method according to claim 21, wherein the one or more customizations comprise customizations associated with individual ones of the two or more of the plurality of computing resources or customizations associated with the computing resource set as a whole.

23. A computer program product for dynamic resource assembly, the computer program product comprising a non-transitory computer-readable storage medium storing computer program code that, when executed by at least one apparatus, causes the apparatus to:

receive a plurality of computing resource data sets associated with a plurality of computing resources, wherein the plurality of computing resources are independent;

generate renderable assets associated with two or more of the plurality of computing resources configured to be presented via a graphical user interface on a display;

receive an indication of a computing resource set associated with the two or more of the plurality of computing resources;

generate the computing resource set by assembling a computing resource set data structure comprising two or more of the plurality of computing resource data sets associated with the two or more of the plurality of computing resources, such that each of the two or more of the plurality of computing resources defines a constituent computing resource associated with the computing resource set; and generate a renderable asset associated with the computing resource set configured to be presented via the graphical user interface on the display.

* * * * *